US011377362B2

(12) United States Patent
Snydacker et al.

(10) Patent No.: US 11,377,362 B2
(45) Date of Patent: Jul. 5, 2022

(54) LITHIUM PRODUCTION WITH VOLATILE ACID

(71) Applicant: Lilac Solutions, Inc., Oakland, CA (US)

(72) Inventors: David Henry Snydacker, San Francisco, CA (US); Alexander Yurievich Gershanov, Oakland, CA (US); Alysia Lukito, Emeryville, CA (US); Garrett Chinyu Lau, Oakland, CA (US); Mustafa Juzer Bootwala, Oakland, CA (US); Sophia Patricia Mock, Berkeley, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 17/590,223

(22) Filed: Feb. 1, 2022

(65) Prior Publication Data

US 2022/0162082 A1 May 26, 2022

Related U.S. Application Data

(63) Continuation of application No. PCT/US2021/059921, filed on Nov. 18, 2021.

(60) Provisional application No. 63/116,691, filed on Nov. 20, 2020.

(51) Int. Cl.
| | |
|---|---|
| C01D 15/00 | (2006.01) |
| B01D 3/00 | (2006.01) |
| B01D 5/00 | (2006.01) |
| B01D 9/00 | (2006.01) |
| C01D 15/02 | (2006.01) |
| B01J 47/10 | (2017.01) |
| C01D 15/08 | (2006.01) |
| B01D 15/36 | (2006.01) |
| B01D 3/14 | (2006.01) |
| B01D 61/02 | (2006.01) |
| B01D 21/01 | (2006.01) |

(52) U.S. Cl.
CPC ............ C01D 15/02 (2013.01); B01D 3/143 (2013.01); B01D 5/006 (2013.01); B01D 9/00 (2013.01); B01D 15/361 (2013.01); B01D 21/01 (2013.01); B01D 61/025 (2013.01); B01J 47/10 (2013.01); C01D 15/08 (2013.01); B01D 2009/0086 (2013.01); C01P 2006/40 (2013.01)

(58) Field of Classification Search
CPC ........ C01D 15/02; C01D 15/06; C01D 15/08; B01D 15/361; B01D 3/143; B01D 5/006; B01D 9/00
See application file for complete search history.

(56) References Cited

U.S. PATENT DOCUMENTS

| | | | |
|---|---|---|---|
| 3,793,433 A | 2/1974 | Seeley et al. | |
| 4,116,858 A | 9/1978 | Lee et al. | |
| 4,159,311 A | 6/1979 | Bauman et al. | |
| 4,382,124 A | 5/1983 | Meitzner et al. | |
| 4,747,949 A | 5/1988 | Barkey | |
| 5,039,382 A | 8/1991 | Suzuki et al. | |
| 5,639,861 A | 6/1997 | Steffier | |
| 6,171,489 B1 | 1/2001 | Ballard et al. | |
| 7,390,466 B2 * | 6/2008 | Boryta ................... | C01D 15/08 422/198 |
| 7,435,477 B2 | 10/2008 | Adachi et al. | |
| 7,541,016 B2 | 6/2009 | Gorshkov et al. | |
| 7,820,327 B2 | 10/2010 | Yumoto et al. | |
| 8,454,816 B1 | 6/2013 | Harrison et al. | |
| 8,506,851 B2 | 8/2013 | Ravet et al. | |
| 8,679,224 B2 | 3/2014 | Brown et al. | |
| 8,741,150 B2 | 6/2014 | Chung et al. | |
| 8,778,289 B2 | 7/2014 | Chon et al. | |
| 9,034,294 B1 | 5/2015 | Harrison | |
| 9,677,181 B2 | 6/2017 | Bourassa et al. | |
| 10,150,056 B2 | 12/2018 | Snydacker | |
| 10,439,200 B2 | 10/2019 | Snydacker et al. | |
| 10,505,178 B2 | 12/2019 | Snydacker et al. | |
| 10,648,090 B2 | 5/2020 | Snydacker et al. | |
| 10,695,694 B2 | 6/2020 | Snydacker | |
| 2004/0005267 A1 | 1/2004 | Boryta et al. | |
| 2007/0138020 A1 | 6/2007 | Balagopal et al. | |
| 2010/0116748 A1 | 5/2010 | Rasmussen et al. | |
| 2011/0044882 A1 | 2/2011 | Buckley et al. | |
| 2011/0067230 A1 | 3/2011 | Tan et al. | |
| 2011/0174739 A1 | 7/2011 | Chung et al. | |
| 2013/0001168 A1 | 1/2013 | Kim et al. | |
| 2013/0306565 A1 | 11/2013 | Davis | |
| 2014/0113197 A1 | 4/2014 | Xiao et al. | |
| 2014/0239221 A1 | 8/2014 | Harrison et al. | |

(Continued)

FOREIGN PATENT DOCUMENTS

| | | |
|---|---|---|
| CN | 101961634 A | 2/2011 |
| CN | 102872792 A | 1/2013 |

(Continued)

OTHER PUBLICATIONS

Chitrakar et al. Lithium recovery from salt lake brine by H2TiO3. Dalton Trans 43:8933-8939 (2014).

(Continued)

Primary Examiner — Sikarl A Witherspoon
(74) Attorney, Agent, or Firm — Wilson Sonsini Goodrich & Rosati

(57) ABSTRACT

The present invention relates to the production of lithium from liquid resources such as natural and synthetic brines, leachate solutions from clays and minerals, and recycled products.

30 Claims, 2 Drawing Sheets

(56) References Cited

U.S. PATENT DOCUMENTS

| | | |
|---|---|---|
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2016/0115040 A1 | 4/2016 | Yi et al. |
| 2016/0230250 A1 | 8/2016 | Chung et al. |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2018/0016153 A1 | 1/2018 | Sharma |
| 2018/0080133 A1 | 3/2018 | Smith et al. |
| 2018/0133619 A1 | 5/2018 | Snydacker |
| 2018/0245180 A1 | 8/2018 | Cheng et al. |
| 2019/0256987 A1 | 8/2019 | Snydacker et al. |
| 2019/0276327 A1 | 9/2019 | Brown |
| 2020/0165699 A1 | 5/2020 | Snydacker et al. |
| 2020/0230591 A1 | 7/2020 | Snydacker |
| 2020/0232105 A1 | 7/2020 | Snydacker et al. |
| 2020/0289958 A1 | 9/2020 | Snydacker |
| 2021/0077990 A1 | 3/2021 | Snydacker et al. |
| 2021/0214820 A1 | 7/2021 | Snydacker |
| 2021/0380429 A1 | 12/2021 | Snydacker et al. |

FOREIGN PATENT DOCUMENTS

| | | |
|---|---|---|
| CN | 103794779 A | 5/2014 |
| CN | 105238927 A | 1/2016 |
| CN | 105251436 A | 1/2016 |
| CN | 105289455 A | 2/2016 |
| CN | 205151853 U | 4/2016 |
| CN | 106311190 A | 1/2017 |
| CN | 106673023 A | 5/2017 |
| CN | 107043116 A | 8/2017 |
| EP | 2945211 B1 | 11/2018 |
| FR | 3034781 A1 | 10/2016 |
| JP | H08236114 A | 9/1996 |
| JP | 2003500318 A | 1/2003 |
| JP | 2005296811 A | 10/2005 |
| JP | 2009507839 A | 2/2009 |
| JP | 2010042395 A | 2/2010 |
| JP | 2014055312 A | 3/2014 |
| JP | 2015020090 A | 2/2015 |
| JP | 5898021 B2 | 4/2016 |
| JP | 2017131863 A | 8/2017 |
| JP | 2019099874 A | 6/2019 |
| KR | 20120063424 A | 6/2012 |
| KR | 20140082065 A | 7/2014 |
| KR | 20160126314 A | 11/2016 |
| WO | WO-2010056322 A1 | 5/2010 |
| WO | WO-2010103173 A1 | 9/2010 |
| WO | WO-2012005545 A2 | 1/2012 |
| WO | WO-2015171109 A1 | 11/2015 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017136328 A1 | 8/2017 |
| WO | WO-2017137885 A1 | 8/2017 |
| WO | WO-2018089932 A1 | 5/2018 |
| WO | WO-2019000095 A1 | 1/2019 |
| WO | WO-2019028148 A1 | 2/2019 |
| WO | WO-2019028174 A2 | 2/2019 |
| WO | WO-2019126862 A1 | 7/2019 |
| WO | WO-2019160982 A1 | 8/2019 |
| WO | WO-2019168941 A1 | 9/2019 |
| WO | WO-2021142147 A1 | 7/2021 |
| WO | WO-2021252381 A1 | 12/2021 |

OTHER PUBLICATIONS

Chitrakar et al. Selective Uptake of Lithium Ion from Brine by H1.33Mn1.67O4 and H1.6Mn1.6O4. Chem Lett 41:1647-1649 (2012).

Cho et al. High-Performance ZrO2-Coated LiNiO2 Cathode Material. Electrochem Solid-State Lett 4(10):A159-A161 (2001).

Department of Energy. Ion Exchange Materials for Lithium Extraction (Topic: 15, Subtopic: e)—Abstract. Available at https://www.sbir.gov/sbirsearch/detail/1307793 (3 pgs.) (2017).

Larumbe et al. Effect of a SiO2 coating on the magnetic properties of Fe3O4 nanoparticles. JPhys: Condens Matter 24(26):266007 (2012).

Miyai et al. Bench scale studies on lithium recovery from sea water. Nippon Kaisui Gakkai-Shi—Bulletin Of The Society Of Sea Waterscience, Japan 49(4):226-230 (1995) (English Abstract).

Nishihama et al. Selective recovery process of lithium from seawater using integrated ion exchange methods. Solvent Extraction and Ion Exchange 29:421-431 (2011).

Oh et al. Double Carbon Coating of LiFePO4 as High Rate Electrode for Rechargeable Lithium Batteries. Adv. Mater. 22:4842-4845 (2010).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

PCT/US2018/044821 International Search Report and Written Opinion dated Oct. 12, 2018.

PCT/US2018/044868 International Search Report and Written Opinion dated Mar. 6, 2019.

PCT/US2019/017885 International Search Report and Written Opinion dated Jun. 14, 2019.

PCT/US2019/019780 International Search Report and Written Opinion dated Jun. 14, 2019.

PCT/US2021/012534 International Search Report and Written Opinion dated Apr. 27, 2021.

PCT/US2021/036227 International Search Report and Written Opinion dated Nov. 2, 2021.

Tarakina et al. Defect crystal structure of new TiO(OH)2 hydroxide and related lithium salt Li2TiO3. Dalton Trans 39:8168-8176 (2010).

Umeno et al. Preparation and Adsorptive Properties of Membrane-Type Adsorbents for Lithium Recovery from Seawater. Ind Eng Chem Res 41(17):4281-4287 (2002).

U.S. Appl. No. 17/364,530 Office Action dated Sep. 23, 2021.

Xiao et al. Adsorption and desorption behavior of lithium ion in spherical PVC-MnO2 ion sieve. Industrial & engineering chemistry research, 51(33):10921-10929 (2012).

Xiao et al. Lithium ion recovery from brine using granulated polyacrylamide-MnO 2 ion-sieve. Chemical Engineering Journal 279:659-666 (2015).

Zandvakili et al. Preparation and characterisation of lithium ion exchange composite for the recovery of lithium from brine. Mineral Processing and Extractive Metallurgy 127(3):176-181 (2017).

PCT/US2021/059921 International Search Report and Written Opinion dated Mar. 14, 2022.

Reichel et al. Lithium recovery from lithium-containing micas using sulfur oxidizing microorganisms. Minerals Engineering 106:18-21 (2017).

Rioyo et al. Lithium Extraction from Spodumene by the Traditional Sulfuric Acid Process: A Review. Mineral Processing and Extractive Metallurgy Review 43(1):97-106 (2020).

* cited by examiner

LITHIUM PRODUCTION WITH VOLATILE ACID

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

Ion exchange particles are loaded into an ion exchange unit for lithium extraction. Alternating flows of brine, water, and acid are flowed through the ion exchange unit to enable lithium uptake from the brine into the ion exchange particles, water washing of residual brine from the ion exchange particles, and acid elution of lithium from the ion exchange particles to form a lithium eluate solution. The pH of the brine is maintained in a suitable range to facilitate thermodynamically favorable lithium uptake and concomitant hydrogen release.

Sulfuric acid is a low-cost source of protons for eluting lithium from the ion exchange particles. Lithium sulfate is a value-added lithium product due to the ability to convert lithium sulfate into either lithium hydroxide or lithium carbonate. However, sulfuric acid contains sulfate anions which can form insoluble scale, and therefore it is desirable to avoid putting sulfuric acid directly into the ion exchange unit. To utilize sulfuric acid as a proton source while avoiding scale, volatile acids such as nitric acid or hydrochloric acid can be used to elute lithium from the ion exchange particles forming a lithium eluate which can be combined with sulfuric acid to form lithium sulfate and a volatile acid that can be removed from the lithium sulfate and recaptured as an acid for further elution.

The ion exchange particles can also be contacted with nitric acid to form a lithium nitrate eluate which can be decomposed to form a lithium base and an acidic gas, where the acidic gas can be recaptured to form acid for lithium elution and the lithium base can be processed into lithium hydroxide.

Disclosed herein is a system for production of lithium hydroxide, comprising: a) an ion exchange unit containing ion exchange particles that absorb lithium from a liquid resource and that then release the absorbed lithium into an eluent comprising an acid to yield an eluate comprising a lithium salt; b) a heating unit that decomposes said lithium salt to crystallize lithium oxide solids while releasing a gaseous oxide; c) an absorption unit that absorbs said gaseous oxide into a scrubbing solution to yield recycled acid; and d) a hydration unit that combines said lithium oxide solids with water to form lithium hydroxide. In some embodiments, the system further comprises a purification unit after the ion exchange unit and before the heating unit to remove impurities from the lithium salt. In some embodiments, the system further comprises a purification unit after the hydration unit to remove impurities from the lithium hydroxide. In some embodiments, the system further comprises a crystallization unit after the hydration unit to crystallize the lithium hydroxide. In some embodiments, the system further comprises a concentration unit between step (a) and step (b) to remove water from the eluate comprising the lithium salt. In some embodiments, the concentration unit comprises a reverse osmosis unit, a mechanical evaporator, a mechanical vapor recompression evaporator, or combinations thereof. In some embodiments, the system further comprises a drying unit between step (a) and step (b) to remove water from the eluate comprising the lithium salt. In some embodiments, the system further comprises a drying unit between step (a) and step (b) to remove water from the eluate comprising the lithium salt to form a molten lithium salt that is decomposed by the heating unit to crystallize the lithium oxide solids while releasing the gaseous oxide. In some embodiments, the acid is nitric acid, sulfuric acid, or hydrochloric acid.

Disclosed herein is a system for lithium production, comprising: a) an ion exchange unit containing ion exchange particles that absorb lithium from a liquid resource and that then release the absorbed lithium into an eluent comprising a volatile acid to yield a lithium salt solution; b) a distillation unit that mixes sulfuric acid with said lithium salt solution and heats the resulting mixture to distill off volatile acid vapors and to yield lithium sulfate; and c) a condensation unit that condenses said volatile acid vapors to yield recycled volatile acid for reuse in said ion exchange unit. In some embodiments, said ion exchange unit modulates the pH of the liquid resource to neutralize protons released from said ion exchange particles. In some embodiments, the system further comprises a concentration unit to remove water from said lithium salt solution after step (a) and before step (b). In some embodiments, the concentration unit comprises a reverse osmosis unit that removes water from said lithium salt solution to yield a concentrated lithium salt solution. In some embodiments, the concentration unit comprises a mechanical evaporation unit that removes water from said lithium salt solution to yield a concentrated lithium salt solution. In some embodiments, the system further comprises a precipitation unit wherein the precipitation unit i) adds a precipitant to said lithium sulfate yielding lithium solids; or ii) adds a precipitant to precipitate and out impurities; or both i) and ii). In some embodiments, the system further comprises a carbonation unit where sodium carbonate is combined with said lithium sulfate to precipitate lithium carbonate. In some embodiments, the system further comprises a crystallization unit comprising a multi-effect crystallizer. In some embodiments, the system further comprises a crystallization unit where sodium hydroxide is combined with said lithium sulfate to crystallize lithium hydroxide. In some embodiments, the system further comprises a crystallization unit where sodium hydroxide is combined with said lithium sulfate to first crystallize a sodium sulfate byproduct and then crystallize a lithium hydroxide product. In some embodiments, the system further comprises a purification unit after the ion exchange unit and before the distillation unit to remove impurities from said lithium salt solution. In some embodiments, the system further comprises a purification unit after said distillation unit to remove impurities from said lithium sulfate. In some embodiments, the system further comprises: a) a purification unit that removes impurities from said lithium sulfate to yield purified lithium sulfate; b) a conversion unit that adds sodium hydroxide to said purified lithium sulfate to yield a lithium hydroxide solution; and c) a crystallization unit that crystallizes said lithium hydroxide solution to yield a lithium compound.

Disclosed herein is a system for lithium production, comprising: a) an ion exchange unit containing ion exchange particles that absorb lithium from a liquid resource and that then release lithium into an eluent comprising a volatile acid to yield a lithium salt solution; b) a first precipitation unit where a precipitant is mixed with said lithium salt solution to precipitate a lithium salt and yield an effluent; c) a distillation unit that mixes sulfuric acid with said effluent and heats the resulting mixture to distill off volatile acid vapors; and d) a condensation unit to condense said volatile acid vapors to yield recycled acid for reuse in said ion exchange unit. In some embodiments, the system further comprises a concentration unit to remove water from said lithium salt solution after step (a) and before step (b). In some embodiments, said concentration unit comprises a reverse osmosis unit, a mechanical evaporator, a mechanical vapor recompression evaporator, or combinations thereof. In some embodiments, the system further comprises a purification unit to remove impurities before or after distillation. In some embodiments, said purification unit removes impurities from said lithium salt solution. In some embodiments, said purification unit comprises a second precipitation unit for precipitating and filtering out impurities as insoluble hydroxides. In some embodiments, said purification unit comprises a second precipitation unit for precipitating and filtering out impurities as insoluble carbonates. In some embodiments, said purification unit comprises an ion exchange resin for removing impurities.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
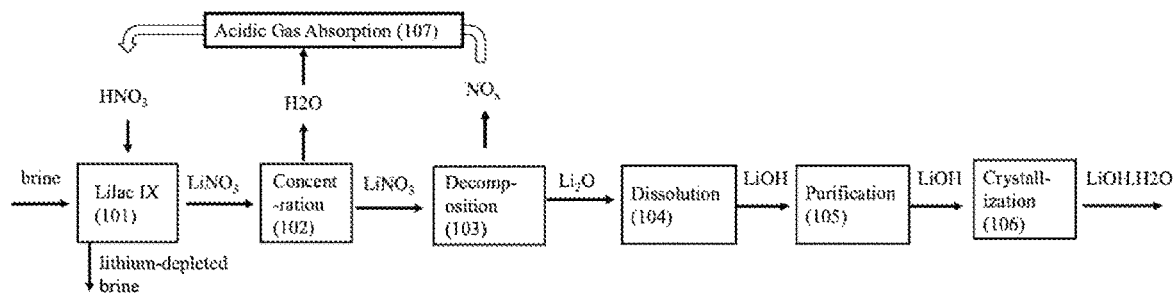
FIG. 1 illustrates a lithium production system involving elution of lithium with nitric acid followed by lithium nitrate decomposition.

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary. The terms "lithiated", "lithium-enriched", and "lithium-exchanged" are used interchangeably in the present specification and these terms are synonymous unless specifically noted to the contrary. The terms "protonated", "hydrogen-enriched", and "proton-exchanged", are used interchangeably in the present specification and these terms are synonymous unless specifically noted to the contrary.

Lithium Production with Volatile Acid

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using an acid solution, and yield a lithium salt. The plant uses heat to decompose the lithium salt to regenerate the acid a yield a lithium base such as lithium oxide, lithium hydroxide, or lithium carbonate. In some cases, the ion exchange particles are ion exchange beads, ion exchange material, coated ion exchange particles, porous ion exchange material, or other material capable of absorbing lithium from a liquid resource.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant uses heat to decompose the lithium nitrate into lithium oxide and nitrogen oxide gas which can be recaptured to reform the nitric acid solution. The lithium oxide can optionally be processed into lithium hydroxide by addition of water, or into lithium carbonate by addition of water and carbonate dioxide or sodium carbonate. In some cases, the ion exchange particles are ion exchange beads, ion exchange material, coated ion exchange particles, porous ion exchange material, or other material capable of absorbing lithium from a liquid resource.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a sulfuric acid solution, and yield lithium sulfate. The plant uses heat to decompose the lithium sulfate into lithium oxide and sulfur oxide gas which can be recaptured to reform the sulfuric acid solution. In some embodiments, the sulfur oxide gas comprises sulfur trioxide, sulfur dioxide, sulfur monoxide, oxygen, or combinations thereof. The lithium oxide can optionally be processed into lithium hydroxide by addition of water, or into lithium carbonate by addition of water and carbonate dioxide or sodium carbonate. In some cases, the ion exchange particles are ion exchange beads, ion exchange material, coated ion exchange particles, porous ion exchange material, or other material capable of absorbing lithium from a liquid resource.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate solution. The plant combines the lithium nitrate solution with sulfuric acid and then heats the mixture to distill off nitric acid which can be recaptured to reform the nitric acid solution while yielding lithium sulfate. The lithium sulfate can optionally be in an aqueous, solid, or molten salt form. The lithium sulfate is optionally processed into lithium hydroxide by addition of sodium hydroxide followed by crystallization of lithium hydroxide. The lithium sulfate is optionally processed into lithium carbonate by addition of sodium carbonate to precipitate lithium carbonate. In some cases, the ion exchange particles are ion exchange beads, ion exchange material, coated ion exchange particles, porous ion exchange material, or other material capable of absorbing lithium from a liquid resource.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a hydrochloric acid solution, and yield lithium chloride solution. The plant combines the lithium chloride solution with sulfuric acid and then heats the mixture to distill off hydrochloric acid which can be recaptured to reform the hydrochloric acid solution while yielding lithium sulfate. The lithium sulfate can optionally be in an aqueous, solid, or molten salt form. The lithium sulfate is optionally processed into lithium hydroxide by addition of sodium hydroxide followed by crystallization of lithium hydroxide. The lithium sulfate is optionally processed into lithium carbonate by addition of sodium carbonate to precipitate lithium carbonate. In some cases, the ion exchange particles are ion exchange beads, ion exchange material, coated ion exchange particles, porous ion exchange material, or other material capable of absorbing lithium from a liquid resource.

In some embodiments, the lithium sulfate is processed with an electrochemical cell to produce lithium hydroxide and sulfuric acid. In some embodiments, the lithium sulfate is processed with a membrane cell to produce lithium hydroxide and sulfuric acid. In some embodiments, the lithium sulfate is processed via electrochemical cell to produce lithium hydroxide and sulfuric acid which is reused to mix with a lithium salt and distill off a volatile acid. In some embodiments, the lithium sulfate is processed via electrochemical cell to produce lithium hydroxide and sulfuric acid which is returned to the ion exchange unit for elution of lithium.

In some embodiments, a mixture of a lithium salt and sulfuric acid is spray dried to produce a lithium sulfate solid while evaporating off a volatile acid or a mixture of volatile acids. In some embodiments, a mixture of a lithium salt and sulfuric acid is spray dried to produce a mixture of lithium sulfate and sulfuric acid while evaporating off a volatile acid or a mixture of volatile acids. In some embodiments, a mixture of a lithium salt and sulfuric acid is spray dried to produce a slurry of lithium sulfate and sulfuric acid while evaporating off a volatile acid or a mixture of volatile acids. In some embodiments, a mixture of a lithium salt and sulfuric acid is spray dried to produce a slurry of lithium sulfate while evaporating off a volatile acid or a mixture of volatile acids. In some embodiments, the volatile acids are condensed and used to elute lithium from an ion exchange material. In some embodiments, a mixture of lithium chloride and sulfuric acid is spray dried to produce a lithium sulfate solid while evaporating off hydrochloric acid. In some embodiments, a mixture of lithium nitrate and sulfuric acid is spray dried to produce a lithium sulfate solid while evaporating off nitric acid. In some embodiments, a mixture of lithium salt and acid is spray dried using a spray dryer. In some embodiments, a mixture of lithium salt and acid is heated using a spray, dryer, rotary kiln, or other heating device.

In some embodiments, a mixture of lithium salt and acid is heated under pressure or under vacuum. In some embodiments, a mixture of lithium salt and acid is heated under pressure or under vacuum to produce a volatile gas that is condensed under pressure or under vacuum. In some embodiments, a mixture of lithium salt and acid is heated under vacuum to produce a volatile gas that is condensed under pressure. In some embodiments, a mixture of lithium salt and acid is heated to remove a volatile acid at a pressure of about 0.001 to about 0.01 atm, about 0.01 to about 0.1 atm, about 0.1 to about 1.0 atm, about 1.0 to about 10 atm, about 10 to about 100 atm, or combinations thereof. In some embodiments, a mixture of lithium salt and acid is heated to evaporate or distill off a volatile acid that is condensed at a pressure of about 0.001 to about 0.01 atm, about 0.01 to about 0.1 atm, about 0.1 to about 1.0 atm, about 1.0 to about 10 atm, about 10 to about 100 atm, about 100 atm to about 1,000 atm, or combinations thereof. In some embodiments, a mixture of lithium salt and acid is heated to remove a volatile acid at a temperature of about 0 degrees Celsius to about 50 degrees Celsius, about 50 degrees Celsius to about 100 degrees Celsius, about 100 degrees Celsius to about 150 degrees Celsius, about 150 degrees Celsius to about 200 degrees Celsius, about 200 degrees Celsius to about 300 degrees Celsius, about 300 degrees Celsius to about 500 degrees Celsius, or about 500 degrees Celsius to about 1,000 degrees Celsius. In some embodiments, a mixture of lithium salt and acid is heated to evaporate or distill off a volatile acid that is condensed at a temperature of about −100 degrees Celsius to about −50 degrees Celsius, −50 degrees Celsius to about 0 degrees Celsius, 0 degrees Celsius to about 50 degrees Celsius, about 50 degrees Celsius to about 100 degrees Celsius, about 100 degrees Celsius to about 150 degrees Celsius, about 150 degrees Celsius to about 200 degrees Celsius, about 200 degrees Celsius to about 300 degrees Celsius, about 300 degrees Celsius to about 500 degrees Celsius.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant optionally combines the lithium nitrate with sodium hydroxide to crystallize lithium hydroxide. The plant optionally combines the lithium nitrate with sodium carbonate to crystallize lithium carbonate. The plant optionally produces a sodium nitrate byproduct for use in agricultural fertilizer or other applications. In some cases, the ion exchange particles are ion exchange beads, ion exchange material, coated ion exchange particles, porous ion exchange material, or other material capable of absorbing lithium from a liquid resource.

An aspect of the invention described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant optionally combines the lithium nitrate with calcium hydroxide to crystallize lithium hydroxide. The plant optionally produces a calcium nitrate byproduct for use in agricultural fertilizer or other applications. In some cases, the ion exchange particles are ion exchange beads, ion exchange material, coated ion exchange particles, porous ion exchange material, or other material capable of absorbing lithium from a liquid resource.

An aspect of the invention described herein is a method for lithium production using the lithium production plants described above.

In some embodiments, nitric acid is used to elute lithium from ion exchange particles to produce a lithium nitrate eluate. In some embodiments, the lithium nitrate eluate is concentrated and then heated to produce a lithium nitrate molten salt. In some embodiments, the lithium nitrate molten salt is heated above its decomposition temperature to convert the lithium nitrate into lithium oxide and nitrogen oxide gas. In some embodiments, the nitrogen oxide gas is a mixture of nitrogen monoxide, nitrogen dioxide, oxygen, and/or other nitrogen oxide gases. In some embodiments, the lithium nitrate is heated in the presence of a catalyst to aid nitrate decomposition. In some embodiments, the nitrogen oxide gas is absorbed into an aqueous solution to form nitric acid which can be reused to elute the ion exchange particles. In some embodiments, the lithium oxide is reacted with water to form lithium hydroxide. In some embodiments, the lithium is purified to remove sodium, magnesium, calcium, boron, transition metals, or other impurities before or after the nitrate is decomposed into nitrogen oxide gas.

In some embodiments, nitric acid is used to elute lithium from ion exchange particles to produce a lithium nitrate eluate. In some embodiments, the lithium nitrate eluate is mixed with sulfuric acid. In some embodiments, the mixture of lithium nitrate and sulfuric acid is heated to distill off nitric acid, which can be condensed and reused to elute lithium from the ion exchange particles. In some embodiments, the mixture of lithium nitrate and sulfuric acid is heated to distill off nitric acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, an acid selected from the list of HF, HCl, HBr, or HI is used to elute lithium from ion exchange particles to produce a lithium halide eluate. In some embodiments, the lithium halide eluate is mixed with sulfuric acid. In some embodiments, the mixture of lithium halide and sulfuric acid is heated to distill off HF, HCl, HBr, or HI acid, which can be condensed and reused to elute lithium from the ion exchange particles. In some embodiments, the mixture of lithium halide and sulfuric acid is heated to distill off acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, nitric acid is used to elute lithium from ion exchange particles to produce a lithium nitrate eluate. In some embodiments, the lithium nitrate eluate is mixed with sodium hydroxide to crystallize a lithium hydroxide product. In some embodiments, the lithium nitrate eluate is mixed with sodium carbonate to precipitate a lithium carbonate product. In some embodiments, the lithium nitrate eluate is mixed with calcium hydroxide to precipitate a lithium hydroxide product. In some embodiments, these processes yield a sodium nitrate or calcium nitrate byproduct that can be used in agricultural fertilizer or other applications.

In some embodiments, the lithium oxide is precipitated along with other oxides such as magnesium oxide, calcium oxide, or sodium oxide. In some embodiments, the lithium oxide contains impurities and is mixed with other to form lithium hydroxide with impurities. In some embodiments, the lithium oxide contains impurities and is mixed with other to form aqueous lithium hydroxide with impurities. In some embodiments, magnesium hydroxide and calcium hydroxide impurities can be removed from a lithium hydroxide solution through filtration.

In some embodiments, the lithium salts may be aqueous, solid, or molten. In some embodiments, the lithium salts may be hydrated. In some embodiments, the lithium hydroxide may be a lithium hydroxide monohydrate powder.

In some embodiments, a lithium salt is heated in a spray dryer to form lithium solids and a volatile acidic gas. In some embodiments, lithium nitrate is decomposed in a spray dryer to form lithium oxide solids and nitrogen oxide gases. In some embodiments, a mixture of lithium nitrate and sulfuric acid is heated in a spray dryer to form lithium sulfate solids and nitric acid gas. In some embodiments, a mixture of lithium chloride and sulfuric acid is heated in a spray dryer to form lithium sulfate solids and hydrochloric acid gas.

In some embodiments, a lithium salt is decomposed in a rotary kiln to form lithium solids and a volatile acidic gas. In some embodiments, lithium nitrate is decomposed in a rotary kiln to form lithium oxide solids and nitrogen oxide gases. In some embodiments, a mixture of lithium nitrate and sulfuric acid is heated in a rotary kiln to form lithium sulfate solids and nitric acid gas. In some embodiments, a mixture of lithium chloride and sulfuric acid is heated in a rotary kiln to form lithium sulfate solids and hydrochloric acid gas.

In some embodiments, lithium hydroxide is crystallized using a series of crystallizers to remove nitrate, sodium, calcium, or other impurities from the lithium hydroxide product.

In some embodiments, nitrate byproduct is converted into a calcium nitrate substance for use in agricultural fertilizer. In some embodiments, sodium nitrate byproduct is converted into a calcium nitrate substance for use in agricultural fertilizer. In some embodiments, nitrate byproduct is converted into an ammonium calcium nitrate substance for use in agricultural fertilizer.

In some cases, a lithium salt solution is produced from an ion exchange unit and impurities are removed from the lithium salt solution before or after distillation of acidic gases. In some cases, a lithium salt solution is produced from an ion exchange unit and impurities are removed from the lithium salt solution before or after concentration of the lithium salt solution. In some cases, impurities are removed from a lithium salt solution using precipitation of hydroxides, precipitation of carbonates, ion exchange resins, or solvent extraction.

In some embodiments, a lithium salt such as lithium nitrate or lithium sulfate is dried using a continuous forced circulation crystallizer, a continuous draft tube crystallizer, a continuous cooling crystallizer, a vacuum crystallizer, a batch scraped surface evaporator, a mechanical vapor recompression system, or combinations thereof.

In some embodiments, a lithium salt such as lithium nitrate or lithium sulfate is decomposed using a batch rotary kiln, a continuous rotary kiln, a knocking system, a kiln with internal agitation, a kiln with internal milling media, a kiln with an internal impeller, an electric kiln, a gas kiln, a continuous pusher furnace, a box furnace with ceramic saggars, a continuous pusher furnace firing through box furnace on ceramic saggars, a continuous conveyer furnace, an Inconel conveyer, an air dehumidification system, a nitrogen blanket system, a catalyst, or combinations thereof. In some embodiments, a lithium salt such as lithium nitrate or lithium sulfate is decomposed using a catalyst selected from the list of platinum, platinum on activated carbon, platinum on silica, transition metal oxide, iron oxide, nickel oxide, cobalt oxide, manganese oxide, iridium, iridium on silica, platinum-copper-aluminum on silica, platinum-zinc-aluminum on silica, or combinations thereof. In some embodiments, nitrates, sulfates, or combinations thereof are decomposed through combustion of hydrogen or a hydrocarbon. In some embodiments, nitrates, sulfates, or combinations thereof are decomposed using microwave energy.

In some embodiments, nitrogen oxide gas is absorbed into a liquid scrubbing solution in a packed bed scrubber, a venturi scrubber, an ejection venturi scrubber, a spray tower, cyclone scrubbers, with addition of hydrogen peroxide into the scrubbing solution, tray columns, or combinations thereof. In some embodiments, the scrubbing solution is water, nitric acid, hydrogen peroxide, oxygen, other oxidants, or combinations thereof.

In some embodiments, sulfur oxide gas is absorbed into a liquid scrubbing solution in a packed bed scrubber, a venturi scrubber, an ejection venturi scrubber, a spray tower, cyclone scrubbers, with addition of hydrogen peroxide into the scrubbing solution, tray columns, or combinations thereof. In some embodiments, the scrubbing solution is water, sulfuric acid, hydrogen peroxide, oxygen, other oxidants, or combinations thereof.

In some embodiments, lithium oxide is converted to lithium hydroxide by addition of water using a continuous stirred tank reactor, a batch stirred tank reactor, or a plug flow reactor.

In some embodiments, sulfuric acid is added to a lithium salt solution to a concentration of over 25 wt % sulfuric acid. In some embodiments, sulfuric acid is added to a lithium salt solution using a batch agitated tank, a continuous agitated mixing tank, an injection quill direct to piping, or combinations thereof.

In some embodiments, volatile acid is removed from a salt solution using fractional distillation, air gap membrane distillation, sulfate descaling chemicals, or combinations thereof.

In some embodiments, water is removed from a salt solution using geothermal energy. In some embodiments, acid is distilled from a salt solution using geothermal energy. In some embodiments, lithium nitrate is melted using geothermal energy. In some embodiments, acid is separated from an aqueous solution using membrane distillation. In some embodiments, acid is separated from an aqueous solution using membrane distillation at temperature of around 40-90 C. In some embodiments, acid is separated from an aqueous solution using flat sheet membranes, capillary membranes, or combinations thereof. In some embodiments, acid is separated from an aqueous solution using membranes comprised of PTFE, polypropylene, PVTMS, or combinations thereof.

In some embodiments, nitric acid is distilled at a temperature of around 100 C to 140 C.

In some embodiments, trace nitrate from the nitric acid elution remains entrained in the ion exchange media and contaminates the brine. In some embodiments, nitrate is removed from the brine using ion exchange, biological remediation, or other methods of nitrate removal. In some embodiments, nitrate is removed from aqueous solution using strong base anion exchange resins, quaternary amine, triethyl amine resin, tributyl amine resin, or combinations thereof. In some embodiments, a nitrate absorbing ion exchange resin is regenerated with hydroxide, chloride, or combinations thereof.

In some embodiments, the redox potential of the ion exchange particles is controlled to minimize degradation of the ion exchange particles. In some embodiments, the redox potential of the brine is controlled to minimize degradation of the ion exchange particles. In some embodiments, the redox potential of the wash water is controlled to minimize degradation of the ion exchange particles. In some embodiments, the redox potential of the acidic solution used for elution is controlled to minimize degradation of the ion exchange particles. In some embodiments, the ion exchange particles are treated with sodium hypochlorite, sodium bisulfate, hydrogen peroxide, reductant, oxidant, or combinations thereof to control the oxidation state of metals in the ion exchange particles. In some embodiments, the ion exchange particles are treated with sodium hypochlorite, sodium bisulfate, hydrogen peroxide, reductant, oxidant, or combinations thereof to limit dissolution of metals from the ion exchange particles.

In some embodiments, the oxidation reduction potential of the brine, acidic solution, and/or wash water are controlled to minimize degradation of the ion exchange particles using additives selected from the following list: ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof. In some embodiments, the oxidation reduction potential of the brine, acidic solution, and/or wash water are controlled to minimize degradation of the ion exchange particles via sparging with gases selected from the following list: nitrogen, argon, hydrogen, carbon monoxide, carbon dioxide, air, $Cl_2$, chlorine dioxide, $O_2$, $O_3$, oxidizing gases, reducing gases, or combinations thereof. In some embodiments, the ion exchange particles are treated with ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof to control the oxidation state of metals in the ion exchange particles. In some embodiments, the ion exchange particles are treated with ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof to limit dissolution of metals from the ion exchange particles.

In some embodiments, nitric acid is used to elute lithium from ion exchange particles to produce a lithium nitrate eluate. In some embodiments, the lithium nitrate eluate is combined with sodium carbonate to crystallize lithium carbonate. In some embodiments, the sodium nitrate byproduct is mixed with sulfuric acid. In some embodiments, the mixture of sodium nitrate and sulfuric acid is heated to distill off nitric acid, which can be condensed and reused to elute lithium from the ion exchange particles. In some embodiments, the mixture of sodium nitrate and sulfuric acid is heated to distill off nitric acid leaving behind a sodium bisulfate which can be used for pH adjustments. In some embodiments, the distillation happens at around 83 C, at around 80-90 C, at around 70-100 C, at around 75-80 C, or combinations thereof. In some embodiments, distillation produces a red fuming nitric acid. In some embodiments, the red fuming nitric acid is converted to the white nitric acid at around 20 to 30 kPa. In some embodiments, the red fuming nitric acid is converted to the white nitric acid at (1) 27 kPa and (2) room temperature subsequently, or concurrently to produce less NOx.

In some embodiments, a metal carbonate form selected from the list of Na, Mg, Ca is combined with sodium carbonate to crystallize lithium carbonate. In some embodiments, the metal nitrate byproduct is mixed with sulfuric acid. In some embodiments, the mixture of metal nitrate and sulfuric acid is heated to distill off nitric acid, which can be condensed and reused to elute lithium from the ion exchange particles. In some embodiments, the mixture of metal nitrate and sulfuric acid is heated to distill off nitric acid leaving behind a metal sulfate compound.

In some embodiments the distillation columns can be composed of seven to fifteen trays. In some embodiments the reboiler uses 30-150 psig saturated steam. In some embodiment, the condenser uses 300-305K cooling water. In some embodiments the reboiler uses 10-400 psig saturated steam. In some embodiment, the condenser uses 280-330K cooling water. In some embodiments the reboiler will operate at 200-280K. In some embodiments, the trays will vary from 190-250K or 150-350K in operating temperature. In some embodiments the reflux ratio (L/D) will vary from 0.15 up to 0.85. In some embodiments the reflux ratio (L/D) will vary from 0.05 up to 3.0.

In some embodiments, the nitrate from the nitric acid elution remains entrained in the ion exchange media and contaminates the lithium depleted brine. To avoid environmental impacts, nitrates are removed from the lithium depleted brine to a concentration below about 50 mg/L prior to its release or disposal. In some embodiments, nitrate is removed from the brine via nitrate reduction or physical removal. In some embodiments, nitrate reduction methods include biological remediation or chemical denitrification. Both methods of nitrate reduction involve an electron donor reducing nitrate into nitrogen gas or ammonium via a series of redox intermediates. In some embodiments, bioremediation involves adding microorganisms capable of digesting nitrates to the lithium depleted brine. The microorganism uses enzymes to reduce nitrate into nitrogen gas or ammonium via a series of redox intermediates. In some embodiments, bioremediation is accomplished by the heterotrophic anaerobic bacterium *Paracoccus denitrificans* or the autotrophic aerobic Gram-negative bacterium *Thiobacillus denitrificans*. In some embodiments, bioremediation can occur in the form of woodchip bioreactors, electro-biochemical reactors, membrane bioreactors, or moving bed bioreactors.

Chemical remediation involves using an electron donor to reduce nitrate to nitrogen gas or ammonium via a series of redox intermediates. In some embodiments, the possible electron donors include aluminum, zinc, and iron metals, iron (ii), ammonia, hydrazine, glucose, and hydrogen in the presence of a catalyst. In some embodiments, acid is added to the lithium depleted brine to increase the reaction rate, as protons are consumed by nitrate reduction. In some embodiments, chemical nitrate reduction utilizes nanoremediation technology or permeable reactive barrier technology. In nanoremediation, nanoparticles of zerovalent metals are used reduce or adsorb nitrate from the brine. In permeable reactive barrier, the brine flows through a permeable container filled with electron donor material.

In some embodiments, the physical removal of nitrates includes ion exchange, reverse osmosis, electrodialysis, and distillation. Reverse osmosis removes salts indiscriminately using pressure through a membrane. Electrodialysis removes salts relatively indiscriminately using an applied electrical potential through an ion exchange membrane. Distillation removes salts indiscriminately by boiling the solution and collecting the water vapor. Ion exchange selectively removes nitrates from the lithium depleted brine by using anion resins to adsorb nitrates. Selective anion resins have size-selective functional groups that selectively adsorb nitrate. In some embodiments, these functional groups are tributylamine or triethylamine. Ion exchange resins must be replaced, as defined by their cycle life. Physical nitrate removal methods produce a concentrated waste solution that must be disposed of. In some embodiments, the waste solution is treated with the nitrate reduction methods outlined above.

Lithium Ion Exchange Reactor with Particle Traps

An aspect of the invention described herein is an ion exchange reactor for extracting lithium from a liquid resource. This reactor functions to contact the liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using an acid solution, and separate the particles from the acid solution. The reactor includes a provision for measuring and adjusting the pH of the liquid resource, to neutralize protons released by the ion exchange material during lithium uptake.

An aspect of the invention described herein is an ion exchange reactor for extracting lithium from a liquid resource, comprising: a) one or more tanks; b) ion exchange particles; c) one or more particle traps; and d) provision to modulate pH of the liquid resource.

An aspect of the invention described herein is a method for extracting lithium from a liquid resource, comprising: a) providing an ion exchange reactor comprising one or more particle traps; b) providing ion exchange particles in said ion exchange reactor; c) contacting said ion exchange particles in said ion exchange reactor with said liquid resource, wherein hydrogen ions from said ion exchange particles are exchanged with lithium ions from said liquid resource to produce lithium-enriched ion exchange particles in said ion exchange unit; d) removing said liquid resource from said ion exchange reactor while retaining said ion exchange particles in said ion exchange reactor using said one or more particle traps; e) washing said lithium-enriched ion exchange particles with a water solution one or more times; f) removing said water solution from said ion exchange reactor while retaining said ion exchange particles in said ion exchange reactor using said one or more particle traps; g) treating said lithium-enriched ion exchange particles with an acid solution, wherein said lithium ions from said lithium-enriched ion exchange particles are exchanged with hydrogen ions from said acid solution to produce a lithium eluate; and h) removing said lithium eluate from said ion exchange reactor while retaining said ion exchange particles in said ion exchange reactor using said one or more particle traps.

In some embodiments, the acid solution is hydrochloric acid, sulfuric acid, nitric acid, other acid, or combinations thereof. In some embodiments, the acid solution has a proton concentration less than about 10 N, less than about 3N, less than about 1N, less than about 0.3 N, less than about 0.1 N, more than about 0.05 N, more than about 0.1 N, more than about 0.2 N, more than about 0.3 N, more than about 0.4 N, more than about 0.5 N, more than about 0.75 N, more than about 1 N, more than about 2 N, more than about 3 N, more than about 4 N, more than about 5 N, more than about 6 N, more than about 7 N, more than about 8 N, more than about 9 N, from about 0.05 N to about 10 N, from about 0.1 N to about 10 N, from about 0.2 N to about 10 N, from about 0.3 N to about 10 N, from about 0.4 N to about 10 N, from about 0.5 N to about 10 N, from about 0.6 N to about 10 N, from about 0.7 N to about 10 N, from about 0.8 N to about 10 N, from about 0.9 N to about 10 N, from about 1 N to about 10 N, from about 1 N to about 9 N, from about 2 N to about 8 N, or from about 3 N to about 7 N.

In some embodiments, the lithium eluate solution contains lithium chloride, lithium sulfate, lithium nitrate, or other lithium salts. In some embodiments, the lithium eluate solution is processed to produce lithium metal, lithium carbonate, lithium hydroxide, lithium hydroxide monohydrate, lithium nitrate, lithium phosphate, lithium chloride, lithium metal, organometallic lithium, or other lithium salts.

Shaped Tanks

An aspect of the invention described herein is an ion exchange reactor for extracting lithium from liquid resources, comprising: a) a tank with a cross sectional area that is smaller at the bottom; b) ion exchange particles that are loaded into the tank; c) one or more particle traps for containing the ion exchange particles in the tank while liquid flows are removed from the tank; and d) a provision for pH modulation of the liquid resource in the tank.

In some embodiments, the ion exchange reactor comprises a tank with a cone shape. In some embodiments, the cone shape allows the ion exchange particles to settle to the bottom of the cone shape while liquid is removed from the tank above the settled bed of ion exchange particles. In some embodiments, a particle trap may have an inlet located above the settled height of the ion exchange particles. In some embodiments, the shape of the tank enables removal of liquid from above the settled bed of ion exchange particles. In some embodiments, a port is located at the bottom or near the bottom of the tank to allow a slurry comprising ion exchange particles and water to be removed from the tank or injected into the tank. In some embodiments, a filter is located at the bottom or near the bottom of the tank that allows a slurry comprising ion exchange particles and water to be dewatered. In some embodiments, a filter is located at the bottom or near the bottom of the tank that allows solutions to be injected into the tank through the filter. In some embodiments, the ion exchange reactor comprises a tank that is conical or pyramidal near the bottom. In some embodiments, the ion exchange reactor comprises a tank that is conical or pyramidal near the bottom and cylindrical or rectangular near the top.

In some embodiments, volumes of liquid resource and acid solution are loaded into the ion exchange reactor. In some embodiments, the volume of the liquid resource loaded into the ion exchange reactor is greater than the volume of the acid solution by a factor of more than about 2×, more than about 5×, more than about 10×, more than about 20×, more than about 50×, or more than about 100×. In some embodiments, the reactor tank may have a cone shape that is narrower at the bottom to facilitate mixing of ion exchange particles in the tank, to facilitate settling of the ion exchange particles, to facilitate washing of the ion exchange particles, or to facilitate separation of the ion exchange particles from liquid solutions such as liquid resource, acid solution, or washing solution.

In some embodiments, the ion exchange reactor may have a mixing device for mixing ion exchange particles with liquid resources, washing solutions, or acid elution solutions. In some embodiments, the mixing device is an overhead mixer. In some embodiments, the mixing device is a propeller that circulates brine throughout the tank. In some embodiments, the mixing device is a propeller that lifts a slurry of ion exchange particles off the bottom of the tank. In some embodiments, the ion exchange reactor may have one or more mixing devices. In some embodiments, the mixing device is a pump that injects solution into the tank, thereby agitating a bed of ion exchange particles. In some embodiments, the mixing device is a pump that injects solution into the tank, thereby fluidizing or suspending ion exchange particles in solution. In some embodiments, the ion exchange particles are mixed in a solution by pumping a slurry from near the bottom of the tank and injecting said slurry into a higher level of the tank. In some embodiments, the fluidized ion exchange material is mixed by pumping it into and/or out of the tank with no filtration. In some embodiments, the tank of the ion exchange reactor is fitted with one or more sprayers that wash the ion exchange particles off the sides of the tank and move them to the bottom of the tank. In some embodiments, the ion exchange reactor is equipped with baffles. In some embodiments, one or more tanks are equipped with baffles. In some embodiments, one or more tanks are equipped with baffles to improve mixing of the ion exchange particles with brine, water, acid, or other solutions.

In some embodiments, the tank of the ion exchange reactor is rectangular, cylindrical, conical, spherical, parallelogram, rhombohedral, pyramidal, or combinations thereof.

Filters

In some embodiments, the particle trap is a filter. In some embodiments, the filter is operated as a cake filter. In some embodiments, the filter is operated to limit formation of a filter cake. In some embodiments, the filter is operated with sheer flow. In some embodiments, the filter is operated with backwashing.

In some embodiments, the filter comprises a polymer, a porous polymer, a polymer mesh, or a polymer composite. In some embodiments, the filter comprises a woven polymer or a polymer fabric. In some embodiments, the filter is comprised of polypropylene, polyetheretherketone (PEEK), polyvinylidene difluoride (PVDF), polysulfone, polyethylene, nylon, or another polymer material. In some embodiments, the filter comprises a ceramic, metal, or alloy material. In some embodiments, the filter comprises a polymer, polyaryl ether ketone, polyethylene terephthalate, ethylene tetrafluoroethylene, a hydrophilic polymer, a hydrophobic polymer, a co-polymer, a block-copolymer, or combinations thereof. In some embodiments, the filter comprises a steel or other metallic mesh coated with polymer. In some embodiments, the filter comprises a stainless steel mesh coated with polymer. In some embodiments, the filter comprises a 304 stainless steel mesh coated with polymer. In some embodiments, the coating on the steel mesh comprises an epoxy, a silicone, a chloro-polymer, a fluor-polymer, a chloro-fluoro-polymer, polypropylene, polyetheretherketone (PEEK), polyvinylidene difluoride (PVDF), polysulfone, polyethylene, a thermal cure epoxy, an air dry epoxy, a phenolic epoxy, a phenolic polymer, polytetrafluoroethylene, fluorinated ethylene propylene, a ceramic-epoxy composite coating, ethylene chlorotrifluoroethylene, other polymers combinations thereof, or copolymers thereof. In some embodiments, the mesh comprises an epoxy, a silicone, a chloro-polymer, a fluor-polymer, a chloro-fluoro-polymer, polypropylene, polyetheretherketone (PEEK), polyvinylidene difluoride (PVDF), polysulfone, polyethylene, a thermal cure epoxy, an air dry epoxy, a phenolic epoxy, a phenolic polymer, polytetrafluoroethylene, fluorinated ethylene propylene, a ceramic-epoxy composite coating, ethylene chlorotrifluoroethylene, other polymers combinations thereof, or copolymers thereof. In some embodiments, the filter comprises a mesh comprising polyetheretherketone. In some embodiments, the mesh has a pore size of less than about 200 microns, less than about 100 microns, less than about 50 microns, less than about 25 microns, less than about 10 microns, less than about 2 microns, greater than about 200 microns, or greater than about 400 microns. In some embodiments, a mesh is a woven polymer or a polymer fabric. In some embodiments, the filter is a mesh with a weave that is plain weave, twill weave, plain dutch weave, twill dutch weave, or combinations thereof. In some embodiments, the filter comprises a stainless steel mesh. In some embodiments, the filter comprises a stainless steel mesh coated to improve acid resistance with a material such as nickel, a nickel alloy, an oxide, or another acid-resistant material. In some embodiments, the filter comprises polyamide, aromatic polyamide, polyvinylamine, polypyrrolidine, polyfuran, polyethersulfone, polysulfone, polypiperzine-amide, polybenzimidazoline, polyoxadiazoline, acetylated cellulose, cellulose, a polymer with alternative functionalization of sulfonation, carboxylation, phosphorylation, or combinations thereof, other polymeric layer, or combinations thereof. In some embodiments, the filter further comprises a fabric, polymeric, composite, or metal support. In some embodiments, the filter comprises a metal material coated with oxide, epoxy, polymeric material, or combinations thereof that imbue chemical resistance.

In some embodiments of the filter, the filters are weaved of monofilament or multifilament strands of material. In some embodiments the weave of the filter fabric is plain square, plain twilled, plain dutch, twilled dutch, reverse dutch, duplex dutch, betamesh dutch, basket weaved, or combinations thereof.

In some embodiments of the ion exchange reactor, the filter is located inside the tank, outside the tank (external to the tank), or is mounted in one or more ports through the wall of the tank. In some embodiments, the filter is a planar filter, a tubular filter, a hollow fiber tube filter, a cartridge filter, Scheibler filter, Vallex filter, Sweetland filter, horizontal leaf filter, centrifugal discharge filter, compression filter, Nutsche filter, or a candle filter. In some embodiments, the ion exchange reactor may have more than about one, more than about 5, more than about 20, or more than about 100 filters. In some embodiments, a rotary fan press is used to separate liquid solution from a slurry comprising a liquid solution and ion exchange particles.

In some embodiments, the filters are in the tank. In some embodiments, the filters are mounted in the tank at different heights. In some embodiments, the filters are mounted in a port or flange in the tank wall. In some embodiments, one or more filters is mounted at the bottom of one or more tanks. In some embodiments, one or more filters is mounted at the bottom of one or more columns that are mounted at the bottom of one or more tanks. In some embodiments, the filters are approximately flush with the tank wall. In some embodiments with multiple filters, the filters near the top of the tank are used while ion exchange particles are allowed to settle to the bottom of the tank under the force of gravity. In some embodiments, the filters near the bottom of the tank are used after the ion exchange particles have substantially settled. In some embodiments, filters are arranged vertically or horizontally. In some embodiments, filters form an array inside the volume or along the sides of the tank. In some embodiments, multiple filters are used in series or parallel. In some embodiments, multiple filters are used in series with varying pore size. In some embodiments, a filter comprises a smaller mesh mounted on a larger mesh where the smaller mesh blocks ion exchange particles and the larger mesh provides strength to support the smaller mesh.

In some embodiments, liquid resources, acid solutions, or washing solutions are removed from the tank through the filters. In some embodiments, the acid solutions are removed from the tank through filters near the bottom of the tank. In some embodiments, liquid resources are removed from the tank through filters near the top, middle, and bottom of the tank. In some embodiments, washing solutions are removed from the tank through filters near the top, middle, and bottom of the tank.

In some embodiments, broken filters, or filters that no longer operate within acceptable range of their original specifications, are replaced during operation of the ion exchange reactor or upon pausing operation of the ion exchange reactor. In some embodiments, multiple candle filters are inserted into the tank and when a filter fails, pumping through the filter is suspended while pumping through the other filters is maintained. In some embodiments, a presence of ion exchange particles in a tube or pipe connected to a filter is used to detect failure of the filter. In some embodiments, one or more pressure sensors are used to detect failure of a filter, particle trap, solid-liquid separation apparatus, or combinations thereof.

In some embodiments, the ion exchange material is contained in a compartment with filters that allow permeation of liquid solutions into the compartment. In some embodiments, the ion exchange material is contained in a rotating compartment. In some embodiments, the compartment may have baffled or other fixtures designed to guide liquid solutions through the compartment. In some embodiments, the reactor is a rotating bed reactor.

In some embodiments, the filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, or a pusher centrifuge. In some embodiments, the filter may use a scroll or a vibrating device. In some embodiments, the filter is horizontal, vertical, or may use a siphon.

In some embodiments, a filter cake is prevented, limited, or removed by using gravity, centrifugal force, an electric field, vibration, brushes, liquid jets, scrapers, intermittent reverse flow, vibration, crow-flow filtration, or pumping suspensions across the surface of the filter. In some embodiments, the slurry of ion exchange particles and liquid is moved tangentially to the filter to limit cake growth. In some embodiments, gravitational, magnetic, centrifugal sedimentation, or other means of solid-liquid separation are used before, during, or after filtering to prevent cake formation.

In some embodiments, a filter comprises a screen, a metal screen, a sieve, a sieve bend, a bent sieve, a high frequency electromagnetic screen, a resonance screen, or combinations thereof.

In some embodiments, a deep bed filter is used to remove ion exchange particles from a liquid resource stream before it is reinjected into the ground.

Other Particle Traps

In some embodiments, one or more particle traps are a solid-liquid separation apparatus.

In some embodiments of the ion exchange reactor, one or more particle traps are external particle traps located externally to the tank. In some embodiments, a dilute slurry is removed from the tank, transferred to an external particle trap, and separated into a concentrated slurry and a solution with low or no suspended solids. In some embodiments, the concentrated slurry is returned to the tank or transferred to a different tank. In some embodiments, ion exchange particles are transferred from a brine tank to another brine tank, from an acid tank to another acid tank, from a washing tank to another washing tank, from a brine tank to a washing tank, from a washing tank to an acid tank, from an acid tank to a washing tank, or from an acid tank to a brine tank.

In some embodiments, the particle traps may use gravitational sedimentation. In some embodiments, the particle traps may include a settling tank, a thickener, a clarifier, a gravity thickener. In some embodiments, the particle traps are operated in batch mode, semi-batch mode, semi-continuous mode, or continuous mode. In some embodiments, the particle traps include a circular basin thickener with slurry entering through a central inlet such that the slurry is dispersed into the thickener with one or more raking components that rotate and concentrate the ion exchange particles into a zone where the particles can leave through the bottom of the thickener.

In some embodiments, the particle traps include a deep cone, a deep cone tank, a deep cone compression tank, or a tank wherein the slurry is compacted by weight. In some embodiments, the particle traps include a tray thickener with a series of thickeners oriented vertically with a center axle and raking components. In some embodiments, the particle traps include a lamella type thickener with inclined plates or tubes that may be smooth, flat, rough, or corrugated. In some embodiments, the particle traps include a gravity clarifier that may be a rectangular basin with feed at one end and overflow at the opposite end optionally with paddles and/or a chain mechanism to move particles.

In some embodiments, the particle traps use centrifugal sedimentation. In some embodiments, the particle traps may include a tubular centrifuge, a multi-chamber centrifuge, a conical basket centrifuge, a scroll-type centrifuge, a sedimenting centrifuge, or a disc centrifuge. In some embodiments, particles are discharged continuously or intermittently from the centrifuge. In some embodiments, the particle trap is a hydrocyclone. In some embodiments, the particle trap is an array of hydrocyclones or centrifuges in series and/or in parallel. In some embodiments, sumps are used to reslurry the ion exchange particles. In some embodiments, the hydrocyclones may have multiple feed points. In some embodiments, a hydrocyclone is used upside down. In some embodiments, liquid is injected near the apex of the cone of a hydrocyclone to improve sharpness of cut. In some embodiments, a weir rotates in the center of the particle trap with a feed of slurried ion exchange particles entering near the middle of the particle trap, and ion exchange particles get trapped at the bottom and center of the particle trap due to a "teacup effect".

In some embodiments, the particle trap may use magnetic separation. In some embodiments, the ion exchange particles are magnetic. In some embodiments, acid resistant magnetic particles such as $SiO_2$-coated magnetite or other coated or uncoated magnetic materials are attached to the surface of the ion exchange particles to enable magnetic separation.

In some embodiments, the particle trap is a collection of particle traps with similar or different mechanisms. In some embodiments, particle traps based on gravity, magnetism, centrifugal forces, or combinations thereof are located inside or outside the tank of the ion exchange reactor.

In some embodiments, the ion exchange particles are washed using counter-current flows of the ion exchange particles and a washing liquid. In some embodiments, the ion exchange particles are treated with brine or acid liquids using counter-current flows of the ion exchange particles and the liquids. In some embodiments, the counter-current washing of solids is performed using a series of particle traps or separators. In some embodiments, and additional particle trap or separator is located at the end of the liquid flow of the counter-current circuit to limit loss of particles. In some embodiments, counter-current washing is used to minimize use of fresh water.

Staged Flows

An aspect of the invention described herein is a staged ion exchange reactor for extracting lithium from liquid resources, comprising: a) a tank containing ion exchange particles with associated particle traps; b) one or more tanks containing brine at various stages of delithiation; and c) one or more tanks containing acid at various stages of lithiation.

An aspect of the invention described herein is a staged ion exchange reactor for extracting lithium from liquid resources, comprising: a) a tank containing ion exchange particles with associated particle traps; and b) one or more tanks containing brine at various stages of delithiation.

An aspect of the invention described herein is a staged ion exchange reactor for extracting lithium from liquid resources, comprising: a) a tank containing ion exchange particles with associated particle traps; and b) one or more tanks containing acid at various stages of lithiation.

In some embodiments, the staged ion exchange reactor contacts ion exchange particles that are saturated with hydrogen in contact with brine that is partially delithiated to maximize lithium recovery from the brine. In some embodiments, the staged ion exchange reactor contacts ion exchange particles that are saturated with lithium in contact with acid that is partially lithiated to maximize conversion of protons in the acid to lithium ions.

In some embodiments, the staged ion exchange reactor contacts ion exchange particles that are nearly saturated with lithium in contact with fresh brine to fully saturated the ion exchange particles with lithium and maximize lithium uptake by the particles. In some embodiments, the staged ion exchange reactor contacts ion exchange particles that are nearly saturated with protons in contact with fresh acid to fully saturated the ion exchange particles with protons and maximize lithium elution from the particles.

Interchange Network

In some embodiments, a plurality of ion exchange reactors are joined to form an interchange network comprising brine circuits, washing circuits, or acid circuits. In some embodiments of the brine circuit, brine flows through a first reactor in the brine circuit, then into a next reactor in the brine circuit, and so on, such that lithium is removed from the brine as the brine flows through one or more reactors. In some embodiments of the acid circuit, acid flows through a first reactor in the acid circuit, then into the next reactor in the acid circuit, and so on, such that lithium is eluted from the columns with acid to produce a lithium eluate. In some embodiments of the water washing circuit, water flows through a first reactor in the water washing circuit, then optionally into a next reactor in the water washing circuit, and so on, such that residual brine or other impurities are washed out. In some embodiments, particle traps are used to retain ion exchange particles within individual reactors in a circuit. In some embodiments, particle traps are used to move ion exchange particles in a counter-current direction through a series of reactors within the brine, washing, and/or acid circuits, or to move ion exchange particles between the different circuits.

In some embodiments of the interchange network, ion exchange reactors are interchanged between the brine circuit, the water washing circuit, and the acid circuit. In some embodiments, the first reactor in the brine circuit is loaded with lithium and then interchanged into the water washing circuit to remove residual brine. In some embodiments, the first reactor in the water washing circuit is washed to remove residual brine, and then interchanged to the acid circuit, where lithium is eluted with acid to form a lithium eluate. In some embodiments, the first reactor in the acid circuit is eluted with acid and then interchanged into the brine circuit to absorb lithium from the brine. In some embodiments, two water washing circuits are used to wash the reactors after both the brine circuit and the acid circuit. In some embodiments of the reactor interchange system, only one water washing circuit is used to wash the columns after the brine circuit, whereas excess acid is neutralized with base or washed out of the reactors in the brine circuit.

In some embodiments of the interchange network, the first reactor in the brine circuit is interchanged to become the last reactor in the water washing circuit. In some embodiments, the first reactor in the water washing circuit is interchanged to become the last reactor in the acid circuit. In some embodiments, the first reactor in the acid circuit is interchanged to become the last reactor in the brine circuit or the last reactor in a water washing circuit for acid removal.

Other Aspects

In some embodiments, flows of brine through the reactor are operated in batch, semi-batch, semi-continuous, or continuous modes of operation. In some embodiments, flows of washing solution through the reactor are operated in batch, semi-continuous, or continuous modes of operation. In some embodiments, flows of acid solution through the reactor are operated in batch, semi-continuous, or continuous modes of operation. In some embodiments, ion exchange particles are moved between a plurality of reactors. In some embodiments, ion exchange particles are moved between a plurality of reactors in an opposite direction to the flows of brine, washing solution, and acid.

In some embodiments, air pumps, water pumps, or vacuum pumps are used to move water, brine, acid, slurries, or other solutions. In some embodiments, a vacuum system is used to move water, brine, acid, slurries, or other solutions. In some embodiments, one or more tanks, columns, or other vessels are pressurized to move water, brine, acid, slurries, or other solutions. In some embodiments, one or more tanks, columns, or other vessels are pressurized to move water, brine, acid, or other solutions through a filter, particle trap, or other solid-liquid separation apparatus. In some embodiments, a vacuum is applied to filters in contact with the ion exchange material/fluid suspension to suck fluid out of the reactor while leaving the ion exchange material inside the reactor. In some embodiments, a vacuum valve is installed approximately 6 inches from the filter inside the line which is closed when the filter is to be backwashed. In some embodiments, a vacuum valve is installed approximately 4 inches from the filter inside the line which is closed when the filter is to be backwashed. In some embodiments, a vacuum valve is installed approximately 8 inches from the filter inside the line which is closed when the filter is to be backwashed. In some embodiments, for backwashing, pressurized air is pumped through the filter to break up the cake on the other side of the filter. In some embodiments, to resume filtering of the fluid from the suspension, the vacuum valve is opened again to re-expose the filter to vacuum. In some embodiments, a series of vacuum valves are used to minimize loss of vacuum from the vacuum/drainage lines.

In some embodiments, a washing solution is used to remove residual brine, residual acid, or other impurities from the ion exchange particles. In some embodiments, the washing solution is water, water with pH adjusted, an aqueous solution, or a non-aqueous solution. In some embodiments, ion exchange particles are removed from the tank and loaded into a column where they are washed. In some embodiments, ion exchange particles are removed from the tank and loaded into a column where they are washed to remove residual brine. In some embodiments, ion exchange particles are removed from the tank and loaded into a column where they are washed to remove residual acid. In some embodiments, the ion exchange particle form a packed bed, a settled bed, a fluidized bed, or combinations thereof. In some embodiments, the ion exchange particles are moved between a tank and a column. In some embodiments, the ion exchange particles are moved between a tank where they are fluidized and a column where they form a packed or settled bed. In some embodiments, one or more columns are directly attached to one or more tanks. In some embodiments, one or more columns are mounted at the bottom of one or more tanks so the ion exchange particles can settle from the tank into the column. In some embodiments, one or more columns are mounted at the bottom of one or more cone-bottom tanks so the ion exchange particles can settle from the tank into the column. In some embodiments, one or more columns are mounted at the bottom of one or more tanks so the ion exchange particles can settle from the tank into the column under the force of gravity and or with the flow of solution.

In some embodiments, a washing solution containing EDTA, disodium EDTA, or other anti-scalants is used to remove $CaSO_4$, $MgSO_4$, $SrSO_4$, $BaSO_4$, $MgCO_3$, $CaCO_3$, $BaCO_3$, $SrCO_3$, sulfate scale, carbonate scale, or other scale from the ion exchange reactor. In some embodiments, an anti-scalants wash is performed before or after each brine, water, or acid treatment. In some embodiments, an anti-scalants wash is performed after a number of ion exchange cycles that is less than about 10, less than about 50, or less than about 200.

In some embodiments, ion exchange particles are replaced from the reactor after the performance of these ion exchange particles has degraded in terms of lithium uptake capacity, lithium selectivity, lithium uptake kinetics, chemical stability, or mechanical stability. In some embodiments, ion exchange particles are replaced in one or more ion exchange reactors in a network of ion exchange reactors with minimal disruption to operations.

In some embodiments, base is added to the ion exchange reactor before, during, or after lithium uptake from a liquid resource. In some embodiments base is added as a solution, as an aqueous solution, as a component of a slurry, or as a solid. Base serves to neutralize protons release by the ion exchange material and maintain the pH of the liquid resource in a range of about 5-7, about 3-8, or about 1-9.

In some embodiments, the ion exchange reactor has a plunger, piston, or other mechanical device that compacts the ion exchange particles onto a filter while forcing liquid solution through the filter. In some embodiments, the ion exchange reactor is pressurized to force fluid through the filter at a higher rate. In some embodiments, a vacuum is used on the effluent side of the filter to promote higher filtration rates.

In some embodiments, flows of liquid resource, washing solution, or acid solution are recirculated through an ion exchange reactor. In some embodiments, recirculation of brine from the bottom of the reactor serves to create a fluidized bed, or partially fluidized bed, of ion exchange particles. In some embodiments, flows of acid, brine, water, or other solutions are injected at the bottom of the tank to fluidize or suspend ion exchange particles from the bottom of the tank. In some embodiments, flows of acid, brine, water, or other solutions are injected at the bottom of the tank and removed at the top of the tank. In some embodiments, flows of acid, brine, water, or other solutions are moved as part of a network of reactors and are injected at the bottom of the tank to fluidize or suspend ion exchange particles from the bottom of the tank. In some embodiments, flows of acid, brine, water, or other solutions are moved as part of a network of continuously-operated or semi-continuously-operated reactors and are injected at the bottom of the tank to fluidize or suspend ion exchange particles from the bottom of the tank.

In some embodiments, the ion exchange reactor is equipped with a spraying system to wash ion exchange particles off the internal surfaces of the tank and move the ion exchange particles to the bottom of the tank.

In some embodiments, lithium is eluted from the ion exchange particles using acid that is added all at once, titrated in various aliquots of similar or different concentrations. In some embodiments, lithium elution from the ion exchange particles are monitored or controlled using pH measurement and acid titration. In some embodiments, acid is added to a slurry comprising water and ion exchange particles, and the acid concentration added to the slurry is higher than the final acid concentration of the slurry after the acid is added.

In some embodiments, pH changes in the brine, acid, or water solutions are monitored to determine timing of lithium uptake, lithium elution, or washing processes.

In some embodiments, ion exchange particles are added or removed at the top or bottom of a tank or column in the ion exchange reactor. In some embodiments, brine, water, or acid solutions are added or removed at the top or bottom of a tank or column in the ion exchange reactor. In some embodiments, ion exchange particles are added to the top of a tank or column in the ion exchange reactor and may settled to the bottom. In some embodiments, ion exchange particles are added to the top of a tank or column in the ion exchange reactor and may settled to the bottom as brine moves upwards through the tank or column. In some embodiments, ion exchange particles are added to the top of a tank or column in the ion exchange reactor and may settle to the bottom at a rate that is controlled by the upward flow of brine, water, or acid solutions that are added at the bottom of the column and removed from the top of the column.

In some embodiments, the tank is comprised of a material that is a polymer, a metal, a ceramic, an alloy, stainless steel, a plastic-lined alloy, an oxide-lined alloy, fiberglass, composite materials, or combinations thereof. In some embodiments, the tank is comprised of PVDF, PE, PP, PVC, PTFE, other acid-resistant materials, or combinations thereof.

In some embodiments, the pH of the brine resource decreases when the brine resource is contacted with ion exchange particles due to lithium uptake and proton release by the ion exchange particles. In some embodiments, base is added to the liquid resource to control the pH in the range of about 5-7, about 4-8, or about 1-9. In some embodiments, the base is added as a solid, as a slurry, as a liquid solution, or as an aqueous solution. In some embodiments, the base may comprise CaO, $Ca(OH)_2$, $Mg(OH)_2$, NaOH, KOH, $Sr(OH)_2$, $Ba(OH)_2$, or combinations thereof.

In some embodiments of the ion exchange reactor or reactor system, flocculants are used to aid sedimentation or separation.

Ion Exchange Particles

In some embodiments, ion exchange particles are coated or uncoated ion exchange particles. In some embodiments, the ion exchange particles comprise an ion exchange material selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3 \cdot yH_2O$, $SnO_2.xSb_2O_5.yH_2O$, $TiO_2.xSb_2O_5.yH_2O$, solid solutions thereof, and combinations thereof. In some embodiments, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In some embodiments, the ion exchange particles have a coating that comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material comprises $TiO_2$, $ZrO_2$, $SiO_2$, $Li_2TiO_3$, $Li_2ZrO_3$, $Li_2MnO_3$, $ZrSiO_4$, $LiNbO_3$, or combinations thereof.

In some embodiments, the ion exchange particles are porous, non-porous, or composites. In some embodiments, the ion exchange particles are comprised of coated or uncoated ion exchange material embedded in a matrix. In some embodiments, the matrix is PVDF, polystyrene, other acid resistant polymer, ceramic binder, silica binder, or combinations thereof.

In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

In a further aspect, an ion exchange material is formed into a porous bead or porous material using a porous matrix material. In a further aspect, a porous matrix material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a porous matrix material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a porous matrix material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a porous matrix material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

Liquid Resource

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from sediments, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, organic molecules, iron, certain metals, or other chemical or ionic species. In some embodiments, the liquid resource is optionally fed into the ion exchange reactor without any pre-treatment following from its source. In some embodiments, the liquid resource is injected into a reservoir, salt lake, salt flat, basin, or other geologic deposit after lithium has been removed from the liquid resource. In some embodiments, other species are recovered from the liquid resource before or after lithium recovery. In some embodiments, the pH of the liquid resource is adjusted before, during, or after lithium recovery.

Eluate Processing

In some embodiments, the lithium eluate solution that is yielded from the ion exchange reactor is further processed into lithium chemicals selected from the following list: lithium sulfate, lithium chloride, lithium carbonate, lithium phosphate, lithium hydroxide, lithium metal, lithium metal oxide, lithium metal phosphate, lithium sulfide, or combinations thereof. In some embodiments, the lithium eluate solution that is yielded from the ion exchange reactor is further processed into lithium chemicals that are solid, aqueous, liquid, slurry form, hydrated, or anhydrous.

In some embodiments, the lithium eluate solution that is yielded from the ion exchange reactor is further processed using acid recovery, acid recycling, acid regeneration, distillation, reverse osmosis, evaporation, purification, chemical precipitation, membrane electrolysis, or combinations thereof.

In some embodiments, the lithium eluate is purified using hydroxide precipitation, carbonate precipitation, other precipitate, ion exchange, solvent extraction, and/or other extraction methods to remove divalent ions, multivalent ions, boron, or other chemical species. In some embodiments, the lithium eluate is concentrated using reverse osmosis, mechanical evaporation, mechanical vapor recompression, solar thermal heating, concentrated solar thermal heating, and/or solar evaporation.

In some embodiments, a lithium eluate is processed into a lithium stream that is treated with sodium carbonate to precipitate lithium carbonate. In some embodiments, a lithium chloride stream is treated with sodium carbonate to precipitate lithium carbonate. In some embodiments, a lithium sulfate stream is treated with sodium carbonate to precipitate lithium carbonate. In some embodiments, a lithium nitrate stream is treated with sodium carbonate to precipitate lithium carbonate.

In some embodiments, a lithium eluate is processed into a lithium stream that is treated with sodium hydroxide to crystallize a lithium hydroxide product. In some embodiments, a lithium sulfate stream is treated with sodium hydroxide to crystallize a lithium hydroxide product. In some embodiments, a lithium chloride stream is treated with sodium hydroxide to crystallize a lithium hydroxide product. In some embodiments, a lithium nitrate stream is treated with sodium hydroxide to crystallize a lithium hydroxide product.

Methods

An aspect of the invention described herein is a method of generating a lithium eluate solution from a liquid resource, comprising: providing an ion exchange reactor comprising a tank, ion exchange particles that selectively absorb lithium from a liquid resource and elute a lithium eluate solution when treated with an acid solution after absorbing lithium ions from said liquid resource, one or more particle traps, and provision to modulate pH of said liquid resource; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, the tank has a conical shape. In some embodiments, the tank has a partial conical shape. In some embodiments, the conical shape allows the ion exchange particles to settle into a settled bed so that liquid can be removed from above the settled bed. In some embodiments, the partial conical shape allows the ion exchange particles to settle into a settled bed so that liquid can be removed from above the settled bed.

In some embodiments, modulation of the pH of the liquid resource occurs in the tank. In some embodiment, modulation of the pH of the liquid resource occurs prior to injection into the tank. In some embodiments, one or more particle traps comprise one or more filters inside the tank. In some embodiments, one or more particle traps comprise one filter. In some embodiments, one or more particle traps comprise one filter. In some embodiments, one or more particle traps comprise two filters. In some embodiments, one or more particle traps comprise three filters. In some embodiments, one or more particle traps comprise four filters. In some embodiments, one or more particle traps comprise five filters.

In some embodiments, one or more particle traps is located at the bottom of the tank. In some embodiments, one or more particle traps is located close to the bottom of the tank. In some embodiments, one or more particle traps is located above the bottom of the tank.

In some embodiments, one or more particle traps comprise one or more meshes. In some embodiments, one or more particle traps comprises one mesh. In some embodiments, one or more particle traps comprises two meshes. In some embodiments, one or more particle traps comprises three meshes. In some embodiments, one or more particle traps comprises four meshes. In some embodiments, one or more particle traps comprises five meshes. In some embodiments, all the meshes of the one or more particle traps are identical. In some embodiments, at least one of the meshes of the one or more particle traps is not identical to the rest of the meshes of the one or more particle traps.

In some embodiments, one or more meshes comprise a pore space of less than about 200 microns, less than about 175 microns, less than about 150 microns, less than about 100 microns, less than about 75 microns, less than about 50 microns, less than about 25 microns, less than about 10 microns, more than about 1 micron, more than about 5 micron, more than about 10 microns, more than about 20 microns, more than about 30 microns, more than about 40 microns, more than about 50 microns, more than about 60 microns, more than about 70 microns, more than about 80 microns, more than about 90 microns, more than about 100 microns, more than about 125 microns, more than about 150 microns, more than about 175 microns from about 1 micron to about 200 microns, from about 5 microns to about 175 microns, from about 10 microns to about 150 microns, from about 10 microns to about 100 microns, from about 10 microns to about 90 microns, from about 10 microns to about 80 microns, from about 10 microns to about 70 microns, from about 10 microns to about 60 microns, or from about 10 microns to about 50 microns.

In some embodiments, one or more particle traps comprise multi-layered meshes. In some embodiments, the multi-layered meshes comprise at least one finer mesh for filtration and at least one coarser mesh for structural support. In some embodiments, one or more particle traps comprise one or more meshes supported by a structural support. In some embodiments, one or more particle traps comprise one or more polymer meshes. In some embodiments, the one or more polymer meshes are selected from the group consisting of polyetheretherketone, ethylene tetrafluorethylene, polyethylene terephthalate, polypropylene, and combinations thereof.

In some embodiments, one or more particle traps comprise one or more meshes comprising a metal wire mesh. In some embodiments, the metal wire mesh is coated with a polymer. In some embodiments, the ion exchange reactor is configured to move said ion exchange particles into one or more columns for washing. In some embodiments, the ion exchange reactor is configured to allow the ion exchange particles to settle into one or more columns for washing. In some embodiments, the columns are affixed to the bottom of said tank. In some embodiments, the one or more particle traps comprise one or more filters mounted in one or more ports through the wall of said tank.

In some embodiments, the one or more particle traps comprise one or more filters external to said tank, and with provision for fluid communication between said one or more filters and said tank. In some embodiments, the one or more particle traps comprise one or more gravity sedimentation devices external to said tank, and with provision for fluid communication between said one or more gravity sedimentation devices and said tank.

In some embodiments, one or more particle traps comprise one or more gravity sedimentation devices internal to said tank. In some embodiments, one or more particle traps comprise one or more centrifugal sedimentation devices external to said tank, and with provision for fluid communication between said one or more centrifugal sedimentation devices and said tank In some embodiments, one or more particle traps comprise one or more centrifugal sedimentation devices internal to said tank. In some embodiments, one or more particle traps comprise one or more settling tanks, one or more centrifugal devices, or combinations thereof external to said tank, and with provision for fluid communication between said one or more settling tanks, centrifugal devices, or combinations thereof, and said tank. In some embodiments, one or more particle traps comprise one or more meshes, one or more centrifugal devices, or combinations thereof external to said tank, and with provision for fluid communication between said one or more meshes, centrifugal devices, or combinations thereof, and said tank. In some embodiments, one or more particle traps comprise one or more settling tanks, one or more meshes, or combinations thereof external to said tank, and with provision for fluid communication between said one or more settling tanks, meshes, or combinations thereof, and said tank. In some embodiments, one or more particle traps comprise one or more meshes, one or more settling tanks, one or more centrifugal devices, or combinations thereof external to said tank, and with provision for fluid communication between said one or more meshes, one or more settling tanks, centrifugal devices, or combinations thereof, and said tank.

In some embodiments, the ion exchange particles are stirred. In some embodiments, the ion exchange particles are stirred by a mixer. In some embodiments, the ion exchange particles are stirred by a propeller. In some embodiments, the ion exchange particles are fluidized by pumping solution into the tank near the bottom of the tank. In some embodiments, the ion exchange particles are fluidized by pumping solution from the tank back into the tank near the bottom of the tank. In some embodiments, the ion exchange particles are fluidized by pumping a slurry of the ion exchange particles from near the bottom of the tank to a higher level in the tank.

In some embodiments, the method further comprises one or more staged elution tanks, wherein intermediate eluate solutions comprising mixtures of protons and lithium ions are stored and used further to elute lithium from said ion exchange particles that are freshly lithiated. In some embodiments, the method further comprises one or more staged elution tanks, wherein intermediate eluate solutions comprising mixtures of protons and lithium ions are mixed with additional acid and used further to elute lithium from said ion exchange particles.

In some embodiments, the ion exchange particles further comprise a coating material. In some embodiments, the coating material is a polymer. In some embodiments, the coating of the coating material comprises a chloro-polymer, a fluoro-polymer, a chloro-fluoro-polymer, a hydrophilic polymer, a hydrophobic polymer, co-polymers thereof, mixtures thereof, or combinations thereof.

EXAMPLES

Example 1: Lithium Production Using Nitric Acid with Lithium Nitrate Decomposition Lithium is extracted from a brine using coated ion exchange particles. The brine is an aqueous solution containing 80,000 mg/L Na, 10,000 mg/L Ca, 5,000 mg/L Mg, and 400 ppm Li. The coated ion exchange particles are comprised of an ion exchange material and a coating material. The ion exchange material is $Li_2TiO_3$ and the coating material is $ZrO_2$. The particles are comprised of 96 wt. % active material and 4 wt. % of coating material. The particles have a mean diameter of 30 microns, and the coating thickness is approximately 100 nm. The particles are created by first synthesizing $Li_2TiO_3$ via a solid state method and then the coating is deposited on the surface of the $Li_2TiO_3$ using Zr(IV) propoxide as a precursor.

The ion exchange particles are loaded into an ion exchange reactor. The ion exchange reactor comprises a conical tank, a PEEK 12 um mesh mounted on a flange at an opening in the tank wall so that the mesh is approximately flush with the tank wall fitted to a PVC tube to allow fluid to flow into and out of the tank through the mesh while the ion exchange particles and retained inside the tank, an overhead stirrer, a pH controller, and a spraying system at the top of the tank with one or more nozzles positioned to spray water to wash ion exchange particles off the sides of the tank and down to the bottom of the tank.

The particles are loaded into the tank in an aqueous slurry. 3N $HNO_3$ acid is pumped into the tank through the PEEK mesh to create a slurry with $HNO_3$ at a normality of 2N. The acid is stirred with the ion exchange particle to yield $LiNO_3$ in solution. During acid treatment, the particles absorb hydrogen while releasing lithium. The $Li_2TiO_3$ active material is converted to a protonated state with a hydrogen-enriched composition. The $ZrO_2$ coating allows diffusion of hydrogen and lithium respectively to and from the active material while providing a protective barrier that limits dissolution of titanium and oxygen from the active material. After 40 minutes, the eluate solution is collected from the tank through the PEEK mesh while the ion exchange particles are retained in the tank.

After treatment in acid, the protonated particles are treated with brine wherein the particles absorb lithium while releasing hydrogen. The brine is pumped into the tank through the PEEK mesh. The particles are converted from a protonated state to a lithiated state with a lithium-enriched composition. An aqueous solution of NaOH is added to the tank to maintain the pH of the brine at 6. After 4 hours, the spent brine is removed from the tank through the PEEK mesh. The ion exchange particles are then washed with water through the spraying system. The particles are washed three times with water, and the water is drained from the tank through the PEEK mesh, leaving an aqueous slurry of the ion exchange particles at the bottom of the tank.

The lithiated material is then treated again with acid to yield lithium in solution as described previously. The cycle of protonation and lithiation is repeated to extract lithium from the brine and yield a $LiNO_3$ solution. Dissolution and degradation of the active material in acid is limited due to the coating providing a protective barrier. Dissolution of the active material is measured by through elemental analysis of the acid solution following stirring. After 200 ion exchange cycles, there is no measurable loss of lithium uptake capacity in the ion exchange material and lithium recovery from the brine solution is approximately 80% for each cycle.

The lithium nitrate solution is concentrated using reverse osmosis followed by mechanical vapor recompression. The lithium nitrate is the heated to dryness. The lithium nitrate is heated to form a molten salt. Then the molten lithium nitrate is spray dried into a hot chamber heated above the decomposition temperature of lithium nitrate. Nitrogen oxide gas is formed, removed from the hot chamber, and absorbed in an aqueous solution in the presence of hydrogen peroxide. Lithium oxide is crystallized in the hot chamber, collected at the bottom of the hot chamber, and removed from the hot chamber using an auger. The lithium oxide is cooled and mixed with water to form aqueous lithium hydroxide. Magnesium hydroxide impurities are removed from the lithium hydroxide solution as solids by filtration. Further impurities are removed from the lithium hydroxide solution using ion exchange resins. Lithium hydroxide monohydrate is crystallized from the aqueous solution using a triple effect crystallizer.

FIG. 1. shows the ion exchange reactor (101), the concentration step to remove water using reverse osmosis followed by mechanical vapor recompression (102), the decomposition unit to yield lithium oxide and nitrogen oxide gases (103), dissolution of the lithium oxide with water to form aqueous lithium hydroxide (104), purification to remove impurities from the lithium hydroxide (105), crystallization of the lithium hydroxide monohydrate product (106), and absorption of the nitrogen oxide gas to reform nitric acid for lithium elution (107).

Example 2: Lithium Hydroxide Production with Distillation of Nitrate/Sulfate Mixture Lithium is extracted from a brine using coated ion exchange particles. The brine is an aqueous solution containing 100,000 mg/L Na, 4,000 mg/L Ca, 3,000 mg/L Mg, and 800 mg/L Li. The coated ion exchange particles are comprised of an ion exchange material and a coating material.

The ion exchange material is $Li_4Mn_5O_{12}$ and the coating material is $SiO_2$. The particles are comprised of 94 wt. % active material and 6 wt. % of coating material. The particles have a mean diameter of 30 microns, and the coating thickness is approximately 400 nm. The particles are created by first synthesizing $Li_4Mn_5O_{12}$ via a solid state method and then the coating is deposited on the surface of the $Li_4Mn_5O_{12}$ using tetraethyl orthosilicate (TEOS) as a precursor.

The ion exchange particles are loaded into an ion exchange reactor. The ion exchange reactor comprises a conical tank, two internal candle filters comprising a PEEK 12 um mesh fitted to a PVC pipe to allow fluid to flow into and out of the tank through the mesh while the ion exchange particles are retained inside the tank, an overhead stirrer, a pH controller, and a spraying system at the top of the tank with one or more nozzles positioned to spray water to wash ion exchange particles off the sides of the tank and down to the bottom of the tank.

The particles are loaded into the tank in an aqueous slurry. 3N $HNO_3$ acid is pumped into the tank through the PEEK mesh to create a slurry with $HNO_3$ at a normality of 1.0N. The acid is stirred with the ion exchange particle to yield $LiNO_3$ in solution. During acid treatment, the particles absorb hydrogen while releasing lithium. The $Li_4Mn_5O_{12}$ active material is converted to a protonated state with a hydrogen-enriched composition. The $SiO_2$ coating allows diffusion of hydrogen and lithium respectively to and from the active material while providing a protective barrier that limits dissolution of manganese and oxygen from the active material. After 40 minutes, the eluate solution is collected from the tank through the PEEK mesh.

After treatment in acid, the protonated particles are treated with brine wherein the particles absorb lithium while releasing hydrogen. The brine is pumped into the tank through an opening in the top of the tank. The particles are converted from a protonated state to a lithiated state with a lithium-enriched composition. An aqueous slurry of $Ca(OH)_2$ is added to the tank to maintain the pH of the brine at around 7. After 6 hours, the spent brine is removed from the tank through the PEEK mesh. The ion exchange particles are then washed with water through the spraying system. The particles are washed three times with water, and the water is drained from the tank through the PEEK mesh, leaving an aqueous slurry of the ion exchange particles at the bottom of the tank.

Figure 2:
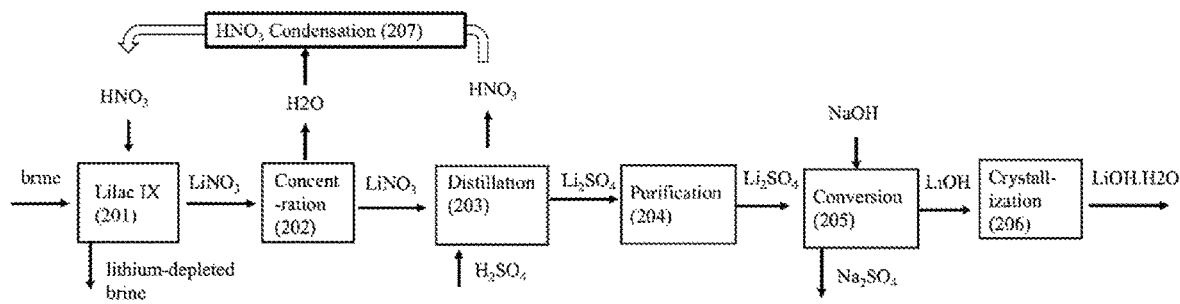
FIG. 2 illustrates a system for production of lithium hydroxide involving elution of lithium with nitric acid followed by distillation of a mixed nitrate/sulfate system.

The lithiated material is then treated again with acid to yield lithium in solution as described previously. The cycle of protonation and lithiation is repeated to extract lithium from the brine and yield a $LiNO_3$ solution. FIG. 2. illustrates the process beginning with the ion exchange reactor (201). The $LiNO_3$ solution is concentrated using reverse osmosis and followed by mechanical vapor recompression (202), sulfuric acid is mixed with the $LiNO_3$ solution which is heated to distill nitric acid (203) which is condensed (207) and recaptured for reuse for lithium elution, the resulting lithium sulfate solution is purified (204) and then converted to lithium hydroxide by addition of sodium hydroxide and crystallization of a sodium sulfate byproduct, and then a lithium hydroxide monohydrate product is crystallized in a multiple-effect crystallizer (206).

Example 3: Lithium Production System with Distillation of Chloride/Sulfate Mixture Lithium is extracted from a brine using coated ion exchange particles. The brine is an aqueous solution containing 90,000 mg/L Na, 5,000 mg/L Ca, 5,000 mg/L Mg, and 100 ppm Li. The coated ion exchange particles are comprised of an ion exchange material and a coating material. The ion exchange material is $Li_4Ti_5O_{12}$ and the coating material is PVDF. The particles are comprised of 96 wt. % active material and 4 wt. % of coating material. The particles have a mean diameter of 30 microns, and the coating thickness is approximately 100 nm. The particles are created by first synthesizing $Li_4Ti_5O_{12}$ via a solid state method and then the coating is deposited on the surface of the $Li_4Ti_5O_{12}$ using spray drying.

The ion exchange particles are loaded into a network of packed bed ion exchange columns. 0.1N HCl acid is pumped through the network of ion exchange columns to yield LiCl in solution. During acid treatment, the particles absorb hydrogen while releasing lithium. The $Li_4Ti_5O_{12}$ active material is converted to a protonated state with a hydrogen-enriched composition. The PVDF coating allows diffusion of hydrogen and lithium respectively to and from the active material while providing a protective barrier that limits dissolution of titanium and oxygen from the active material. The eluate solution is collected from network of columns while the ion exchange particles are retained in the columns.

After treatment in acid, the protonated particles are treated with brine wherein the particles absorb lithium while releasing hydrogen. The brine is pumped through the network of ion exchange columns. The particles are converted from a protonated state to a lithiated state with a lithium-enriched composition. An aqueous solution of NaOH is added to the brine between the columns to maintain the pH of the brine above 5. The ion exchange particles are then washed with water in the network of ion exchange columns.

The lithiated material is then treated again with acid to yield lithium in solution as described previously. The cycle of protonation and lithiation is repeated to extract lithium from the brine and yield a LiCl solution. Lithium recovery from the brine solution into the eluate is approximately 82% for each cycle.

Figure 3:
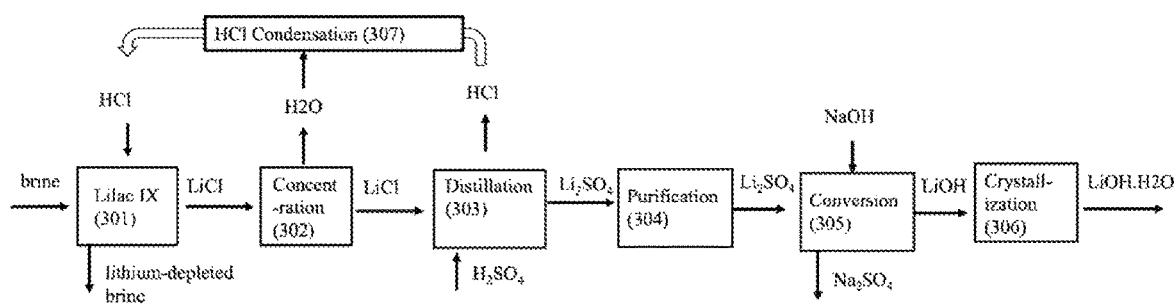
FIG. 3 illustrates a lithium production system involving elution of lithium with hydrochloric acid followed by distillation of a mixed chloride/sulfate system.

The cycle of protonation and lithiation is repeated to extract lithium from the brine and yield a LiCl solution. FIG. 3. illustrates the process beginning with the network of ion exchange columns (301). The LiCl solution is concentrated using reverse osmosis and followed by mechanical vapor recompression (302), sulfuric acid is mixed with the LiCl solution which is heated to distill hydrochloric acid (303) which is condensed (307) and recaptured for reuse for lithium elution, the resulting lithium sulfate solution is purified (304) and then converted to lithium hydroxide by addition of sodium hydroxide and crystallization of sodium sulfate byproduct (305), and then a lithium hydroxide monohydrate product is crystallized in a triple-effect crystallizer (306).

Example 4: Lithium Carbonate Precipitation from Lithium Nitrate Eluate

Lithium is extracted from a brine using coated ion exchange particles. The brine is an aqueous solution containing 80,000 mg/L Na, 10,000 mg/L Ca, 5,000 mg/L Mg, and 400 ppm Li. The coated ion exchange particles are comprised of $Li_2TiO_3$. The particles have a mean diameter of 20 microns. The particles are created by synthesizing $Li_2TiO_3$ via a solid state method.

The ion exchange particles are loaded into an ion exchange reactor. The ion exchange reactor comprises a tank and a centrifuge which can remove liquid from the tank while returning the ion exchange particles to the tank.

The particles are loaded into the tank in an aqueous slurry. 0.1N $HNO_3$ acid is pumped into the tank. The acid is stirred with the ion exchange particle to yield $LiNO_3$ in solution. During acid treatment, the particles absorb hydrogen while releasing lithium. The $Li_2TiO_3$ active material is converted to a protonated state with a hydrogen-enriched composition. After 40 minutes, the eluate solution is collected from the tank using the centrifuge while the ion exchange particles are retained in the tank.

After treatment in acid, the protonated particles are treated with brine in the tank wherein the particles absorb lithium while releasing hydrogen. The particles are converted from a protonated state to a lithiated state with a lithium-enriched composition. An aqueous solution of NaOH is added to the tank to maintain the pH of the brine at 6. After 4 hours, the spent brine is removed from the tank using the centrifuge. The ion exchange particles are then washed with water in the tank. The water is drained from the tank using the centrifuge.

The lithiated material is then treated again with acid to yield lithium in solution as described previously. The cycle of protonation and lithiation is repeated to extract lithium from the brine and yield a lithium nitrate solution. With each ion exchange cycle, lithium recovery from the brine into the lithium nitrate solution is 92%.

The lithium nitrate solution is concentrated using reverse osmosis followed by mechanical vapor recompression. The lithium nitrate is purified by precipitating calcium and magnesium impurities using sodium carbonate and then by using ion exchange resins to remove trace cationic impurities and boron impurities. The purified solution is mixed with a hot solution of sodium carbonate to precipitate lithium carbonate. The lithium carbonate is dissolved using carbon dioxide and then the lithium carbonate is reprecipitated by driving off the carbon dioxide to form a high purity lithium carbonate material.

Figure 4:
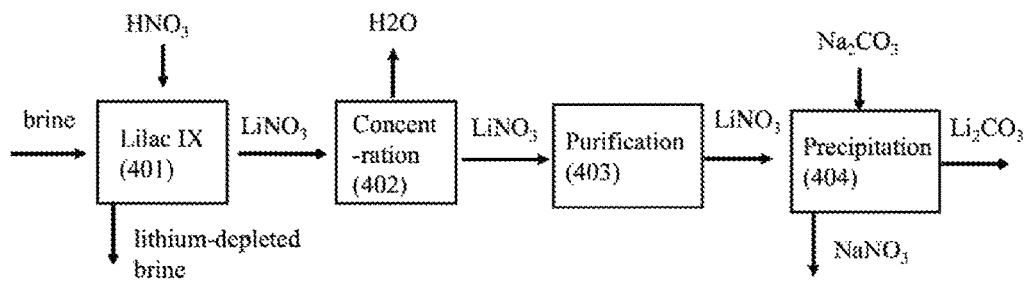
FIG. 4 illustrates a lithium production system involving elution of lithium with nitric acid followed by addition of sodium carbonate to precipitate a lithium carbonate product with a sodium nitrate byproduct.

FIG. 4. shows the ion exchange reactor (401), concentration of the lithium nitrate to remove water using reverse osmosis followed by mechanical vapor recompression (402), purification of the lithium nitrate to remove impurities (403), and precipitation of lithium carbonate from the lithium nitrate by addition of sodium carbonate (404). Sodium nitrate is produced as a byproduct.

Example 5: Lithium Hydroxide Crystallization from Lithium Nitrate Eluate

Lithium is extracted from a brine using coated ion exchange particles. The brine is an aqueous solution containing 100,000 mg/L Na, 4,000 mg/L Ca, 3,000 mg/L Mg, and 1,200 mg/L Li. The coated ion exchange particles are porous ion exchange beads comprised of a polymer matrix containing an ion exchange material. The ion exchange material is $Li_4Ti_5O_{12}$ synthesized via a solid state method.

The ion exchange particles are loaded into an ion exchange reactor. The ion exchange reactor comprises a conical tank, two internal candle filters comprising a PEEK 35 um mesh fitted to a PVC pipe to allow fluid to flow into and out of the tank through the mesh while the ion exchange particles are retained inside the tank, an overhead stirrer, a pH controller, and a spraying system at the top of the tank with one or more nozzles positioned to spray water to wash ion exchange particles off the sides of the tank and down to the bottom of the tank.

The particles are loaded into the tank in an aqueous slurry. $HNO_3$ acid is pumped into the tank through the PEEK mesh to create a slurry with $HNO_3$ at a normality of 0.1N. The acid is stirred with the ion exchange particle to yield $LiNO_3$ in solution. During acid treatment, the particles absorb hydrogen while releasing lithium. The $Li_4Ti_5O_{12}$ active material is converted to a protonated state with a hydrogen-enriched composition. After 40 minutes, the eluate solution is collected from the tank through the PEEK mesh.

After treatment in acid, the protonated particles are treated with brine wherein the particles absorb lithium while releasing hydrogen. The brine is pumped into the tank through an opening in the top of the tank. The particles are converted from a protonated state to a lithiated state with a lithium-enriched composition. An aqueous slurry of $Ca(OH)_2$ is added to the tank to maintain the pH of the brine at around 8. After 3 hours, the spent brine is removed from the tank through the PEEK mesh. The ion exchange particles are then washed with water through the spraying system. The water is drained from the tank through the PEEK mesh, leaving an aqueous slurry of the ion exchange particles at the bottom of the tank.

Figure 5:
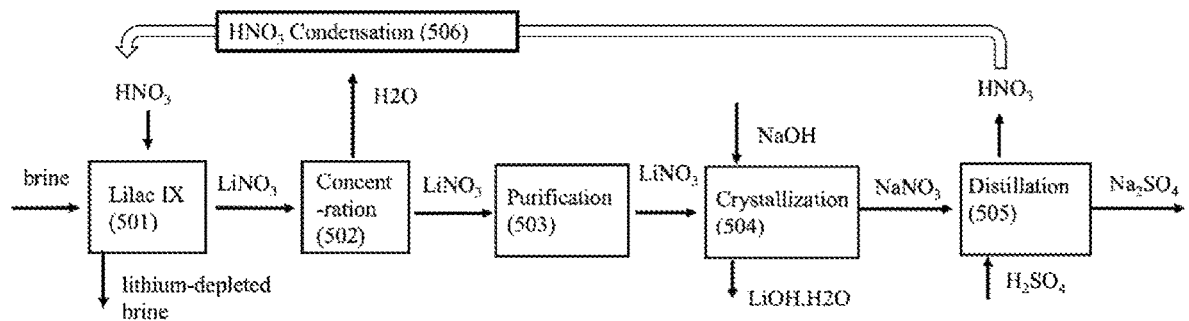
FIG. 5 illustrates a lithium production system involving elution of lithium with nitric acid followed by addition of sodium hydroxide to crystallize a lithium hydroxide product with a sodium nitrate byproduct.

The lithiated material is then treated again with acid to yield lithium in solution as described previously. The cycle of protonation and lithiation is repeated to extract lithium from the brine and yield a lithium nitrate solution. FIG. 5. illustrates the process beginning with the ion exchange reactor (501). The lithium nitrate solution is concentrated using reverse osmosis and followed by mechanical vapor recompression (502), the lithium nitrate solution is purified using carbonate precipitation and ion exchange (503), lithium hydroxide monohydrate is crystallized (504) from the lithium nitration solution by addition of sodium hydroxide solution with heating through a multi-effect crystallizer, and the sodium nitrate byproduct is mixed with sulfuric acid to distill off nitric acid (505) which is condensed (506) and reused in the ion exchange reactor while sodium sulfate is formed as a byproduct.

Example 6: Lithium Carbonate Production with Distillation of Chloride/Sulfate Mixture Lithium is extracted from a brine using coated ion exchange particles. The brine is an aqueous solution containing 90,000 mg/L Na, 5,000 mg/L Ca, 5,000 mg/L Mg, and 600 ppm Li. The coated ion exchange particles are comprised of an ion exchange material and a coating material. The ion exchange material is $Li_4Ti_5O_{12}$ and the coating material is PVDF. The particles are comprised of 96 wt. % active material and 4 wt. % of coating material. The particles have a mean diameter of 120 microns, and the coating thickness is approximately 100 nm. The particles are created by first synthesizing $Li_4Ti_5O_{12}$ via a solid state method and then the coating is deposited on the surface of the $Li_4Ti_5O_{12}$ using spray drying.

The ion exchange particles are loaded into a network of packed bed ion exchange columns. 1N hydrochloric acid is pumped through the network of ion exchange columns to yield lithium chloride in solution. During acid treatment, the particles absorb hydrogen while releasing lithium. The $Li_4Ti_5O_{12}$ active material is converted to a protonated state with a hydrogen-enriched composition. The eluate solution is collected from network of columns while the ion exchange particles are retained in the columns.

After treatment in acid, the protonated particles are treated with brine wherein the particles absorb lithium while releasing hydrogen. The brine is pumped through the network of ion exchange columns. The particles are converted from a protonated state to a lithiated state with a lithium-enriched composition. An aqueous solution of NaOH is added to the brine between the columns to maintain the pH of the brine above 5. The ion exchange particles are then washed with water in the network of ion exchange columns.

The lithiated material is then treated again with hydrochloric acid to yield lithium chloride in solution as described previously. The cycle of protonation and lithiation is repeated to extract lithium from the brine and yield a lithium chloride solution. Lithium recovery from the brine solution into the eluate is approximately 88% for each cycle.

Figure 6:
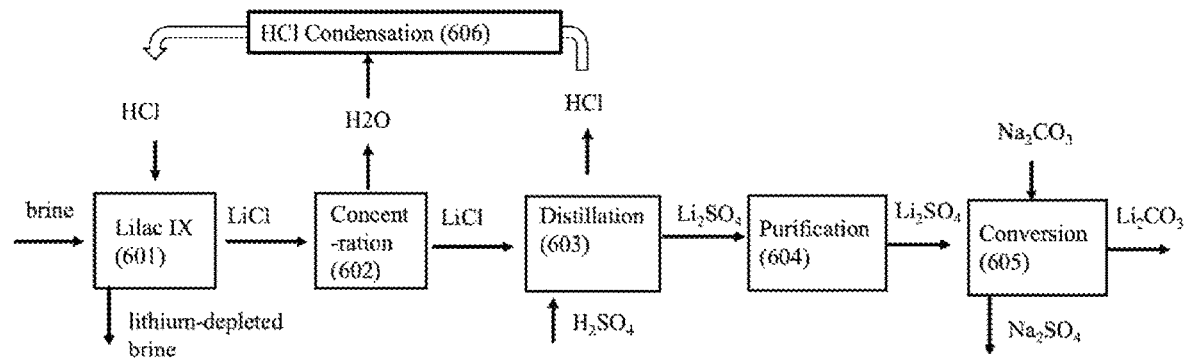
FIG. 6 illustrates a system for production of lithium carbonate involving elution of lithium with hydrochloric acid followed by distillation of a mixed chloride/sulfate system.

The cycle of protonation and lithiation is repeated to extract lithium from the brine and yield a lithium chloride solution. FIG. 6. illustrates the process beginning with the network of ion exchange columns (601). The lithium chloride solution is concentrated using reverse osmosis and followed by mechanical vapor recompression (602), the lithium chloride solution is mixed with sulfuric acid and heated to distill off hydrochloric acid vapors (603) and yield lithium sulfate, the resulting lithium sulfate is purified using carbonate precipitation and ion exchange (604), the lithium sulfate is mixed with a sodium carbonate solution to crystallize lithium carbonate (605), and the hydrochloric acid vapors are condensed in a condenser (606) to form aqueous hydrochloric acid liquid for reuse in the ion exchange unit.

Exemplary Aspect of System and Process for Producing Lithium Oxide/Lithium Hydroxide with Lithium Nitrate Decomposition In an aspect disclosed herein, is a system for production of lithium oxide, comprising: (a) an ion exchange unit containing ion exchange particles that absorb lithium from a liquid resource and that then release the absorbed lithium into an eluent comprising nitric acid to yield an eluate comprising lithium nitrate; (b) a heating unit that decomposes said lithium nitrate to crystallize lithium oxide solids while releasing nitrogen oxide gas; and (c) an absorption unit that absorbs said nitrogen oxide gas into a scrubbing solution to yield recycled nitric acid.

In another aspect disclosed herein, is a system for production of lithium hydroxide, comprising: (a) an ion exchange unit containing ion exchange particles that absorb lithium from a liquid resource and that then release the absorbed lithium into an eluent comprising nitric acid to yield an eluate comprising lithium nitrate; (b) a heating unit that decomposes said lithium nitrate to crystallize lithium oxide solids while releasing nitrogen oxide gas; (c) an absorption unit that absorbs said nitrogen oxide gas into a scrubbing solution to yield recycled nitric acid; and (d) a hydration unit that combines said lithium oxide solids with water to form lithium hydroxide.

In some embodiments, the system further comprises a purification unit after the ion exchange unit and before the heating unit to remove impurities from the lithium nitrate. In some embodiments, the system further comprises a purification unit after the hydration unit to remove impurities from the lithium hydroxide. In some embodiments, the purification unit filters out insoluble hydroxide impurities. In some embodiments, the purification unit removes impurities from the lithium nitrate or lithium hydroxide using hydroxide precipitation, carbonate precipitation, ion exchange, solvent extraction, or combinations thereof. In some embodiments, the system further comprises a crystallization unit after the hydration unit to crystallize the lithium hydroxide. In some, the system further comprises a crystallization unit after the hydration unit to crystallize lithium hydroxide monohydrate solids. In some embodiments, the system further comprises a precipitation unit after the hydration unit to crystallize lithium carbonate solids. In some embodiments, carbon dioxide or sodium hydroxide is added to the lithium hydroxide to precipitate the lithium carbonate solids. In some embodiments, the system further comprises a concentration unit between step (a) and step (b) to remove water from the eluate comprising lithium nitrate. In some embodiments, said concentration unit comprises a reverse osmosis unit, a mechanical evaporator, a mechanical vapor recompression evaporator, or combinations thereof. In some embodiments, the system further comprises a drying unit between step (a) and step (b) to remove water from the eluate comprising lithium nitrate. In some embodiments, the system further comprises a drying unit between step (a) and step (b) to remove water from the eluate comprising lithium nitrate to form a molten lithium nitrate salt that is decomposed by the heating unit to crystallize the lithium oxide solids while releasing nitrogen oxide gas. In some embodiments, said lithium nitrate is in a molten salt form in step (b). In some embodiments, said eluate comprising lithium nitrate comprises water. In some embodiments, said nitrogen oxide gas comprises molecules of NO2, O2, NO, or combinations thereof. In some embodiments, said heating unit of step (b) heats the lithium nitrate to temperatures of about 300° C. to about 500° C. In some embodiments, said heating unit of step (b) heats the lithium nitrate to temperatures of about 500° C. to about 700° C. In some embodiments, said heating unit of step (b) heats the lithium nitrate to temperatures of about 600° C. to about 700° C. In some embodiments, said heating unit of step (b) heats the lithium nitrate to temperatures of about 600° C. to about 800° C. In some embodiments, said heating unit of step (b) heats the lithium nitrate to temperatures of about 800° C. to about 1,000° C. In some embodiments, said heating unit comprises a catalyst to facilitate decomposition of the lithium nitrate. In some embodiments, the nitric acid comprises i) fresh nitric acid (e.g., unused or virgin nitric acid), ii) the recycled nitric acid, or iii) both. In some embodiments, the recycled nitric acid is returned to the eluent of step (a). In some embodiments, the hydration unit yields an aqueous solution of the lithium hydroxide. In some embodiments, the hydration unit yields lithium hydroxide monohydrate. In some embodiments, the hydration unit is a mixing tank. In some embodiments, said heating unit is a spray dryer. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said absorption unit comprises an absorption vessel filled with porous packing media. In some embodiments, said scrubbing solution comprises hydrogen peroxide.

In another aspect, disclosed herein is a process for producing lithium oxide, comprising: (a) contacting ion exchange particles with a liquid resource to produce lithiated ion exchange particles; (b) treating the lithiated ion exchange particles with an eluent comprising nitric acid to yield an eluate comprising lithium nitrate; (c) heating said eluate comprising lithium nitrate to crystallize lithium oxide solids while releasing nitrogen oxide gas; and (d) providing the nitrogen oxide gas into a scrubbing solution to yield recycled nitric acid.

In another aspect, disclosed herein is a process for producing lithium hydroxide, comprising: (a) contacting ion exchange particles with a liquid resource to produce lithiated ion exchange particles; (b) treating the lithiated ion exchange particles with an eluent comprising nitric acid to yield an eluate comprising lithium nitrate; (c) heating said eluate comprising lithium nitrate to crystallize lithium oxide solids while releasing nitrogen oxide gas; (d) providing the nitrogen oxide gas into a scrubbing solution to yield recycled nitric acid; and (e) combining said lithium oxide solids with water to form lithium hydroxide.

In some embodiments, the process further comprises purifying the eluate comprising lithium nitrate before step (c) so as to remove impurities from the lithium nitrate. In some embodiments, the process further comprises purifying the lithium hydroxide to remove impurities therefrom. In some embodiments, wherein the purifying comprises filtering out insoluble hydroxide impurities. In some embodiments, the purifying comprises removing impurities from the lithium nitrate or lithium hydroxide using hydroxide precipitation, carbonate precipitation, ion exchange, solvent extraction, or combinations thereof. In some embodiments, the process further comprises crystallizing the lithium hydroxide. In some embodiments, the process further comprises crystallizing lithium hydroxide monohydrate solids. In some embodiments, the process further comprises crystallizing lithium carbonate solids. In some embodiments, crystallizing the lithium carbonate solids comprises adding carbon dioxide or sodium hydroxide to the lithium hydroxide to precipitate the lithium carbonate solids. In some embodiments, the process further comprises removing water from the eluate comprising lithium nitrate before step (c). In some embodiments, said removing comprises using a reverse osmosis unit, a mechanical evaporator, a mechanical vapor recompression evaporator, or combinations thereof. In some embodiments, the process further comprises drying the eluate comprising lithium nitrate before step (c). In some embodiments, the process further comprises drying the eluate comprising lithium nitrate before step (c) to remove water from the eluate comprising lithium nitrate, so as to form a molten lithium nitrate salt that is heated to crystallize the lithium oxide solids while releasing nitrogen oxide gas. In some embodiments, said lithium nitrate is in a molten salt form in step (c). In some embodiments, said eluate comprising lithium nitrate comprises water. In some embodiments, said nitrogen oxide gas comprises molecules of $NO_2$, $O_2$, $NO$, or combinations thereof. In some embodiments, said heating comprises heating the lithium nitrate to temperatures of about 300° C. to about 500° C. In some embodiments, said heating comprises heating the lithium nitrate to temperatures of about 500° C. to about 700° C. In some embodiments, said heating comprises heating the lithium nitrate to temperatures of about 600° C. to about 700° C. In some embodiments, said heating comprises heating the lithium nitrate to temperatures of about 600° C. to about 800° C. In some embodiments, said heating comprises heating the lithium nitrate to temperatures of about 800° C. to about 1,000° C. In some embodiments, the process further comprises providing a catalyst to facilitate decomposition of the lithium nitrate in step (c). In some embodiments, the nitric acid comprises i) fresh nitric acid (e.g., unused or virgin nitric acid), ii) the recycled nitric acid, or iii) both. In some embodiments, the recycled nitric acid is returned to the eluent of step (b). In some embodiments, the formed lithium hydroxide is an aqueous solution of the lithium hydroxide. In some embodiments, the formed lithium hydroxide comprises lithium hydroxide monohydrate. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, said scrubbing solution comprises hydrogen peroxide. In some embodiments, the process further comprises providing a system disclosed herein.

Exemplary Aspect of System and Process for Producing Lithium Oxide/Lithium Hydroxide with Lithium Sulfate Decomposition In another aspect disclosed herein, is a system for production of lithium hydroxide, comprising: (a) an ion exchange unit containing ion exchange particles that absorb lithium from a liquid resource and that then release the absorbed lithium into an eluent comprising sulfuric acid to yield an eluate comprising lithium sulfate; (b) a heating unit that decomposes said lithium sulfate to crystallize lithium oxide solids while releasing sulfur oxide gas; and (c) an absorption unit that absorbs said sulfur oxide gas into a scrubbing solution to yield recycled sulfuric acid.

In another aspect disclosed herein, is a system for production of lithium hydroxide, comprising: (a) an ion exchange unit containing ion exchange particles that absorb lithium from a liquid resource and that then release the absorbed lithium into an eluent comprising sulfuric acid to yield an eluate comprising lithium sulfate; (b) a heating unit that decomposes said lithium sulfate to crystallize lithium oxide solids while releasing sulfur oxide gas; (c) an absorption unit that absorbs said sulfur oxide gas into a scrubbing solution to yield recycled sulfuric acid; and (d) a hydration unit that combines said lithium oxide solids with water to form lithium hydroxide.

In some embodiments, the further comprises a purification unit after the ion exchange unit and before the heating unit to remove impurities from the lithium sulfate. In some embodiments, the system further comprises a purification unit after the hydration unit to remove impurities from the lithium hydroxide. In some embodiments, the purification unit filters out insoluble hydroxide impurities. In some embodiments, the purification unit removes impurities from the lithium sulfate or lithium hydroxide using hydroxide precipitation, carbonate precipitation, ion exchange, solvent extraction, or combinations thereof. In some embodiments, the system further comprises a crystallization unit after the hydration unit to crystallize the lithium hydroxide. In some embodiments, the system further comprises a crystallization unit after the hydration unit to crystallize lithium hydroxide monohydrate solids. In some embodiments, the system further comprises a precipitation unit after the hydration unit to crystallize lithium carbonate solids. In some embodiments, carbon dioxide or sodium hydroxide is added to the lithium hydroxide to precipitate the lithium carbonate solids. In some embodiments, the system further comprises a concentration unit between step (a) and step (b) to remove water from the eluate comprising the lithium sulfate. In some embodiments, said concentration unit comprises a reverse osmosis unit, a mechanical evaporator, a mechanical vapor recompression evaporator, or combinations thereof. In some embodiments, the system further comprises a drying unit between step (a) and step (b) to remove water from the eluate comprising lithium sulfate. In some embodiments, the system, further comprises a drying unit between step (a) and step (b) to remove water from the eluate comprising the lithium sulfate to form a molten lithium sulfate salt that is decomposed by the heating unit to crystallize the lithium oxide solids while releasing sulfur oxide gas. In some embodiments, said lithium sulfate is in a molten salt form in step (b). In some embodiments, said eluate comprising lithium sulfate comprises water. In some embodiments, said sulfur oxide gas comprises molecules of $SO_3$, $SO_2$, $O_2$, $SO$, or combinations thereof. In some embodiments, said heating unit of step (b) heats the lithium sulfate to temperatures of about 1,000° C. to about 1,600° C. In some embodiments, said heating unit of step (b) heats the lithium sulfate to temperatures of about 1,100° C. to about 1,500° C. In some embodiments, said heating unit of step (b) heats the lithium sulfate to temperatures of about 1,200° C. to about 1,400° C. In some embodiments, said heating unit of step (b) heats the lithium sulfate to temperatures of about 1,200° C. to about 1,500° C. In some embodiments, said heating unit of step (b) heats the lithium sulfate to temperatures of about 1,300° C. to about 1,600° C. In some embodiments, said heating unit comprises a catalyst to facilitate decomposition of the lithium sulfate. In some embodiments, the sulfuric acid comprises i) fresh sulfuric acid (e.g., unused or virgin sulfuric acid), ii) the recycled sulfuric acid, or iii) both. In some embodiments, the recycled sulfuric acid is returned to the eluent of step (a). In some embodiments, the hydration unit yields an aqueous solution of the lithium hydroxide. In some embodiments, the hydration unit yields lithium hydroxide monohydrate. In some embodiments, the hydration unit is a mixing tank. In some embodiments, said heating unit is a spray dryer. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said absorption unit comprises an absorption vessel filled with porous packing media. In some embodiments, said scrubbing solution comprises hydrogen peroxide.

In another aspect disclosed herein, is a process for producing lithium hydroxide, comprising: (a) contacting ion exchange particles with a liquid resource to produce lithiated ion exchange particles; (b) treating the lithiated ion exchange particles with an eluent comprising sulfuric acid to yield an eluate comprising lithium sulfate; (c) heating said eluate comprising lithium sulfate to crystallize lithium oxide solids while releasing sulfur oxide gas; (d) providing the sulfur oxide gas into a scrubbing solution to yield recycled sulfuric acid; and (e) combining said lithium oxide solids with water to form lithium hydroxide.

In some embodiments, the process further comprises purifying the eluate comprising lithium sulfate before step (c) so as to remove impurities from the lithium sulfate. In some embodiments, the process further comprises purifying the lithium hydroxide to remove impurities therefrom. In some embodiments, the purifying comprises filtering out insoluble hydroxide impurities. In some embodiments, the purifying comprises removing impurities from the lithium sulfate or lithium hydroxide using hydroxide precipitation, carbonate precipitation, ion exchange, solvent extraction, or combinations thereof. In some embodiments, the process further comprises crystallizing the lithium hydroxide. In some embodiments, the process further comprises crystallizing lithium hydroxide monohydrate solids. In some embodiments, the process further comprises crystallizing lithium carbonate solids. In some embodiments, crystallizing the lithium carbonate solids comprises adding carbon dioxide or sodium hydroxide to the lithium hydroxide to precipitate the lithium carbonate solids. In some embodiments, the process further comprises removing water from the eluate comprising lithium sulfate before step (c). In some embodiments, said removing comprises using a reverse osmosis unit, a mechanical evaporator, a mechanical vapor recompression evaporator, or combinations thereof. In some embodiments, the process further comprises drying the eluate comprising lithium sulfate before step (c). In some embodiments, the process further comprises drying the eluate comprising lithium sulfate before step (c) to remove water from eluate comprising the lithium sulfate, so as to form a molten lithium sulfate salt that is heated to crystallize the lithium oxide solids while releasing sulfur oxide gas. In some embodiments, said lithium sulfate is in a molten salt form in step (c). In some embodiments, said eluate comprising lithium sulfate comprises water. In some embodiments, said sulfur oxide gas comprises molecules of $SO_3$, $SO_2$, $O_2$, $SO$, or combinations thereof. In some embodiments, said heating comprises heating the lithium sulfate to temperatures of about 1,000° C. to about 1,600° C. In some embodiments, said heating comprises heating the lithium sulfate to temperatures of about 1,100° C. to about 1,500° C. In some embodiments, said heating comprises heating the lithium sulfate to temperatures of about 1,200° C. to about 1,400° C. In some embodiments, said heating comprises heating the lithium sulfate to temperatures of about 1,200° C. to about 1,500° C. In some embodiments, said heating comprises heating the lithium sulfate to temperatures of about 1,300° C. to about 1,600° C. In some embodiments, the process further comprises providing a catalyst to facilitate decomposition of the lithium sulfate in step (c). In some embodiments, the sulfuric acid comprises i) fresh sulfuric acid (e.g., unused or virgin sulfuric acid), ii) the recycled sulfuric acid, or iii) both. In some embodiments, the recycled sulfuric acid is returned to the eluent of step (b). In some embodiments, the formed lithium hydroxide is an aqueous solution of the lithium hydroxide. In some embodiments, the formed lithium hydroxide comprises lithium hydroxide monohydrate. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, said scrubbing solution comprises hydrogen peroxide. In some embodiments, the process further comprises providing a system disclosed herein.

Exemplary Aspect of System and Process for Producing Lithium Oxide/Lithium Hydroxide with Lithium Salt Decomposition In another aspect disclosed herein, is a system for production of lithium hydroxide, comprising: (a) an ion exchange unit containing ion exchange particles that absorb lithium from a liquid resource and that then release the absorbed lithium into an eluent comprising an acid to yield an eluate comprising a lithium salt; (b) a heating unit that decomposes said lithium salt to crystallize lithium oxide solids while releasing a gaseous oxide; and (c) an absorption unit that absorbs said gaseous oxide into a scrubbing solution to yield recycled acid.

In another aspect disclosed herein, is a system for production of lithium hydroxide, comprising: (a) an ion exchange unit containing ion exchange particles that absorb lithium from a liquid resource and that then release the absorbed lithium into an eluent comprising an acid to yield an eluate comprising a lithium salt; (b) a heating unit that decomposes said lithium salt to crystallize lithium oxide solids while releasing a gaseous oxide; (c) an absorption unit that absorbs said gaseous oxide into a scrubbing solution to yield recycled acid; and (d) a hydration unit that combines said lithium oxide solids with water to form lithium hydroxide.

In some embodiments, the system further comprises a purification unit after the ion exchange unit and before the heating unit to remove impurities from the lithium salt. In some embodiments, the system further comprises a purification unit after the hydration unit to remove impurities from the lithium hydroxide. In some embodiments, the purification unit filters out insoluble hydroxide impurities. In some embodiments, the purification unit removes impurities from the lithium salt or lithium hydroxide using hydroxide precipitation, carbonate precipitation, ion exchange, solvent extraction, or combinations thereof. In some embodiments, the system further comprises a crystallization unit after the hydration unit to crystallize the lithium hydroxide. In some embodiments, the system further comprises a crystallization unit after the hydration unit to crystallize lithium hydroxide monohydrate solids. In some embodiments, the system further comprises a precipitation unit after the hydration unit to crystallize lithium carbonate solids. In some embodiments, carbon dioxide or sodium hydroxide is added to the lithium hydroxide to precipitate the lithium carbonate solids. In some embodiments, the system further comprises a concentration unit between step (a) and step (b) to remove water from the eluate comprising the lithium salt. In some embodiments, said concentration unit comprises a reverse osmosis unit, a mechanical evaporator, a mechanical vapor recompression evaporator, or combinations thereof. In some embodiments, the system further comprises a drying unit between step (a) and step (b) to remove water from the eluate comprising the lithium salt. In some embodiments, the system further comprises a drying unit between step (a) and step (b) to remove water from the eluate comprising the lithium salt to form a molten lithium salt that is decomposed by the heating unit to crystallize the lithium oxide solids while releasing the gaseous oxide. In some embodiments, said lithium salt is in a molten salt form in step (b). In some embodiments, said eluate comprising lithium salt comprises water. In some embodiments, said heating unit comprises a catalyst to facilitate decomposition of the lithium salt. In some embodiments, the acid comprises i) fresh acid (e.g., unused or virgin acid), ii) the recycled acid, or iii) both. In some embodiments, the recycled acid is returned to the eluent of step (a). In some embodiments, the hydration unit yields an aqueous solution of the lithium hydroxide. In some embodiments, the hydration unit yields lithium hydroxide monohydrate. In some embodiments, the hydration unit is a mixing tank. In some embodiments, said heating unit is a spray dryer. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said absorption unit comprises an absorption vessel filled with porous packing media. In some embodiments, said scrubbing solution comprises hydrogen peroxide.

In another aspect, disclosed herein is a process for producing lithium hydroxide, comprising: (a) contacting ion exchange particles with a liquid resource to produce lithiated ion exchange particles; (b) treating the lithiated ion exchange particles with an eluent comprising an acid to yield an eluate comprising a lithium salt; (c) heating said eluate comprising the lithium salt to crystallize lithium oxide solids while releasing a gaseous oxide; (d) providing the gaseous oxide into a scrubbing solution to yield recycled acid; and (e) combining said lithium oxide solids with water to form lithium hydroxide.

In some embodiments, the process further comprises purifying the eluate comprising lithium salt before step (c) so as to remove impurities from the lithium salt. In some embodiments, the process further comprises purifying the lithium hydroxide to remove impurities therefrom. In some embodiments, the purifying comprises filtering out insoluble hydroxide impurities. In some embodiments, the purifying comprises removing impurities from the lithium salt or lithium hydroxide using hydroxide precipitation, carbonate precipitation, ion exchange, solvent extraction, or combinations thereof. In some embodiments, the process further comprises crystallizing the lithium hydroxide. In some embodiments, the process further comprises crystallizing lithium hydroxide monohydrate solids. In some embodiments, the process further comprises crystallizing lithium carbonate solids. In some embodiments, crystallizing the lithium carbonate solids comprises adding carbon dioxide or sodium hydroxide to the lithium hydroxide to precipitate the lithium carbonate solids. In some embodiments, the process further comprises removing water from the eluate comprising the lithium salt before step (c). In some embodiments, said removing comprises using a reverse osmosis unit, a mechanical evaporator, a mechanical vapor recompression evaporator, or combinations thereof. In some embodiments, the process further comprises drying the eluate comprising the lithium salt before step (c). In some embodiments, the process further comprises drying the eluate comprising lithium sulfate before step (c) to remove water from the eluate comprising the lithium salt, so as to form a molten lithium salt that is heated to crystallize the lithium oxide solids while releasing the gaseous oxide. In some embodiments, said lithium salt is in a molten salt form in step (c). In some embodiments, said eluate comprising the lithium salt comprises water. In some embodiments, the process further comprises adding a catalyst to facilitate decomposition of the lithium salt in step (c). In some embodiments, the acid comprises i) fresh acid (e.g., unused or virgin sulfuric acid), ii) the recycled acid, or iii) both. In some embodiments, the recycled acid is returned to the eluent of step (b). In some embodiments, the formed lithium hydroxide is an aqueous solution of the lithium hydroxide. In some embodiments, the formed lithium hydroxide comprises lithium hydroxide monohydrate. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, said scrubbing solution comprises hydrogen peroxide. In some embodiments, the process further comprises providing a system disclosed herein.

First Exemplary Aspect of a System and Process for Producing a Lithium Compound with Acid Distillation In another aspect disclosed herein, is a system for lithium production, comprising: (a) an ion exchange unit containing ion exchange particles that absorb lithium from a liquid resource and that then release the absorbed lithium into an eluent comprising a volatile acid to yield a lithium salt solution; (b) a distillation unit that mixes sulfuric acid with said lithium salt solution and heats the resulting mixture to distill off volatile acid vapors and to yield lithium sulfate; and (c) a condensation unit that condenses said volatile acid vapors to yield recycled volatile acid for reuse in said ion exchange unit.

In some embodiments, the system further comprises a concentration unit to remove water from said lithium salt solution after step (a) and before step (b). In some embodiments, the system further comprises a precipitation unit that adds a precipitant to said lithium sulfate yielding lithium solids. In some embodiments, the system further comprises a carbonation unit where sodium carbonate is combined with said lithium sulfate to precipitate lithium carbonate. In some embodiments, the system further comprises a crystallization unit where sodium hydroxide is combined with said lithium sulfate to crystallize lithium hydroxide. In some embodiments, the system further comprises a crystallization unit where sodium hydroxide is combined with said lithium sulfate to crystallize lithium hydroxide monohydrate. In some embodiments, the system further comprises a crystallization unit where sodium hydroxide is combined with said lithium sulfate to first crystallize a sodium sulfate byproduct and then crystallize a lithium hydroxide product. In some embodiments, the system further comprises a purification unit after the ion exchange unit and before the distillation unit to remove impurities from said lithium salt solution. In some embodiments, the system further comprises a purification unit after said distillation unit to remove impurities from said lithium sulfate. In some embodiments, said volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said volatile acid is nitric acid. In some embodiments, said volatile acid is hydrochloric acid. In some embodiments, the distillation unit operates at temperatures of about 50 to about 150 degrees Celsius. In some embodiments, the distillation unit operates at temperatures of about 100 to about 200 degrees Celsius. In some embodiments, the distillation unit operates at temperatures of about 100 to about 300 degrees Celsius. In some embodiments, the distillation unit operates at temperatures of about 200 to about 400 degrees Celsius. In some embodiments, the distillation unit operates at temperatures of about 400 to about 600 degrees Celsius. In some embodiments, the distillation unit operates at temperatures of above 600 degrees Celsius. In some embodiments, the distillation unit yields said lithium sulfate in aqueous form. In some embodiments, the distillation unit yields said lithium sulfate in solid form. In some embodiments, the distillation unit comprises a spray dryer to produce said lithium sulfate in solid form. In some embodiments, the distillation unit operates at pressures from about 0.01 atm to about 0.1 atm. In some embodiments, the distillation unit operates at pressures from about 0.1 atm to about 1.0 atm. In some embodiments, the distillation unit operates at pressures from about 1.0 atm to about 10 atm. In some embodiments, the distillation unit operates at pressures above 10 atm. In some embodiments, the condensation unit operates at pressures from about 1 atm to about 10 atm. In some embodiments, the condensation unit operates at pressures from about 10 atm to about 100 atm. In some embodiments, the condensation unit operates at pressures from about 100 atm to about 1,000 atm. In some embodiments, the condensation unit operates at temperatures from about −200 degrees Celsius to about −100 degrees Celsius. In some embodiments, the condensation unit operates at temperatures from about −100 degrees Celsius to about −50 degrees Celsius. In some embodiments, the condensation unit operates at temperatures from about −50 degrees Celsius to about 0 degrees Celsius. In some embodiments, the condensation unit operates at temperatures from about −30 degrees Celsius to about 20 degrees Celsius. In some embodiments, the condensation unit operates at temperatures from about 0 degrees Celsius to about 50 degrees Celsius. In some embodiments, the condensation unit operates at temperatures above 50 degrees Celsius. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, the system further comprises a purification unit comprising a precipitation unit that precipitates and filters out impurities from said lithium sulfate as insoluble hydroxides, so as to yield purified lithium sulfate. In some embodiments, the system further comprises a purification unit comprising a precipitation unit for precipitating and filtering out impurities from said lithium sulfate as insoluble carbonates, so as to yield purified lithium sulfate. In some embodiments, the system further comprises a purification unit comprising an ion exchange resin for removing impurities from said lithium sulfate, so as to yield purified lithium sulfate. In some embodiments, the system further comprises a precipitation unit that mixes the lithium sulfate with sodium carbonate, so as to i) crystallize lithium carbonate, ii) dissolve said lithium carbonate using carbon dioxide, and iii) recrystallizes lithium carbonate by driving off carbon dioxide. In some embodiments, the system further comprises a precipitation unit that mixes the lithium sulfate with sodium hydroxide to yield a sodium sulfate byproduct. In some embodiments, said precipitation unit yields a sodium sulfate byproduct and a lithium hydroxide or lithium hydroxide monohydrate product. In some embodiments, said precipitation unit further comprises a multi-effect crystallizer. In some embodiments, the system further comprises a concentration unit comprising a reverse osmosis unit that removes water from said lithium salt solution to yield a concentrated lithium salt solution. In some embodiments, the system further comprises a concentration unit comprising a mechanical evaporation unit that removes water from said lithium salt solution to yield a concentrated lithium salt solution.

In another aspect disclosed herein, is a process for lithium production, comprising: (a) contacting ion exchange particles with a liquid resource to produce lithiated ion exchange particles; (b) treating the lithiated ion exchange particles with an eluent comprising a volatile acid to yield a lithium salt solution; (c) mixing sulfuric acid with said lithium salt solution to form a lithium salt solution mixture; (d) heating the lithium salt solution mixture to distill off volatile acid vapors and to yield lithium sulfate; and (e) condensing said volatile acid vapors to yield recycled volatile acid.

In some embodiments, the process further comprises removing water from said lithium salt solution after step (b) and before step (c). In some embodiments, the process further comprises adding a precipitant to said lithium sulfate to yield lithium solids. In some embodiments, said heating is done in a spray dryer to produce lithium sulfate solids. In some embodiments, the process further comprises combining sodium carbonate with said lithium sulfate to precipitate lithium carbonate. In some embodiments, the process further comprises combining sodium hydroxide with said lithium sulfate to crystallize lithium hydroxide. In some embodiments, the process further comprises combining sodium hydroxide with said lithium sulfate to crystallize lithium hydroxide monohydrate. In some embodiments, the process further comprises combining sodium hydroxide with said lithium sulfate to first crystallize a sodium sulfate byproduct and then crystallize a lithium hydroxide product. In some embodiments, the process further comprises removing impurities from said lithium salt solution before step (c). In some embodiments, the process further comprises removing impurities from said lithium sulfate. In some embodiments, said volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said volatile acid is nitric acid. In some embodiments, said volatile acid is hydrochloric acid. In some embodiments, the heating comprises heating the lithium salt solution to temperatures of about 50 to about 150 degrees Celsius. In some embodiments, the heating comprises heating the lithium salt solution in a heating unit operating at temperatures of about 100 to about 200 degrees Celsius. In some embodiments, the heating comprises heating the lithium salt solution in a heating unit operating at temperatures of about 100 to about 300 degrees Celsius. In some embodiments, the heating comprises heating the lithium salt solution in a heating unit operating at temperatures of about 200 to about 400 degrees Celsius. In some embodiments, the heating comprises heating the lithium salt solution in a heating unit operating at temperatures of about 400 to about 600 degrees Celsius. In some embodiments, the heating comprises heating the lithium salt solution in a heating unit operating at temperatures of above 600 degrees Celsius. In some embodiments, said lithium sulfate is in aqueous form. In some embodiments, said lithium sulfate is in solid form. In some embodiments, the heating comprises heating the lithium salt solution in a heating unit operating at pressures from about 0.01 atm to about 0.1 atm. In some embodiments, the heating comprises heating the lithium salt solution in a heating unit operating at pressures from about 0.1 atm to about 1.0 atm. In some embodiments, the heating comprises heating the lithium salt solution at pressures from about 1.0 atm to about 10 atm. In some embodiments, the heating comprises heating the lithium salt solution in a heating unit operating at pressures above 10 atm. In some embodiments, the condensing comprises condensing the volatile acid vapors in a condensing unit operating at pressures from about 1 atm to about 10 atm. In some embodiments, the condensing comprises condensing the volatile acid vapors in a condensing unit operating at pressures from about 10 atm to about 100 atm. In some embodiments, the condensing comprises condensing the volatile acid vapors in a condensing unit operating at pressures from about 100 atm to about 1,000 atm. In some embodiments, the condensing comprises condensing the volatile acid vapors in a condensing unit operating at temperatures from about −200 degrees Celsius to about −100 degrees Celsius. In some embodiments, the condensing comprises condensing the volatile acid vapors in a condensing unit operating at temperatures from about −100 degrees Celsius to about −50 degrees Celsius. In some embodiments, the condensing comprises condensing the volatile acid vapors in a condensing unit operating at temperatures from about −50 degrees Celsius to about 0 degrees Celsius. In some embodiments, the condensing comprises condensing the volatile acid vapors in a condensing unit operating at temperatures from about −30 degrees Celsius to about 20 degrees Celsius. In some embodiments, the condensing comprises condensing the volatile acid vapors in a condensing unit operating at temperatures from about 0 degrees Celsius to about 50 degrees Celsius. In some embodiments, the condensing comprises condensing the volatile acid vapors in a condensing unit operating at temperatures above 50 degrees Celsius. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, the process further comprises precipitating and filtering out impurities from said lithium sulfate as insoluble hydroxides, so as to yield purified lithium sulfate. In some embodiments, the process further comprises precipitating and filtering out impurities from said lithium sulfate as insoluble carbonates, so as to yield purified lithium sulfate. In some embodiments, the process further comprises removing impurities from said lithium sulfate, so as to yield purified lithium sulfate. In some embodiments, the process further comprises mixing the lithium sulfate with sodium carbonate, so as to i) crystallize lithium carbonate, ii) dissolve said lithium carbonate using carbon dioxide, and iii) recrystallizes lithium carbonate by driving off carbon dioxide. In some embodiments, the process of claim further comprises mixing the lithium sulfate with sodium hydroxide to yield a sodium sulfate byproduct. In some embodiments, the process further yielding a lithium hydroxide or lithium hydroxide monohydrate product. In some embodiments, the process further comprises removing water from said lithium salt solution to yield a concentrated lithium salt solution. In some embodiments, the process further comprises providing a system disclosed herein.

Second Exemplary Aspect of a System and Process for Producing a Lithium Compound with Acid Distillation In another aspect disclosed herein, is a system for lithium production, comprising: (a) an ion exchange unit containing ion exchange particles that absorb lithium from a liquid resource and that then release lithium into an eluent comprising a volatile acid to yield a lithium salt solution; (b) a concentration unit that removes water from said lithium salt solution to yield a concentrated lithium salt solution; (c) a distillation unit that mixes sulfuric acid with said concentrated lithium salt solution and heats the resulting mixture to distill off volatile acid vapors and yield lithium sulfate; and (d) a condensation unit to condense said volatile acid vapors yielding recycled volatile acid for reuse in said ion exchange unit.

In some embodiments, the system further comprises: (a) a purification unit that removes impurities from said lithium sulfate to yield purified lithium sulfate; (b) a conversion unit that adds sodium hydroxide to said purified lithium sulfate to yield a lithium hydroxide solution; and (c) a crystallization unit that crystallizes said lithium hydroxide solution to yield a lithium compound. In some embodiments, the system further comprises: (a) a conversion unit that adds sodium hydroxide to said purified lithium sulfate to yield a lithium hydroxide solution; and (b) a crystallization unit that crystallizes said lithium hydroxide solution to yield a lithium compound. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said purification unit comprises a precipitation unit for precipitating and filtering out impurities as insoluble hydroxides. In some embodiments, said purification unit comprises a precipitation unit for precipitating and filtering out impurities as insoluble carbonates. In some embodiments, said purification unit comprises an ion exchange unit for removing impurities using an ion exchange resin. In some embodiments, said conversion unit crystallizes a sodium sulfate byproduct. In some embodiments, said concentration unit comprises a reverse osmosis unit. In some embodiments, said concentration unit comprises a mechanical evaporation unit. In some embodiments, said crystallization unit comprises a multi-effect crystallizer. In some embodiments, said crystallization unit crystallizes lithium hydroxide monohydrate. In some embodiments, said crystallization unit combines said lithium hydroxide solution with carbon dioxide or sodium hydroxide to crystallize lithium carbonate.

In some embodiments, the system further comprises: (a) a purification unit that removes impurities from said lithium sulfate to yield purified lithium sulfate; and (b) a first precipitation unit that adds sodium carbonate to said lithium sulfate to yield lithium carbonate solids. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said purification unit comprises a second precipitation unit for precipitating and filtering out impurities as insoluble hydroxides. In some embodiments, said purification unit comprises a second precipitation unit for precipitating and filtering out impurities as insoluble carbonates. In some embodiments, said purification unit comprises an ion exchange resin for removing impurities. In some embodiments, said first precipitation unit dissolves said lithium carbonate solids using carbon dioxide to yield dissolved lithium carbonate, and crystallizes the dissolved lithium carbonate by driving off carbon dioxide. In some embodiments, said first precipitation unit yields a sodium sulfate byproduct. In some embodiments, said concentration unit comprises a reverse osmosis unit. In some embodiments, said concentration unit comprises a mechanical evaporation unit. In some embodiments, said first precipitation unit comprises a multi-effect crystallizer.

In another aspect disclosed herein, is a process for lithium production, comprising: (a) contacting ion exchange particles with a liquid resource to produce lithiated ion exchange particles; (b) treating the lithiated ion exchange particles with an eluent comprising a volatile acid to yield a lithium salt solution; (c) removing water from said lithium salt solution to yield a concentrated lithium salt solution; (d) mixing sulfuric acid with said concentrated lithium salt solution to yield a lithium salt solution mixture; (e) heating the lithium salt solution mixture to distill off volatile acid vapors and yield lithium sulfate; and (f) condensing said volatile acid vapors yielding recycled volatile acid.

In some embodiments, the process further comprises: (a) removing impurities from said lithium sulfate to yield purified lithium sulfate; (b) combining sodium hydroxide to said purified lithium sulfate to yield a lithium hydroxide solution; and (c) crystallizing said lithium hydroxide solution to yield a lithium compound. In some embodiments, the process further comprises: (a) combining sodium hydroxide to said purified lithium sulfate to yield a lithium hydroxide solution; and (b) crystallizing said lithium hydroxide solution to yield a lithium compound. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, the removing impurities comprises precipitating and filtering out impurities as insoluble hydroxides. In some embodiments, the removing impurities comprises precipitating and filtering out impurities as insoluble carbonates. In some embodiments, the removing impurities comprises using an ion exchange resin. In some embodiments, the combining further crystallizes a sodium sulfate byproduct. In some embodiments, said removing water comprises using a reverse osmosis unit. In some embodiments, said removing water comprises using a mechanical evaporation unit. In some embodiments, said crystallized lithium compound comprises lithium hydroxide monohydrate. In some embodiments, said crystallizing comprises combining said lithium hydroxide solution with carbon dioxide or sodium hydroxide to crystallize lithium carbonate.

In some embodiments, the process further comprises: (a) removing impurities from said lithium sulfate to yield purified lithium sulfate; and (b) combining sodium carbonate to said lithium sulfate to yield lithium carbonate solids. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, said removing impurities comprises precipitating and filtering out impurities as insoluble hydroxides. In some embodiments, said removing impurities comprises precipitating and filtering out impurities as insoluble carbonates. In some embodiments, said removing impurities comprises using an ion exchange resin. In some embodiments, the process further comprises i) dissolving said lithium carbonate solids using carbon dioxide to yield dissolved lithium carbonate, and ii) crystallizing the dissolved lithium carbonate by driving off carbon dioxide. In some embodiments, said combining further yields a sodium sulfate byproduct. In some embodiments, the removing water comprises using a reverse osmosis unit. In some embodiments, the removing water comprises using a mechanical evaporation unit. In some embodiments, the process further comprises providing a system as disclosed herein.

Third Exemplary Aspect of a System and Process for Producing a Lithium Compound with Acid Distillation In another aspect disclosed herein, is a system for lithium production, comprising: (a) an ion exchange unit containing ion exchange particles that absorb lithium from a liquid resource and that then release lithium into an eluent comprising a volatile acid to yield a lithium salt solution; (b) a first precipitation unit where a precipitant is mixed with said lithium salt solution to precipitate a lithium salt and yield an effluent; (c) a distillation unit that mixes sulfuric acid with said effluent and heats the resulting mixture to distill off volatile acid vapors; and (d) a condensation unit to condense said volatile acid vapors to yield recycled acid for reuse in said ion exchange unit.

In some embodiments, the distillation unit produces a sulfate byproduct. In some embodiments, the system further comprises a concentration unit to remove water from said lithium salt solution after step (a) and before step (b). In some embodiments, said concentration unit comprises a reverse osmosis unit, a mechanical evaporator, a mechanical vapor recompression evaporator, or combinations thereof. In some embodiments, the precipitant is sodium carbonate and the precipitated lithium salt is lithium carbonate. In some embodiments, the precipitant is sodium hydroxide and the precipitated lithium salt is lithium hydroxide. In some embodiments, the precipitant is sodium hydroxide and the precipitated lithium salt is lithium hydroxide monohydrate. In some embodiments, the effluent is sodium nitrate, sodium chloride, sodium bromide, or sodium iodide. In some embodiments, the effluent is sodium nitrate. In some embodiments, the effluent is sodium chloride. In some embodiments, the system further comprises a purification unit after the ion exchange unit and before the distillation unit to remove impurities from said lithium salt solution. In some embodiments, the system further comprises a purification unit after said distillation unit to remove impurities from said sulfate byproduct. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said volatile acid is nitric acid. In some embodiments, said volatile acid is hydrochloric acid. In some embodiments, the distillation unit operates at temperatures of about 50 to about 150 degrees Celsius. In some embodiments, the distillation unit operates at temperatures of about 100 to about 200 degrees Celsius. In some embodiments, the distillation unit operates at temperatures of about 100 to about 300 degrees Celsius. In some embodiments, the distillation unit operates at temperatures of about 200 to about 400 degrees Celsius. In some embodiments, the distillation unit operates at temperatures of about 400 to about 600 degrees Celsius. In some embodiments, the distillation unit operates at temperatures of above 600 degrees Celsius. In some embodiments, the distillation unit yields lithium sulfate in aqueous form. In some embodiments, the distillation unit yields lithium sulfate in solid form. In some embodiments, the distillation unit operates at pressures from about 0.01 atm to about 0.1 atm. In some embodiments, the distillation unit operates at pressures from about 0.1 atm to about 1.0 atm. In some embodiments, the distillation unit operates at pressures from about 1.0 atm to about 10 atm. In some embodiments, the distillation unit operates at pressures above 10 atm. In some embodiments, the condensation unit operates at pressures from about 1 atm to about 10 atm. In some embodiments, the condensation unit operates at pressures from about 10 atm to about 100 atm. In some embodiments, the condensation unit operates at pressures from about 100 atm to about 1,000 atm. In some embodiments, the condensation unit operates at temperatures from about −200 degrees Celsius to about −100 degrees Celsius. In some embodiments, the condensation unit operates at temperatures from about −100 degrees Celsius to about −50 degrees Celsius. In some embodiments, the condensation unit operates at temperatures from about −50 degrees Celsius to about 0 degrees Celsius. In some embodiments, the condensation unit operates at temperatures from about −30 degrees Celsius to about 20 degrees Celsius. In some embodiments, the condensation unit operates at temperatures from about 0 degrees Celsius to about 50 degrees Celsius. In some embodiments, the condensation unit operates at temperatures above 50 degrees Celsius. In some embodiments, said ion exchange particles are coated ion exchange particles. In some embodiments, said coated ion exchange particles comprise an oxide material coated with an oxide or a polymer. In some embodiments, said ion exchange unit modulates the pH of the liquid resource to neutralize protons released from said ion exchange particles. In some embodiments, said purification unit comprises a second precipitation unit for precipitating and filtering out impurities as insoluble hydroxides. In some embodiments, said purification unit comprises a second precipitation unit for precipitating and filtering out impurities as insoluble carbonates. In some embodiments, said purification unit comprises an ion exchange resin for removing impurities. In some embodiments, said precipitated lithium salt is lithium carbonate, wherein said first precipitation unit dissolves said lithium carbonate using carbon dioxide to yield dissolved lithium carbonate, and crystallizes the dissolved lithium carbonate by driving off carbon dioxide. In some embodiments, said first precipitation unit yields a sodium sulfate byproduct. In some embodiments, said first precipitation unit yields a sodium sulfate byproduct and a lithium hydroxide or lithium hydroxide monohydrate product. In some embodiments, said first precipitation unit comprises a multi-effect crystallizer.

In another aspect disclosed herein, is a process for lithium production, comprising: (a) contacting ion exchange particles with a liquid resource to produce lithiated ion exchange particles; (b) treating the lithiated ion exchange particles with an eluent comprising a volatile acid to yield a lithium salt solution; (c) mixing a precipitant with said lithium salt solution to precipitate a lithium salt and yield an effluent; (d) mixing sulfuric acid with said effluent to yield an effluent mixture; (e) heating the effluent mixture to distill off volatile acid vapors; and (f) condensing said volatile acid vapors to yield recycled acid.

In some embodiments, steps (d) and (e) produces a sulfate byproduct. In some embodiments, the process further comprises removing impurities from said sulfate byproduct. In some embodiments, the process further comprises removing water from said lithium salt solution after step (b) and before step (c). In some embodiments, said removing water comprises using a reverse osmosis unit, a mechanical evaporator, a mechanical vapor recompression evaporator, or combinations thereof. In some embodiments, the precipitant is sodium carbonate and the precipitated lithium salt is lithium carbonate. In some embodiments, the precipitant is sodium hydroxide and the precipitated lithium salt is lithium hydroxide. In some embodiments, the precipitant is sodium hydroxide and the precipitated lithium salt is lithium hydroxide monohydrate. In some embodiments, the effluent is sodium nitrate, sodium chloride, sodium bromide, or sodium iodide. In some embodiments, the effluent is sodium nitrate. In some embodiments, the effluent is sodium chloride. In some embodiments, the process further comprises a removing impurities from said lithium salt solution. In some embodiments, the volatile acid is i) fresh or virgin volatile acid, ii) the recycled volatile acid, or iii) both. In some embodiments, said volatile acid is a volatile mineral acid comprising nitric acid, hydrochloric acid, hydrofluoric acid, hydrobromic acid, hydroiodic acid, or carbonic acid. In some embodiments, said volatile acid is nitric acid. In some embodiments, said volatile acid is hydrochloric acid. In some embodiments, the heating comprises heating the effluent mixture in a distillation unit operating at temperatures of about 50 to about 150 degrees Celsius. In some embodiments, the heating comprises heating the effluent mixture in a distillation unit operating at temperatures of about 100 to about 200 degrees Celsius. In some embodiments, the heating comprises heating the effluent mixture in a distillation unit operating at temperatures of about 100 to about 300 degrees Celsius. In some embodiments, the heating comprises heating the effluent mixture in a distillation unit operating at temperatures of about 200 to about 400 degrees Celsius. In some embodiments, the heating comprises heating the effluent mixture in a distillation unit operating at temperatures of about 400 to about 600 degrees Celsius. In some embodiments, the heating comprises heating the effluent mixture in a distillation unit operating at temperatures of above 600 degrees Celsius. In some embodiments, steps (d) and (e) yields lithium sulfate in aqueous form. In some embodiments, steps (d) and (e) yields lithium sulfate in solid form. In some embodiments, the heating comprises heating the effluent mixture in a distillation unit operating at pressures from about 0.01 atm to about 0.1 atm. In some embodiments, the heating comprises heating the effluent mixture in a distillation unit operating at pressures from about 0.1 atm to about 1.0 atm. In some embodiments, the heating comprises heating the effluent mixture in a distillation unit operating at pressures from about 1.0 atm to about 10 atm. In some embodiments, the heating comprises heating the effluent mixture in a distillation unit operating at pressures above 10 atm. In some embodiments, the condensing comprises condensing the volatile acid vapors in a condensing unit operating at pressures from about 1 atm to about 10 atm. In some embodiments, the condensing comprises condensing the volatile acid vapors in a condensing unit operating at pressures from about 10 atm to about 100 atm. In some embodiments, the condensing comprises condensing the volatile acid vapors in a condensing unit operating at pressures from about 100 atm to about 1,000 atm. In some embodiments, the condensing comprises condensing the volatile acid vapors in a condensing unit operating at temperatures from about −200 degrees Celsius to about −100 degrees Celsius. In some embodiments, the condensing comprises condensing the volatile acid vapors in a condensing unit operating at temperatures from about −100 degrees Celsius to about −50 degrees Celsius. In some embodiments, the condensing comprises condensing the volatile acid vapors in a condensing unit operating at temperatures from about −50 degrees Celsius to about 0 degrees Celsius. In some embodiments, the condensing comprises condensing the volatile acid vapors in a condensing unit operating at temperatures from about −30 degrees Celsius to about 20 degrees Celsius. In some embodiments, the condensing comprises condensing the volatile acid vapors in a condensing unit operating at temperatures from about 0 degrees Celsius to about 50 degrees Celsius. In some embodiments, the condensing comprises condensing the volatile acid vapors in a condensing unit operating at temperatures above 50 degrees Celsius. In some embodiments, said ion exchange particles are coated ion exchange particles. In some embodiments, said coated ion exchange particles comprise an oxide material coated with an oxide or a polymer. In some embodiments, the process further comprises modulating the pH of the liquid resource to neutralize protons released from said ion exchange particles. In some embodiments, said removing impurities comprises precipitating and filtering out impurities as insoluble hydroxides. In some embodiments, said removing impurities comprises precipitating and filtering out impurities as insoluble carbonates. In some embodiments, said removing impurities comprises using an ion exchange resin. In some embodiments, said precipitated lithium salt is lithium carbonate. In some embodiments, the process further comprises i) dissolving said lithium carbonate using carbon dioxide to yield dissolved lithium carbonate, and ii) crystallizing the dissolved lithium carbonate by driving off carbon dioxide. In some embodiments, said mixing a precipitant yields a sodium sulfate byproduct. In some embodiments, said mixing a precipitant yields a sodium sulfate byproduct and a lithium hydroxide or lithium hydroxide monohydrate product. In some embodiments, the process further comprises providing a system disclosed herein.

Additional Exemplary Aspects of a System for Producing a Lithium Compound

In one aspect disclosed herein, is a system for production of a lithium compound, comprising: a) an ion exchange unit containing ion exchange particles that absorb lithium from a liquid resource while releasing protons and that then release lithium into an eluent containing nitric acid while absorbing protons to yield an eluate containing lithium nitrate; b) a heating unit to decompose said lithium nitrate to crystallize lithium oxide solids while release nitrogen oxide gas; c) an absorption unit to absorb said nitrogen oxide gas into a scrubbing solution to yield nitric acid; and d) a hydration unit to combine said lithium oxide solids with water to form lithium hydroxide.

In some embodiments, the system further comprises a purification unit after the ion exchange unit and before the heating unit to remove impurities from the lithium nitrate. In some embodiments, the system further comprises a purification unit after the hydration unit to remove impurities from the lithium hydroxide. In some embodiments, the purification unit filters out insoluble hydroxide impurities. In some embodiments, the purification unit removes impurities from the lithium using hydroxide precipitation, carbonate precipitation, ion exchange, solvent extraction, or combinations thereof. In some embodiments, the system further comprises a crystallization unit after the hydration unit to crystallize a lithium hydroxide solids. In some embodiments, the system further comprises a crystallization unit after the hydration unit to crystallize a lithium hydroxide monohydrate solids. In some embodiments, the system further comprises a precipitation unit after the hydration unit to crystallize a lithium carbonate solids. In some embodiments, carbon dioxide or sodium hydroxide are added to the lithium hydroxide to precipitate lithium carbonate solids. In some embodiments, the system further comprises a concentration unit between step (a) and step (b) to remove water from the lithium nitrate. In some embodiments, said concentration unit comprises a reverse osmosis unit, a mechanical evaporator, a mechanical vapor recompression evaporator, or combinations thereof. In some embodiments, the system further comprises a drying unit between step (a) and step (b) to remove water from the lithium nitrate. In some embodiments, the system further comprises a drying unit between step (a) and step (b) to remove water from the lithium nitrate to form a molten lithium nitrate salt. In some embodiments, said lithium nitrate is in a molten salt form in step (b). In some embodiments, said lithium nitrate contains water in step (b). In some embodiments, said nitrogen oxide gas comprises molecules of NO2, O2, NO, and combinations thereof. In some embodiments, said heating unit of step (b) heats the lithium nitrate to temperatures of about 300 C to about 500 C. In some embodiments, said heating unit of step (b) heats the lithium nitrate to temperatures of about 500 C to about 700 C. In some embodiments, said heating unit of step (b) heats the lithium nitrate to temperatures of about 600 C to about 700 C. In some embodiments, said heating unit of step (b) heats the lithium nitrate to temperatures of about 600 C to about 800 C. In some embodiments, said heating unit of step (b) heats the lithium nitrate to temperatures of about 800 C to about 1,000 C. In some embodiments, said heating unit contains a catalysts to facilitate decomposition of the lithium nitrate. In some embodiments, the nitric acid of step (c) is returned to the eluent of step (a). In some embodiments, the hydration unit yields an aqueous solution of lithium hydroxide. In some embodiments, the hydration unit yield lithium hydroxide monohydrate. In some embodiments, the hydration unit is a mixing tank. In some embodiments, said heating unit is a spray dryer. In some embodiments, said ion exchange particles are coated ion exchange particles. In some embodiments, said ion exchange particles comprise an oxide material coated with an oxide or a polymer. In some embodiments, said ion exchange unit modulates the pH of the brine to neutralize protons released from said ion exchange particles. In some embodiments, said absorption unit comprises an absorption vessel filled with porous packing media. In some embodiments, said scrubbing solution contains hydrogen peroxide.

In another aspect disclosed herein, is a system for lithium production, comprising: (a) an ion exchange unit containing ion exchange particles that absorb lithium from a liquid resource while releasing protons and that then release lithium into an eluent containing an acid while absorbing protons to yield an eluate solution containing lithium; (b) a distillation unit that mixes sulfuric acid with said eluate solution and heats the resulting mixture to distill off acid vapors and yield lithium sulfate; and (c) a condensation unit to condense said acid vapors to yield said acid for reuse in said ion exchange unit.

In some embodiments, the system further comprises a concentration unit to remove water from said eluate solution after step (a) and before step (b). In some embodiments, the system further comprises a precipitation unit to add a precipitant to said lithium sulfate yielding lithium solids. In some embodiments, the system further comprises a carbonation unit where sodium carbonate is added to precipitate lithium carbonate. In some embodiments, the system further comprises a crystallization unit where sodium hydroxide is added to crystallize lithium hydroxide. In some embodiments, the system further comprises a crystallization unit where sodium hydroxide is added to crystallize lithium hydroxide monohydrate. In some embodiments, the system further comprises a crystallization unit where sodium hydroxide is added to first crystallize a sodium sulfate byproduct and then crystallize a lithium hydroxide product. In some embodiments, the system further comprises a purification unit after the ion exchange unit and before the distillation unit to remove impurities from said lithium eluate. In some embodiments, the system further comprises a purification unit after said distillation unit to remove impurities from said lithium sulfate. In some embodiments, said acid is nitric acid, hydrochloric acid, hydrofluoric acid, hydrobromic acid, hydroiodic acid, or carbonic acid. In some embodiments, said acid is nitric acid. In some embodiments, said acid is hydrochloric acid. In some embodiments, the distillation unit operates at temperatures of about 50 to about 150 degrees Celsius. In some embodiments, the distillation unit operates at temperatures of about 100 to about 200 degrees Celsius. In some embodiments, the distillation unit operates at temperatures of about 100 to about 300 degrees Celsius. In some embodiments, the distillation unit operates at temperatures of about 200 to about 400 degrees Celsius. In some embodiments, the distillation unit operates at temperatures of about 400 to about 600 degrees Celsius. In some embodiments, the distillation unit operates at temperatures of above 600 degrees Celsius. In some embodiments, the distillation unit yields lithium sulfate in aqueous form. In some embodiments, the distillation unit yields lithium sulfate in solid form. In some embodiments, the distillation unit operates at pressures from about 0.01 atm to about 0.1 atm. In some embodiments, the distillation unit operates at pressures from about 0.1 atm to about 1.0 atm. In some embodiments, the distillation unit operates at pressures from about 1.0 atm to about 10 atm. In some embodiments, the distillation unit operates at pressures above 10 atm. In some embodiments, the condensation unit operates at pressures from about 1 atm to about 10 atm. In some embodiments, the condensation unit operates at pressures from about 10 atm to about 100 atm. In some embodiments, the condensation unit operates at pressures from about 100 atm to about 1,000 atm. In some embodiments, the condensation unit operates at temperatures from about −200 Celsius to about −100 Celsius. In some embodiments, the condensation unit operates at temperatures from about −100 Celsius to about −50 Celsius. In some embodiments, the condensation unit operates at temperatures from about −50 Celsius to about 0 Celsius. In some embodiments, the condensation unit operates at temperatures from about −30 Celsius to about 20 Celsius. In some embodiments, the condensation unit operates at temperatures from about 0 Celsius to about 50 Celsius. In some embodiments, the condensation unit operates at temperatures above 50 Celsius. In some embodiments, said ion exchange particles are coated ion exchange particles. In some embodiments, said ion exchange particles comprise an oxide material coated with an oxide or a polymer. In some embodiments, said ion exchange unit modulates the pH of the brine to neutralize protons released from said ion exchange particles. In some embodiments, said purification unit comprises a precipitation unit for precipitating and filtering out impurities as insoluble hydroxides. In some embodiments, said purification unit comprises a precipitation unit for precipitating and filtering out impurities as insoluble carbonates. In some embodiments, said purification unit comprises an ion exchange resin for removing impurities. In some embodiments, said precipitation unit crystallize lithium carbonate, dissolves said lithium carbonate using carbon dioxide, and recrystallizes lithium carbonate by driving off carbon dioxide. In some embodiments, said precipitation unit yields a sodium sulfate byproduct. In some embodiments, said precipitation unit yields a sodium sulfate byproduct and a lithium hydroxide or lithium hydroxide monohydrate product. In some embodiments, said concentration unit comprises a reverse osmosis unit. In some embodiments, said concentration unit comprises a mechanical evaporation unit. In some embodiments, said precipitation unit comprises a multi-effect crystallizer.

In another aspect, disclosed herein is a system for lithium production, comprising: (a) an ion exchange unit containing ion exchange particles that absorb lithium from a liquid resource while releasing protons and that then release lithium into a solution containing an acid while absorbing protons to yield a lithium salt solution; (b) a concentration unit to remove water from said lithium salt solution; (c) a distillation unit that mixes sulfuric acid with said lithium salt solution and heats the resulting mixture to distill off acid vapors and yield lithium sulfate; (d) a purification unit to remove impurities from said lithium sulfate; (e) a conversion unit to add sodium hydroxide to said lithium sulfate yielding a lithium hydroxide solution; (f) a crystallization unit to crystallize a lithium compound from said lithium hydroxide solution; and (g) a condensation unit to condense said acid vapors yielding said acid for reuse in said ion exchange unit.

In some embodiments, said acid is nitric acid, hydrochloric acid, hydrofluoric acid, hydrobromic acid, hydroiodic acid, or carbonic acid. In some embodiments, said ion exchange particles are coated ion exchange particles. In some embodiments, said ion exchange particles comprise an oxide material coated with an oxide or a polymer. In some embodiments, said ion exchange unit modulates the pH of the brine to neutralize protons released from said ion exchange particles. In some embodiments, said purification unit comprises a precipitation unit for precipitating and filtering out impurities as insoluble hydroxides. In some embodiments, said purification unit comprises a precipitation unit for precipitating and filtering out impurities as insoluble carbonates. In some embodiments, said purification unit comprises an ion exchange unit for removing impurities using an ion exchange resin. In some embodiments, said conversion unit crystallizes a sodium sulfate byproduct. In some embodiments, said concentration unit comprises a reverse osmosis unit. In some embodiments, said concentration unit comprises a mechanical evaporation unit. In some embodiments, said crystallization unit comprises a multi-effect crystallizer. In some embodiments, said crystallization unit crystallizes lithium hydroxide monohydrate. In some embodiments, said crystallization unit combines said lithium hydroxide solution with carbon dioxide or sodium hydroxide to crystallize lithium carbonate.

In another aspect disclosed herein, is a system for lithium production, comprising: (a) an ion exchange unit containing ion exchange particles that absorb lithium from a liquid resource while releasing protons and that then release lithium into a solution containing an acid while absorbing protons to yield a lithium salt solution; (b) a concentration unit to remove water from said lithium salt solution; (c) a distillation unit that mixes sulfuric acid with said lithium salt solution and heats the resulting mixture to distill off acid vapors and yield lithium sulfate; (d) a purification unit to remove impurities from said lithium sulfate; (e) a precipitation unit to add sodium carbonate to said lithium sulfate yielding lithium carbonate solids; and (f) a condensation unit to condense said acid vapors yielding said acid for reuse in said ion exchange unit.

In some embodiments, said acid is nitric acid, hydrochloric acid, hydrofluoric acid, hydrobromic acid, hydroiodic acid, or carbonic acid. In some embodiments, said ion exchange particles are coated ion exchange particles. In some embodiments, said ion exchange particles comprise an oxide material coated with an oxide or a polymer. In some embodiments, said ion exchange unit modulates the pH of the brine to neutralize protons released from said ion exchange particles. In some embodiments, said purification unit comprises a precipitation unit for precipitating and filtering out impurities as insoluble hydroxides. In some embodiments, said purification unit comprises a precipitation unit for precipitating and filtering out impurities as insoluble carbonates. In some embodiments, said purification unit comprises an ion exchange resin for removing impurities. In some embodiments, said precipitation unit crystallize lithium carbonate, dissolves said lithium carbonate using carbon dioxide, and recrystallizes lithium carbonate by driving off carbon dioxide. In some embodiments, said precipitation unit yields a sodium sulfate byproduct. In some embodiments, said concentration unit comprises a reverse osmosis unit. In some embodiments, said concentration unit comprises a mechanical evaporation unit. In some embodiments, said precipitation unit comprises a multi-effect crystallizer.

In another aspect disclosed herein, is a system for lithium production, comprising: (a) an ion exchange unit containing ion exchange particles that absorb lithium from a liquid resource while releasing protons and that then release lithium into an eluent containing an acid while absorbing protons to yield an eluate solution containing lithium; (b) a precipitation unit where a precipitant is mixed with said eluate solution to precipitate a lithium salt and yield a lithium solid and an effluent; (c) a distillation unit that mixes sulfuric acid with said effluent and heats the resulting mixture to distill off acid vapors; and (d) a condensation unit to condense said acid vapors to yield said acid for reuse in said ion exchange unit.

In some embodiments, the distillation unit produces a sulfate byproduct. In some embodiments, the system further comprises a concentration unit to remove water from said eluate solution after step (a) and before step (b). In some embodiments, said concentration unit comprises a reverse osmosis unit, a mechanical evaporator, a mechanical vapor recompression evaporator, or combinations thereof. In some embodiments, the precipitant is sodium carbonate and the lithium solid is lithium carbonate. In some embodiments, the precipitant is sodium hydroxide and the lithium solid is lithium hydroxide. In some embodiments, the precipitant is sodium hydroxide and the lithium solid is lithium hydroxide monohydrate. In some embodiments, the effluent is sodium nitrate, sodium chloride, sodium bromide, or sodium iodide. In some embodiments, the effluent is sodium nitrate. In some embodiments, the effluent is sodium chloride. In some embodiments, the system further comprises a purification unit after the ion exchange unit and before the distillation unit to remove impurities from said lithium eluate. In some embodiments, the system further comprises a purification unit after said distillation unit to remove impurities from said lithium sulfate. In some embodiments, said acid is nitric acid, hydrochloric acid, hydrofluoric acid, hydrobromic acid, hydroiodic acid, or carbonic acid. In some embodiments, said acid is nitric acid. In some embodiments, said acid is hydrochloric acid. In some embodiments, the distillation unit operates at temperatures of about 50 to about 150 degrees Celsius. In some embodiments, the distillation unit operates at temperatures of about 100 to about 200 degrees Celsius. In some embodiments, the distillation unit operates at temperatures of about 100 to about 300 degrees Celsius. In some embodiments, the distillation unit operates at temperatures of about 200 to about 400 degrees Celsius. In some embodiments, the distillation unit operates at temperatures of about 400 to about 600 degrees Celsius. In some embodiments, the distillation unit operates at temperatures of above 600 degrees Celsius. In some embodiments, the distillation unit yields lithium sulfate in aqueous form. In some embodiments, the distillation unit yields lithium sulfate in solid form. In some embodiments, the distillation unit operates at pressures from about 0.01 atm to about 0.1 atm. In some embodiments, the distillation unit operates at pressures from about 0.1 atm to about 1.0 atm. In some embodiments, the distillation unit operates at pressures from about 1.0 atm to about 10 atm. In some embodiments, the distillation unit operates at pressures above 10 atm. In some embodiments, the condensation unit operates at pressures from about 1 atm to about 10 atm. In some embodiments, the condensation unit operates at pressures from about 10 atm to about 100 atm. In some embodiments, the condensation unit operates at pressures from about 100 atm to about 1,000 atm. In some embodiments, the condensation unit operates at temperatures from about −200 Celsius to about −100 Celsius. In some embodiments, the condensation unit operates at temperatures from about −100 Celsius to about −50 Celsius. In some embodiments, the condensation unit operates at temperatures from about −50 Celsius to about 0 Celsius. In some embodiments, the condensation unit operates at temperatures from about −30 Celsius to about 20 Celsius. In some embodiments, the condensation unit operates at temperatures from about 0 Celsius to about 50 Celsius. In some embodiments, the condensation unit operates at temperatures above 50 Celsius. In some embodiments, said ion exchange particles are coated ion exchange particles. In some embodiments, said ion exchange particles comprise an oxide material coated with an oxide or a polymer. In some embodiments, said ion exchange unit modulates the pH of the brine to neutralize protons released from said ion exchange particles. In some embodiments, said purification unit comprises a precipitation unit for precipitating and filtering out impurities as insoluble hydroxides. In some embodiments, said purification unit comprises a precipitation unit for precipitating and filtering out impurities as insoluble carbonates. In some embodiments, said purification unit comprises an ion exchange resin for removing impurities. In some embodiments, said precipitation unit crystallize lithium carbonate, dissolves said lithium carbonate using carbon dioxide, and recrystallizes lithium carbonate by driving off carbon dioxide. In some embodiments, said precipitation unit yields a sodium sulfate byproduct. In some embodiments, said precipitation unit yields a sodium sulfate byproduct and a lithium hydroxide or lithium hydroxide monohydrate product. In some embodiments, said precipitation unit comprises a multi-effect crystallizer.

Additional Exemplary Aspects of a System and Process for Producing Lithium Oxide/Lithium Hydroxide with Lithium Salt Decomposition In some embodiments, a lithium salt such as lithium nitrate or lithium sulfate may be decomposed utilizing direct or indirect heat produced via a combustion system. In some embodiments, the combustion system may use hydrogen, methane, carbon monoxide, syngas, fuel gases, hydrocarbons, oxygen, air, or combinations thereof as inputs. In some embodiments, oxygen concentration in the feed stream may be varied to facilitate decomposition of the lithium salt. In some embodiments, the hydrogen and oxygen inputs may be produced via one or more electrolytic cells. In some embodiments, oxygen from the electrolytic cell may be used to facilitate oxidative scrubbing and recapture of nitrogen oxide or sulfur oxide gases produced from the salt decomposition.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

Additional Embodiments

Embodiment 1. A system for production of lithium hydroxide, comprising:
a) an ion exchange unit containing ion exchange particles that absorb lithium from a liquid resource and that then release the absorbed lithium into an eluent comprising nitric acid to yield an eluate comprising lithium nitrate;
b) a heating unit that decomposes said lithium nitrate to crystallize lithium oxide solids while releasing nitrogen oxide gas;
c) an absorption unit that absorbs said nitrogen oxide gas into a scrubbing solution to yield recycled nitric acid; and
d) a hydration unit that combines said lithium oxide solids with water to form lithium hydroxide.

Embodiment 2. The system according to embodiment 1, further comprising a purification unit after the ion exchange unit and before the heating unit to remove impurities from the lithium nitrate.

Embodiment 3. The system according to embodiment 1 or 2, further comprising a purification unit after the hydration unit to remove impurities from the lithium hydroxide.

Embodiment 4. The system according to embodiment 2 or 3, wherein the purification unit filters out insoluble hydroxide impurities.

Embodiment 5. The system according to embodiment 2 or 3, wherein the purification unit removes impurities from the lithium nitrate or lithium hydroxide using hydroxide precipitation, carbonate precipitation, ion exchange, solvent extraction, or combinations thereof.

Embodiment 6. The system according to any one of embodiments 1 to 5, further comprising a crystallization unit after the hydration unit to crystallize the lithium hydroxide.

Embodiment 7. The system according to any one of embodiments 1 to 6, further comprising a crystallization unit after the hydration unit to crystallize lithium hydroxide monohydrate solids.

Embodiment 8. The system according any one of embodiments 1 to 7, further comprising a precipitation unit after the hydration unit to crystallize lithium carbonate solids.

Embodiment 9. The system according to any one of embodiments 1 to 8, wherein carbon dioxide or sodium hydroxide is added to the lithium hydroxide to precipitate the lithium carbonate solids.

Embodiment 10. The system according any one of embodiments 1 to 9, further comprising a concentration unit between step (a) and step (b) to remove water from the eluate comprising the lithium nitrate.

Embodiment 11. The system according to embodiment 10, wherein said concentration unit comprises a reverse osmosis unit, a mechanical evaporator, a mechanical vapor recompression evaporator, or combinations thereof.

Embodiment 12. The system according to any one of embodiments 1 to 11, further comprising a drying unit between step (a) and step (b) to remove water from the eluate comprising lithium nitrate.

Embodiment 13. The system according to any one of embodiments 1 to 12, further comprising a drying unit between step (a) and step (b) to remove water from the eluate comprising the lithium nitrate to form a molten lithium nitrate salt that is decomposed by the heating unit to crystallize the lithium oxide solids while releasing nitrogen oxide gas.

Embodiment 14. The system according to any one of embodiments 1 to 13, wherein said lithium nitrate is in a molten salt form in step (b).

Embodiment 15. The system according to any one of embodiments 1 to 14, where said eluate comprising lithium nitrate comprises water.

Embodiment 16. The system according to any one of embodiments 1 to 15, wherein said nitrogen oxide gas comprises molecules of NO2, O2, NO, or combinations thereof.

Embodiment 17. The system according to any one of embodiments 1 to 16, wherein said heating unit of step (b) heats the lithium nitrate to temperatures of about 300° C. to about 500° C.

Embodiment 18. The system according to any one of embodiments 1 to 16, wherein said heating unit of step (b) heats the lithium nitrate to temperatures of about 500° C. to about 700° C.

Embodiment 19. The system according to any one of embodiments 1 to 16, wherein said heating unit of step (b) heats the lithium nitrate to temperatures of about 600° C. to about 700° C.

Embodiment 20. The system according to any one of embodiments 1 to 16, wherein said heating unit of step (b) heats the lithium nitrate to temperatures of about 600° C. to about 800° C.

Embodiment 21. The system according to any one of embodiments 1 to 16, wherein said heating unit of step (b) heats the lithium nitrate to temperatures of about 800° C. to about 1,000° C.

Embodiment 22. The system according to any one of embodiments 1 to 21, wherein said heating unit comprises a catalyst to facilitate decomposition of the lithium nitrate.

Embodiment 23. The system according to any one of embodiments 1 to 22, wherein the nitric acid comprises i) fresh nitric acid (e.g., unused or virgin nitric acid), ii) the recycled nitric acid, or iii) both.

Embodiment 24. The system according to any one of embodiments 1 to 23, wherein the recycled nitric acid is returned to the eluent of step (a).

Embodiment 25. The system according to any one of embodiments 1 to 24, wherein the hydration unit yields an aqueous solution of the lithium hydroxide.

Embodiment 26. The system according to any one of embodiments 1 to 25, wherein the hydration unit yields lithium hydroxide monohydrate.

Embodiment 27. The system according to any one of embodiments 1 to 26, wherein the hydration unit is a mixing tank.

Embodiment 28. The system according to any one of embodiments 1 to 26, wherein said heating unit is a spray dryer.

Embodiment 29. The system according to any one of embodiments 1 to 28, wherein said ion exchange particles are coated ion exchange particles.

Embodiment 30. The system according to embodiment 29, wherein said coated ion exchange particles comprise an oxide material coated with an oxide or a polymer.

Embodiment 31. The system according to any one of embodiments 1 to 30, wherein said ion exchange unit modulates the pH of the liquid resource to neutralize protons released from said ion exchange particles.

Embodiment 32. The system according to any one of embodiments 1 to 31, wherein said absorption unit comprises an absorption vessel filled with porous packing media.

Embodiment 33. The system according to any one of embodiments 1 to 32, wherein said scrubbing solution comprises hydrogen peroxide.

Embodiment 34. A process for producing lithium hydroxide, comprising:
(a) contacting ion exchange particles with a liquid resource to produce lithiated ion exchange particles;
(b) treating the lithiated ion exchange particles with an eluent comprising nitric acid to yield an eluate comprising lithium nitrate;
(c) heating said eluate comprising lithium nitrate to crystallize lithium oxide solids while releasing nitrogen oxide gas;
(d) providing the nitrogen oxide gas into a scrubbing solution to yield recycled nitric acid; and
(e) combining said lithium oxide solids with water to form lithium hydroxide.

Embodiment 35. The process according to embodiment 34, further comprising purifying the eluate comprising lithium nitrate before step (c) so as to remove impurities from the lithium nitrate.

Embodiment 36. The process according to embodiment 34 or 35, further comprising purifying the lithium hydroxide to remove impurities therefrom.

Embodiment 37. The process according to embodiment 35 or 36, wherein the purifying comprises filtering out insoluble hydroxide impurities.

Embodiment 38. The process according to embodiment 35 or 36, wherein the purifying comprises removing impurities from the lithium nitrate or lithium hydroxide using hydroxide precipitation, carbonate precipitation, ion exchange, solvent extraction, or combinations thereof.

Embodiment 39. The process according to any one of embodiments 34 to 38, further comprising crystallizing the lithium hydroxide.

Embodiment 40. The process according to any one of embodiments 34 to 39, further comprising crystallizing lithium hydroxide monohydrate solids.

Embodiment 41. The process according to any one of embodiments 34 to 40, further comprising crystallizing lithium carbonate solids.

Embodiment 42. The process according to embodiment 41, wherein crystallizing the lithium carbonate solids comprises adding carbon dioxide or sodium hydroxide to the lithium hydroxide to precipitate the lithium carbonate solids.

Embodiment 43. The process according to any one of embodiments 34 to 42, further comprising removing water from the eluate comprising lithium nitrate before step (c).

Embodiment 44. The process according to embodiment 43, wherein said removing comprises using a reverse osmosis unit, a mechanical evaporator, a mechanical vapor recompression evaporator, or combinations thereof.

Embodiment 45. The process according to any one of embodiments 34 to 44, further comprising drying the eluate comprising lithium nitrate before step (c).

Embodiment 46. The process according to any one of embodiments 34 to 45, further comprising drying the eluate comprising lithium nitrate before step (c) to remove water from the eluate comprising the lithium nitrate, so as to form a molten lithium nitrate salt that is heated to crystallize the lithium oxide solids while releasing nitrogen oxide gas.

Embodiment 47. The process according to any one of embodiments 34 to 46, wherein said lithium nitrate is in a molten salt form in step (c).

Embodiment 48. The process according to any one of embodiments 34 to 47, where said eluate comprising lithium nitrate comprises water.

Embodiment 49. The process according to any one of embodiments 34 to 48, wherein said nitrogen oxide gas comprises molecules of $NO_2$, $O_2$, $NO$, or combinations thereof.

Embodiment 50. The process according to any one of embodiments 34 to 49, wherein said heating comprises heating the lithium nitrate to temperatures of about 300° C. to about 500° C.

Embodiment 51. The process according to any one of embodiments 34 to 49, wherein said heating comprises heating the lithium nitrate to temperatures of about 500° C. to about 700° C.

Embodiment 52. The process according to any one of embodiments 34 to 49, wherein said heating comprises heating the lithium nitrate to temperatures of about 600° C. to about 700° C.

Embodiment 53. The process according to any one of embodiments 34 to 49, wherein said heating comprises heating the lithium nitrate to temperatures of about 600° C. to about 800° C.

Embodiment 54. The process according to any one of embodiments 34 to 49, wherein said heating comprises heating the lithium nitrate to temperatures of about 800° C. to about 1,000° C.

Embodiment 55. The process according to any one of embodiments 34 to 54, further comprising providing a catalyst to facilitate decomposition of the lithium nitrate in step (c).

Embodiment 56. The process according to any one of embodiments 34-55, wherein agitation, knocking, mixing, or milling facilitates decomposition of the lithium nitrate in step (c).

Embodiment 57. The process according to any one of embodiments 34-56, wherein a combustion system utilizing hydrogen, methane, carbon monoxide, syngas, fuel gases, oxygen, or combinations thereof is used to heat and facilitate decomposition of the lithium nitrate in step (c).

Embodiment 58. The process according to embodiment 57, wherein electrolytic cells are utilized to produce hydrogen, oxygen, or combinations thereof as inputs to the combustion system.

Embodiment 59. The process according to any one of embodiments 34 to 58, wherein the nitric acid comprises i) fresh nitric acid (e.g., unused or virgin nitric acid), ii) the recycled nitric acid, or iii) both.

Embodiment 60. The process according to any one of embodiments 34 to 59, wherein the recycled nitric acid is returned to the eluent of step (b).

Embodiment 61. The process according to any one of embodiments 34 to 60, wherein the formed lithium hydroxide is an aqueous solution of the lithium hydroxide.

Embodiment 62. The process according to any one of embodiments 34 to 61, wherein the formed lithium hydroxide comprises lithium hydroxide monohydrate.

Embodiment 63. The process according to any one of embodiments 34 to 62, wherein said ion exchange particles are coated ion exchange particles.

Embodiment 64. The process according to embodiment 63, wherein said coated ion exchange particles comprise an oxide material coated with an oxide or a polymer.

Embodiment 65. The process according to any one of embodiments 34 to 64, further comprising modulating the pH of the liquid resource to neutralize protons released from said ion exchange particles.

Embodiment 66. The process according to any one of embodiments 34 to 65, wherein said scrubbing solution comprises hydrogen peroxide, fresh nitric acid, recycled nitric acid, water, or combinations thereof.

Embodiment 67. The process according to any one of embodiments 34 to 66, further comprising providing the system of any one of embodiments 1 to 33.

Embodiment 68. A system for production of lithium hydroxide, comprising:
(a) an ion exchange unit containing ion exchange particles that absorb lithium from a liquid resource and that then release the absorbed lithium into an eluent comprising sulfuric acid to yield an eluate comprising lithium sulfate;
(b) a heating unit that decomposes said lithium sulfate to crystallize lithium oxide solids while releasing sulfur oxide gas;
(c) an absorption unit that absorbs said sulfur oxide gas into a scrubbing solution to yield recycled sulfuric acid; and
(d) a hydration unit that combines said lithium oxide solids with water to form lithium hydroxide.

Embodiment 69. The system according to embodiment 68, further comprising a purification unit after the ion exchange unit and before the heating unit to remove impurities from the lithium sulfate.

Embodiment 70. The system according to embodiment 68 or 69, further comprising a purification unit after the hydration unit to remove impurities from the lithium hydroxide.

Embodiment 71. The system according to embodiment 68 or 69, wherein the purification unit filters out insoluble hydroxide impurities.

Embodiment 72. The system according to embodiment 68 or 69, wherein the purification unit removes impurities from the lithium sulfate or lithium hydroxide using hydroxide precipitation, carbonate precipitation, ion exchange, solvent extraction, or combinations thereof.

Embodiment 73. The system according to any one of embodiments 68 to 72, further comprising a crystallization unit after the hydration unit to crystallize the lithium hydroxide.

Embodiment 74. The system according to any one of embodiments 68 to 73, further comprising a crystallization unit after the hydration unit to crystallize lithium hydroxide monohydrate solids.

Embodiment 75. The system according to any one of embodiments 68 to 74, further comprising a precipitation unit after the hydration unit to crystallize lithium carbonate solids.

Embodiment 76. The system according to embodiment 75, wherein carbon dioxide or sodium hydroxide is added to the lithium hydroxide to precipitate the lithium carbonate solids.

Embodiment 77. The system according to any one of embodiments 68 to 76, further comprising a concentration unit between step (a) and step (b) to remove water from the eluate comprising the lithium sulfate.

Embodiment 78. The system according to embodiment 77, wherein said concentration unit comprises a reverse osmosis unit, a mechanical evaporator, a mechanical vapor recompression evaporator, or combinations thereof.

Embodiment 79. The system according to any one of embodiments 68 to 78, further comprising a drying unit between step (a) and step (b) to remove water from the eluate comprising lithium sulfate.

Embodiment 80. The system according to any one of embodiments 68 to 78, further comprising a drying unit between step (a) and step (b) to remove water from the eluate comprising the lithium sulfate to form a molten lithium sulfate salt that is decomposed by the heating unit to crystallize the lithium oxide solids while releasing sulfur oxide gas.

Embodiment 81. The system according to any one of embodiments 68 to 80, wherein said lithium sulfate is in a molten salt form in step (b).

Embodiment 82. The system according to any one of embodiments 68 to 81, where said eluate comprising lithium sulfate comprises water.

Embodiment 83. The system according to any one of embodiments 68 to 82, wherein said sulfur oxide gas comprises molecules of SO3, SO2, O2, SO, or combinations thereof.

Embodiment 84. The system according to any one of embodiments 68 to 83, wherein said heating unit of step (b) heats the lithium sulfate to temperatures of about 1,000° C. to about 1,600° C.

Embodiment 85. The system according to any one of embodiments 68 to 83, wherein said heating unit of step (b) heats the lithium sulfate to temperatures of about 1,100° C. to about 1,500° C.

Embodiment 86. The system according to any one of embodiments 68 to 83, wherein said heating unit of step (b) heats the lithium sulfate to temperatures of about 1,200° C. to about 1,400° C.

Embodiment 87. The system according to any one of embodiments 68 to 83, wherein said heating unit of step (b) heats the lithium sulfate to temperatures of about 1,200° C. to about 1,500° C.

Embodiment 88. The system according to any one of embodiments 68 to 83, wherein said heating unit of step (b) heats the lithium sulfate to temperatures of about 1,300° C. to about 1,600° C.

Embodiment 89. The system according to any one of embodiments 68 to 88, wherein said heating unit of step (b) comprises a catalyst to facilitate decomposition of the lithium sulfate.

Embodiment 90. The process according to any one of embodiments 68-89, wherein agitation, knocking, mixing, or milling facilitates decomposition of the lithium sulfate in step (b).

Embodiment 91. The process according to any one of embodiments 68-90, wherein a combustion system utilizing hydrogen, methane, carbon monoxide, syngas, fuel gases, hydrocarbons, oxygen, air, or combinations thereof is used to heat and facilitate decomposition of the lithium sulfate in step (b).

Embodiment 92. The process according to embodiment 91, wherein electrolytic cells are utilized to produce hydrogen and oxygen as inputs to the combustion system.

Embodiment 93. The system according to any one of embodiments 68 to 92, wherein the sulfuric acid comprises i) fresh sulfuric acid (e.g., unused or virgin sulfuric acid), ii) the recycled sulfuric acid, or iii) both.

Embodiment 94. The system according to any one of embodiments 68 to 93, wherein the recycled sulfuric acid is returned to the eluent of step (a).

Embodiment 95. The system according to any one of embodiments 68 to 94, wherein the hydration unit yields an aqueous solution of the lithium hydroxide.

Embodiment 96. The system according to any one of embodiments 68 to 95, wherein the hydration unit yields lithium hydroxide monohydrate.

Embodiment 97. The system according to any one of embodiments 68 to 96, wherein the hydration unit is a mixing tank.

Embodiment 98. The system according to any one of embodiments 68 to 97, wherein said heating unit is a spray dryer.

Embodiment 99. The system according to any one of embodiments 68 to 98, wherein said ion exchange particles are coated ion exchange particles.

Embodiment 100. The system according to embodiment 99, wherein said coated ion exchange particles comprise an oxide material coated with an oxide or a polymer.

Embodiment 101. The system according to any one of embodiments 68 to 100, wherein said ion exchange unit modulates the pH of the liquid resource to neutralize protons released from said ion exchange particles.

Embodiment 102. The system according to any one of embodiments 68 to 101, wherein said absorption unit comprises an absorption vessel filled with porous packing media.

Embodiment 103. The system according to any one of embodiments 68 to 102, wherein said scrubbing solution comprises hydrogen peroxide, water, fresh sulfuric acid, recycled sulfuric acid, or combinations thereof.

Embodiment 104. A process for producing lithium hydroxide, comprising:
(a) contacting ion exchange particles with a liquid resource to produce lithiated ion exchange particles;

(b) treating the lithiated ion exchange particles with an eluent comprising sulfuric acid to yield an eluate comprising lithium sulfate;
(c) heating said eluate comprising lithium sulfate to crystallize lithium oxide solids while releasing sulfur oxide gas;
(d) providing the sulfur oxide gas into a scrubbing solution to yield recycled sulfuric acid; and
(e) combining said lithium oxide solids with water to form lithium hydroxide.

Embodiment 105. The process according to embodiment 104, further comprising purifying the eluate comprising lithium sulfate before step (c) so as to remove impurities from the lithium sulfate.

Embodiment 106. The process according to embodiment 104 or 105, further comprising purifying the lithium hydroxide to remove impurities therefrom.

Embodiment 107. The process according to embodiment 105 or 106, wherein the purifying comprises filtering out insoluble hydroxide impurities.

Embodiment 108. The process according to embodiment 105 or 106, wherein the purifying comprises removing impurities from the lithium sulfate or lithium hydroxide using hydroxide precipitation, carbonate precipitation, ion exchange, solvent extraction, or combinations thereof.

Embodiment 109. The process according to any one of embodiments 104 to 108, further comprising crystallizing the lithium hydroxide.

Embodiment 110. The process according to any one of embodiments 104 to 108, further comprising crystallizing lithium hydroxide monohydrate solids.

Embodiment 111. The process according to any one of embodiments 104 to 108, further comprising crystallizing lithium carbonate solids.

Embodiment 112. The process according to embodiment 111, wherein crystallizing the lithium carbonate solids comprises adding carbon dioxide or sodium hydroxide to the lithium hydroxide to precipitate the lithium carbonate solids.

Embodiment 113. The process according to any one of embodiments 104 to 112, further comprising removing water from the eluate comprising lithium sulfate before step (c).

Embodiment 114. The process according to embodiment 113, wherein said removing comprises using a reverse osmosis unit, a mechanical evaporator, a mechanical vapor recompression evaporator, or combinations thereof.

Embodiment 115. The process according to any one of embodiments 104 to 114, further comprising drying the eluate comprising lithium sulfate before step (c).

Embodiment 116. The process according to any one of embodiments 104 to 114, further comprising drying the eluate comprising lithium sulfate before step (c) to remove water from eluate comprising the lithium sulfate, so as to form a molten lithium sulfate salt that is heated to crystallize the lithium oxide solids while releasing sulfur oxide gas.

Embodiment 117. The process according to any one of embodiments 104 to 116, wherein said lithium sulfate is in a molten salt form in step (c).

Embodiment 118. The process according to any one of embodiments 104 to 117, where said eluate comprising lithium sulfate comprises water.

Embodiment 119. The process according to any one of embodiments 104 to 118, wherein said sulfur oxide gas comprises molecules of SO3, SO2, O2, SO, or combinations thereof.

Embodiment 120. The process according to any one of embodiments 104 to 119, wherein said heating comprises heating the lithium sulfate to temperatures of about 1,000° C. to about 1,600° C.

Embodiment 121. The process according to any one of embodiments 104 to 119, wherein said heating comprises heating the lithium sulfate to temperatures of about 1,100° C. to about 1,500° C.

Embodiment 122. The process according to any one of embodiments 104 to 119, wherein said heating comprises heating the lithium sulfate to temperatures of about 1,200° C. to about 1,400° C.

Embodiment 123. The process according to any one of embodiments 104 to 119, wherein said heating comprises heating the lithium sulfate to temperatures of about 1,200° C. to about 1,500° C.

Embodiment 124. The process according to any one of embodiments 104 to 119, wherein said heating comprises heating the lithium sulfate to temperatures of about 1,300° C. to about 1,600° C.

Embodiment 125. The process according to any one of embodiments 104 to 124, further comprising providing a catalyst to facilitate decomposition of the lithium sulfate in step (c).

Embodiment 126. The process according to any one of embodiments 104 to 125, wherein agitation, knocking, mixing, or milling facilitates decomposition of the lithium sulfate in step (c).

Embodiment 127. The process according to any one of embodiments 104-126, wherein a combustion system utilizing hydrogen, methane, carbon monoxide, syngas, fuel gases, hydrocarbons, oxygen, air, or combinations thereof is used to heat and facilitate decomposition of the lithium sulfate in step (c).

Embodiment 128. The process according to embodiment 127, wherein electrolytic cells are utilized to produce hydrogen, oxygen, or combinations thereof as inputs to the combustion system.

Embodiment 129. The process according to any one of embodiments 104 to 128, wherein the sulfuric acid comprises i) fresh sulfuric acid (e.g., unused or virgin sulfuric acid), ii) the recycled sulfuric acid, or iii) both.

Embodiment 130. The process according to any one of embodiments 104 to 129, wherein the recycled sulfuric acid is returned to the eluent of step (b).

Embodiment 131. The process according to any one of embodiments 104 to 130, wherein the formed lithium hydroxide is an aqueous solution of the lithium hydroxide.

Embodiment 132. The process according to any one of embodiments 104 to 131, wherein the formed lithium hydroxide comprises lithium hydroxide monohydrate.

Embodiment 133. The process according to any one of embodiments 104 to 132, wherein said ion exchange particles are coated ion exchange particles.

Embodiment 134. The process according to embodiment 133, wherein said coated ion exchange particles comprise an oxide material coated with an oxide or a polymer.

Embodiment 135. The process according to any one of embodiments 104 to 134, further comprising modulating the pH of the liquid resource to neutralize protons released from said ion exchange particles.

Embodiment 136. The process according to any one of embodiments 104 to 135, wherein said scrubbing solution comprises hydrogen peroxide, water, fresh sulfuric acid, recycled sulfuric acid, or combinations thereof.

Embodiment 137. The process according to any one of embodiments 104 to 136, further comprising providing the system of any one of embodiments 68 to 103.

Embodiment 138. A system for production of lithium hydroxide, comprising:
(a) an ion exchange unit containing ion exchange particles that absorb lithium from a liquid resource and that then release the absorbed lithium into an eluent comprising an acid to yield an eluate comprising a lithium salt;
(b) a heating unit that decomposes said lithium salt to crystallize lithium oxide solids while releasing a gaseous oxide;
(c) an absorption unit that absorbs said gaseous oxide into a scrubbing solution to yield recycled acid; and
(d) a hydration unit that combines said lithium oxide solids with water to form lithium hydroxide.

Embodiment 139. The system according to embodiment 138, further comprising a purification unit after the ion exchange unit and before the heating unit to remove impurities from the lithium salt.

Embodiment 140. The system according to embodiment 138 or 139, further comprising a purification unit after the hydration unit to remove impurities from the lithium hydroxide.

Embodiment 141. The system according to embodiment 139 or 140, wherein the purification unit filters out insoluble hydroxide impurities.

Embodiment 142. The system according to embodiment 139 or 140, wherein the purification unit removes impurities from the lithium salt or lithium hydroxide using hydroxide precipitation, carbonate precipitation, ion exchange, solvent extraction, or combinations thereof.

Embodiment 143. The system according to any one of embodiments 138 to 142, further comprising a crystallization unit after the hydration unit to crystallize the lithium hydroxide.

Embodiment 144. The system according to any one of embodiments 138 to 143, further comprising a crystallization unit after the hydration unit to crystallize lithium hydroxide monohydrate solids.

Embodiment 145. The system according to any one of embodiments 138 to 144, further comprising a precipitation unit after the hydration unit to crystallize lithium carbonate solids.

Embodiment 146. The system according to embodiment 145, wherein carbon dioxide or sodium hydroxide is added to the lithium hydroxide to precipitate the lithium carbonate solids.

Embodiment 147. The system according to any one of embodiments 138 to 146, further comprising a concentration unit between step (a) and step (b) to remove water from the eluate comprising the lithium salt.

Embodiment 148. The system according to embodiment 147, wherein said concentration unit comprises a reverse osmosis unit, a mechanical evaporator, a mechanical vapor recompression evaporator, or combinations thereof.

Embodiment 149. The system according to any one of embodiments 138 to 148, further comprising a drying unit between step (a) and step (b) to remove water from the eluate comprising the lithium salt.

Embodiment 150. The system according to any one of embodiments 138 to 148, further comprising a drying unit between step (a) and step (b) to remove water from the eluate comprising the lithium salt to form a molten lithium salt that is decomposed by the heating unit to crystallize the lithium oxide solids while releasing the gaseous oxide.

Embodiment 151. The system according to any one of embodiments 138 to 150, wherein said lithium salt is in a molten salt form in step (b).

Embodiment 152. The system according to any one of embodiments 138 to 151, where said eluate comprising lithium salt comprises water.

Embodiment 153. The system according to any one of embodiments 138 to 152, wherein said heating unit comprises a catalyst to facilitate decomposition of the lithium salt.

Embodiment 154. The system according to any one of embodiments 138 to 153, wherein the acid comprises i) fresh acid (e.g., unused or virgin acid), ii) the recycled acid, or iii) both.

Embodiment 155. The system according to any one of embodiments 138 to 154, wherein the recycled acid is returned to the eluent of step (a).

Embodiment 156. The system according to any one of embodiments 138 to 155, wherein the hydration unit yields an aqueous solution of the lithium hydroxide.

Embodiment 157. The system according to any one of embodiments 138 to 156, wherein the hydration unit yields lithium hydroxide monohydrate.

Embodiment 158. The system according to any one of embodiments 138 to 157, wherein the hydration unit is a mixing tank.

Embodiment 159. The system according to any one of embodiments 138 to 158, wherein said heating unit is a spray dryer.

Embodiment 160. The system according to any one of embodiments 138 to 159, wherein said ion exchange particles are coated ion exchange particles.

Embodiment 161. The system according to embodiment 160, wherein said coated ion exchange particles comprise an oxide material coated with an oxide or a polymer.

Embodiment 162. The system according to any one of embodiments 138 to 161, wherein said ion exchange unit modulates the pH of the liquid resource to neutralize protons released from said ion exchange particles.

Embodiment 163. The system according to any one of embodiments 138 to 162, wherein said absorption unit comprises an absorption vessel filled with porous packing media.

Embodiment 164. The system according to any one of embodiments 138 to 163, wherein said scrubbing solution comprises hydrogen peroxide.

Embodiment 165. A process for producing lithium hydroxide, comprising:
(a) contacting ion exchange particles with a liquid resource to produce lithiated ion exchange particles;
(b) treating the lithiated ion exchange particles with an eluent comprising an acid to yield an eluate comprising a lithium salt;
(c) heating said eluate comprising the lithium salt to crystallize lithium oxide solids while releasing a gaseous oxide;
(d) providing the gaseous oxide into a scrubbing solution to yield recycled acid; and
(e) combining said lithium oxide solids with water to form lithium hydroxide.

Embodiment 166. The process according to embodiment 165, further comprising purifying the eluate comprising lithium salt before step (c) so as to remove impurities from the lithium salt.

Embodiment 167. The process according to embodiment 165 or 166, further comprising purifying the lithium hydroxide to remove impurities therefrom.

Embodiment 168. The process according to embodiment 165 or 167, wherein the purifying comprises filtering out insoluble hydroxide impurities.

Embodiment 169. The process according to embodiment 166 or 167, wherein the purifying comprises removing impurities from the lithium salt or lithium hydroxide using hydroxide precipitation, carbonate precipitation, ion exchange, solvent extraction, or combinations thereof.

Embodiment 170. The process according to any one of embodiments 165 to 169, further comprising crystallizing the lithium hydroxide.

Embodiment 171. The process according to any one of embodiments 165 to 170, further comprising crystallizing lithium hydroxide monohydrate solids.

Embodiment 172. The process according to any one of embodiments 165 to 171, further comprising crystallizing lithium carbonate solids.

Embodiment 173. The process according to embodiment 172, wherein crystallizing the lithium carbonate solids comprises adding carbon dioxide or sodium hydroxide to the lithium hydroxide to precipitate the lithium carbonate solids.

Embodiment 174. The process according to any one of embodiments 165 to 173, further comprising removing water from the eluate comprising the lithium salt before step (c).

Embodiment 175. The process according to embodiment 174, wherein said removing comprises using a reverse osmosis unit, a mechanical evaporator, a mechanical vapor recompression evaporator, or combinations thereof.

Embodiment 176. The process according to any one of embodiments 165 to 175, further comprising drying the eluate comprising the lithium salt before step (c).

Embodiment 177. The process according to any one of embodiments 165 to 175, further comprising drying the eluate comprising lithium sulfate before step (c) to remove water from the eluate comprising the lithium salt, so as to form a molten lithium salt that is heated to crystallize the lithium oxide solids while releasing the gaseous oxide.

Embodiment 178. The process according to any one of embodiments 165 to 177, wherein said lithium salt is in a molten salt form in step (c).

Embodiment 179. The process according to any one of embodiments 165 to 178, where said eluate comprising the lithium salt comprises water.

Embodiment 180. The process according to any one of embodiments 165 to 179, further comprising providing a catalyst to facilitate decomposition of the lithium salt in step (c).

Embodiment 181. The process according to any one of embodiments 165 to 180, wherein the acid comprises i) fresh acid (e.g., unused or virgin acid), ii) the recycled acid, or iii) both.

Embodiment 182. The process according to any one of embodiments 165 to 181, wherein the recycled acid is returned to the eluent of step (b).

Embodiment 183. The process according to any one of embodiments 165 to 182, wherein agitation, knocking, mixing, or milling facilitates decomposition of the lithium salt in step (c).

Embodiment 184. The process according to any one of embodiments 165-183, wherein a combustion system utilizing hydrogen, methane, carbon monoxide, syngas, fuel gases, hydrocarbons, oxygen, air, or combinations thereof is used to heat and facilitate decomposition of the lithium sulfate in step (c).

Embodiment 185. The process according to embodiment 184, wherein electrolytic cells are utilized to produce hydrogen, oxygen, or combinations thereof as inputs to the combustion system.

Embodiment 186. The process according to any one of embodiments 165 to 185, wherein the formed lithium hydroxide is an aqueous solution of the lithium hydroxide.

Embodiment 187. The process according to any one of embodiments 165 to 186, wherein the formed lithium hydroxide comprises lithium hydroxide monohydrate.

Embodiment 188. The process according to any one of embodiments 165 to 187, wherein said ion exchange particles are coated ion exchange particles.

Embodiment 189. The process according to embodiment 188, wherein said coated ion exchange particles comprise an oxide material coated with an oxide or a polymer.

Embodiment 190. The process according to any one of embodiments 165 to 189, further comprising modulating the pH of the liquid resource to neutralize protons released from said ion exchange particles.

Embodiment 191. The process according to any one of embodiments 165 to 190, wherein said scrubbing solution comprises hydrogen peroxide.

Embodiment 192. The process according to any one of embodiments 165 to 191, further comprising providing the system of any one of embodiments 138 to 164.

Embodiment 193. A system for lithium production, comprising:
a) an ion exchange unit containing ion exchange particles that absorb lithium from a liquid resource and that then release the absorbed lithium into an eluent comprising a volatile acid to yield a lithium salt solution;
b) a distillation unit that mixes sulfuric acid with said lithium salt solution and heats the resulting mixture to distill off volatile acid vapors and to yield lithium sulfate; and
c) a condensation unit that condenses said volatile acid vapors to yield recycled volatile acid for reuse in said ion exchange unit.

Embodiment 194. The system of embodiment 193, further comprising a concentration unit to remove water from said lithium salt solution after step (a) and before step (b).

Embodiment 195. The system of embodiment 193 or 194, further comprising a precipitation unit that adds a precipitant to said lithium sulfate yielding lithium solids.

Embodiment 196. The system of any one of embodiments 193 to 195, further comprising a carbonation unit where sodium carbonate is combined with said lithium sulfate to precipitate lithium carbonate.

Embodiment 197. The system of any one of embodiments 193 to 196, further comprising a crystallization unit where sodium hydroxide is combined with said lithium sulfate to crystallize lithium hydroxide.

Embodiment 198. The system of any one of embodiments 193 to 197, further comprising a crystallization unit where sodium hydroxide is combined with said lithium sulfate to crystallize lithium hydroxide monohydrate.

Embodiment 199. The system of any one of embodiments 193 to 198, further comprising a crystallization unit where sodium hydroxide is combined with said lithium sulfate to first crystallize a sodium sulfate byproduct and then crystallize a lithium hydroxide product.

Embodiment 200. The system according to any one of embodiments 193 to 199, further comprising a purification unit after the ion exchange unit and before the distillation unit to remove impurities from said lithium salt solution.

Embodiment 201. The system according to any one of embodiments 193 to 200, further comprising a purification unit after said distillation unit to remove impurities from said lithium sulfate.

Embodiment 202. The system according to any one of embodiments 193 to 201, wherein said volatile acid is i) fresh or virgin volatile acid, ii) the recycled volatile acid, or iii) both.

Embodiment 203. The system according to any one of embodiments 193 to 202, wherein said volatile acid is a volatile mineral acid comprising nitric acid, hydrochloric acid, hydrofluoric acid, hydrobromic acid, hydroiodic acid, or carbonic acid.

Embodiment 204. The system according to any one of embodiments 193 to 203, wherein said volatile acid is nitric acid.

Embodiment 205. The system according to any one of embodiments 193 to 203, wherein said volatile acid is hydrochloric acid.

Embodiment 206. The system according to any one of embodiments 193 to 205, wherein the distillation unit operates at temperatures of about 50 to about 150 degrees Celsius.

Embodiment 207. The system according to any one of embodiments 193 to 205, wherein the distillation unit operates at temperatures of about 100 to about 200 degrees Celsius.

Embodiment 208. The system according to any one of embodiments 193 to 205, wherein the distillation unit operates at temperatures of about 100 to about 300 degrees Celsius.

Embodiment 209. The system according to any one of embodiments 193 to 205, wherein the distillation unit operates at temperatures of about 200 to about 400 degrees Celsius.

Embodiment 210. The system according to any one of embodiments 193 to 205, wherein the distillation unit operates at temperatures of about 400 to about 600 degrees Celsius.

Embodiment 211. The system according to any one of embodiments 193 to 205, wherein the distillation unit operates at temperatures of above 600 degrees Celsius.

Embodiment 212. The system according to any one of embodiments 193 to 211, wherein the distillation unit yields said lithium sulfate in aqueous form.

Embodiment 213. The system according to any one of embodiments 193 to 212, wherein the distillation unit yields said lithium sulfate in solid form.

Embodiment 214. The system according to any one of embodiments 193 to 213, wherein the distillation unit comprises a spray dryer to produce said lithium sulfate in solid form.

Embodiment 215. The system according to any one of embodiments 193 to 214, wherein the distillation unit operates at pressures from about 0.01 atm to about 0.1 atm.

Embodiment 216. The system according to any one of embodiments 193 to 214, wherein the distillation unit operates at pressures from about 0.1 atm to about 1.0 atm.

Embodiment 217. The system according to any one of embodiments 193 to 214, wherein the distillation unit operates at pressures from about 1.0 atm to about 10 atm.

Embodiment 218. The system according to any one of embodiments 193 to 214, wherein the distillation unit operates at pressures above 10 atm.

Embodiment 219. The system according to any one of embodiments 193 to 214, wherein the condensation unit operates at pressures from about 1 atm to about 10 atm.

Embodiment 220. The system according to any one of embodiments 193 to 214, wherein the condensation unit operates at pressures from about 10 atm to about 100 atm.

Embodiment 221. The system according to any one of embodiments 193 to 214, wherein the condensation unit operates at pressures from about 100 atm to about 1,000 atm.

Embodiment 222. The system according to any one of embodiments 193 to 221, wherein the condensation unit operates at temperatures from about −200 degrees Celsius to about −100 degrees Celsius.

Embodiment 223. The system according to any one of embodiments 193 to 221, wherein the condensation unit operates at temperatures from about −100 degrees Celsius to about −50 degrees Celsius.

Embodiment 224. The system according to any one of embodiments 193 to 221, wherein the condensation unit operates at temperatures from about −50 degrees Celsius to about 0 degrees Celsius.

Embodiment 225. The system according to any one of embodiments 193 to 221, wherein the condensation unit operates at temperatures from about −30 degrees Celsius to about 20 degrees Celsius.

Embodiment 226. The system according to any one of embodiments 193 to 221, wherein the condensation unit operates at temperatures from about 0 degrees Celsius to about 50 degrees Celsius.

Embodiment 227. The system according to any one of embodiments 193 to 221, wherein the condensation unit operates at temperatures above 50 degrees Celsius.

Embodiment 228. The system according to any one of embodiments 193 to 227, wherein said ion exchange particles are coated ion exchange particles.

Embodiment 229. The system according to embodiment 228, wherein said coated ion exchange particles comprise an oxide material coated with an oxide or a polymer.

Embodiment 230. The system according to any one of embodiments 193 to 229, wherein said ion exchange unit modulates the pH of the liquid resource to neutralize protons released from said ion exchange particles.

Embodiment 231. The system according to any one of embodiments 193 to 230, further comprising a purification unit comprising a precipitation unit that precipitates and filters out impurities from said lithium sulfate as insoluble hydroxides, so as to yield purified lithium sulfate.

Embodiment 232. The system according to any one of embodiments 193 to 230, further comprising a purification unit comprising a precipitation unit for precipitating and filtering out impurities from said lithium sulfate as insoluble carbonates, so as to yield purified lithium sulfate.

Embodiment 233. The system according to any one of embodiments 193 to 230, further comprising a purification unit comprising an ion exchange resin for removing impurities from said lithium sulfate, so as to yield purified lithium sulfate.

Embodiment 234. The system according to any one of embodiments 193 to 233, further comprising a precipitation unit that mixes the lithium sulfate with sodium carbonate, so as to i) crystallize lithium carbonate, ii) dissolve said lithium carbonate using carbon dioxide, and iii) recrystallizes lithium carbonate by driving off carbon dioxide.

Embodiment 235. The system according to any one of embodiments 193 to 233, further comprising a precipitation unit that mixes the lithium sulfate with sodium hydroxide to yield a sodium sulfate byproduct.

Embodiment 236. The system according to embodiment 235, wherein said precipitation unit yields a sodium sulfate byproduct and a lithium hydroxide or lithium hydroxide monohydrate product.

Embodiment 237. The system according to embodiment 236, wherein said precipitation unit further comprises a multi-effect crystallizer.

Embodiment 238. The system according to any one of embodiments 193 to 237, further comprising a concentration unit comprising a reverse osmosis unit that removes water from said lithium salt solution to yield a concentrated lithium salt solution.

Embodiment 239. The system according to any one of embodiments 193 to 237, further comprising a concentration unit comprising a mechanical evaporation unit that removes water from said lithium salt solution to yield a concentrated lithium salt solution.

Embodiment 240. A system for lithium production, comprising:
a) an ion exchange unit containing ion exchange particles that absorb lithium from a liquid resource and that then release lithium into an eluent comprising a volatile acid to yield a lithium salt solution;
b) a concentration unit that removes water from said lithium salt solution to yield a concentrated lithium salt solution;
c) a distillation unit that mixes sulfuric acid with said concentrated lithium salt solution and heats the resulting mixture to distill off volatile acid vapors and yield lithium sulfate; and
d) a condensation unit to condense said volatile acid vapors yielding recycled volatile acid for reuse in said ion exchange unit.

Embodiment 241. The system according to embodiment 240, further comprising:
a) a purification unit that removes impurities from said lithium sulfate to yield purified lithium sulfate;
b) a conversion unit that adds sodium hydroxide to said purified lithium sulfate to yield a lithium hydroxide solution; and
c) a crystallization unit that crystallizes said lithium hydroxide solution to yield a lithium compound.

Embodiment 242. The system according to embodiment 240 or 241, wherein the volatile acid is i) fresh or virgin volatile acid, ii) the recycled volatile acid, or iii) both.

Embodiment 243. The system according to any one of embodiments 240 to 242, wherein said volatile acid is a volatile mineral acid comprising nitric acid, hydrochloric acid, hydrofluoric acid, hydrobromic acid, hydroiodic acid, or carbonic acid.

Embodiment 244. The system according to any one of embodiments 240 to 243, wherein said ion exchange particles are coated ion exchange particles.

Embodiment 245. The system according to embodiment 244, wherein said coated ion exchange particles comprise an oxide material coated with an oxide or a polymer.

Embodiment 246. The system according to any one of embodiments 240 to 245, wherein said ion exchange unit modulates the pH of the liquid resource to neutralize protons released from said ion exchange particles.

Embodiment 247. The system according to any one of embodiments 241 to 246, wherein said purification unit comprises a precipitation unit for precipitating and filtering out impurities as insoluble hydroxides.

Embodiment 248. The system according to any one of embodiments 241 to 246, wherein said purification unit comprises a precipitation unit for precipitating and filtering out impurities as insoluble carbonates.

Embodiment 249. The system according to any one of embodiments 241 to 246, wherein said purification unit comprises an ion exchange unit for removing impurities using an ion exchange resin.

Embodiment 250. The system according to any one of embodiments 241 to 249, wherein said conversion unit crystallizes a sodium sulfate byproduct.

Embodiment 251. The system according to any one of embodiments 240 to 250, wherein said concentration unit comprises a reverse osmosis unit.

Embodiment 252. The system according to any one of embodiments 240 to 250, wherein said concentration unit comprises a mechanical evaporation unit.

Embodiment 253. The system according to any one of embodiments 241 to 252, wherein said crystallization unit comprises a multi-effect crystallizer.

Embodiment 254. The system according to any one of embodiments 241 to 253, wherein said crystallization unit crystallizes lithium hydroxide monohydrate.

Embodiment 255. The system according to any one of embodiments 241 to 254, wherein said crystallization unit combines said lithium hydroxide solution with carbon dioxide or sodium hydroxide to crystallize lithium carbonate.

Embodiment 256. The system according to embodiment 240, further comprising:
a) a purification unit that removes impurities from said lithium sulfate to yield purified lithium sulfate; and
b) a first precipitation unit that adds sodium carbonate to said lithium sulfate to yield lithium carbonate solids.

Embodiment 257. The system according to embodiment 256, wherein the volatile acid is i) fresh or virgin volatile acid, ii) the recycled volatile acid, or iii) both.

Embodiment 258. The system according to embodiment 256 or 257, wherein said volatile acid is a volatile mineral acid comprising nitric acid, hydrochloric acid, hydrofluoric acid, hydrobromic acid, hydroiodic acid, or carbonic acid.

Embodiment 259. The system according to any one of embodiments 256 to 258, wherein said ion exchange particles are coated ion exchange particles.

Embodiment 260. The system according to embodiment 259, wherein said coated ion exchange particles comprise an oxide material coated with an oxide or a polymer.

Embodiment 261. The system according to any one of embodiments 256 to 260, wherein said ion exchange unit modulates the pH of the liquid resource to neutralize protons released from said ion exchange particles.

Embodiment 262. The system according to any one of embodiments 256 to 261, wherein said purification unit comprises a second precipitation unit for precipitating and filtering out impurities as insoluble hydroxides.

Embodiment 263. The system according to any one of embodiments 256 to 261, wherein said purification unit comprises a second precipitation unit for precipitating and filtering out impurities as insoluble carbonates.

Embodiment 264. The system according to any one of embodiments 256 to 261, wherein said purification unit comprises an ion exchange resin for removing impurities.

Embodiment 265. The system according to any one of embodiments 256 to 264, wherein said first precipitation unit dissolves said lithium carbonate solids using carbon dioxide to yield dissolved lithium carbonate, and crystallizes the dissolved lithium carbonate by driving off carbon dioxide.

Embodiment 266. The system according to any one of embodiments 256 to 265, wherein said first precipitation unit yields a sodium sulfate byproduct.

Embodiment 267. The system according to any one of embodiments 256 to 266, wherein said concentration unit comprises a reverse osmosis unit.

Embodiment 268. The system according to any one of embodiments 256 to 266, wherein said concentration unit comprises a mechanical evaporation unit.

Embodiment 269. The system according to any one of embodiments 256 to 268, wherein said first precipitation unit comprises a multi-effect crystallizer.

Embodiment 270. A system for lithium production, comprising:
a) an ion exchange unit containing ion exchange particles that absorb lithium from a liquid resource and that then release lithium into an eluent comprising a volatile acid to yield a lithium salt solution;
b) a first precipitation unit where a precipitant is mixed with said lithium salt solution to precipitate a lithium salt and yield an effluent;
c) a distillation unit that mixes sulfuric acid with said effluent and heats the resulting mixture to distill off volatile acid vapors; and
d) a condensation unit to condense said volatile acid vapors to yield recycled acid for reuse in said ion exchange unit.

Embodiment 271. The system of embodiment 270, wherein the distillation unit produces a sulfate byproduct.

Embodiment 272. The system of embodiment 270 or 271, further comprising a concentration unit to remove water from said lithium salt solution after step (a) and before step (b).

Embodiment 273. The system according to embodiment 272, wherein said concentration unit comprises a reverse osmosis unit, a mechanical evaporator, a mechanical vapor recompression evaporator, or combinations thereof.

Embodiment 274. The system of any one of embodiments 270 to 273, wherein the precipitant is sodium carbonate and the precipitated lithium salt is lithium carbonate.

Embodiment 275. The system of any one of embodiments 270 to 274, wherein the precipitant is sodium hydroxide and the precipitated lithium salt is lithium hydroxide.

Embodiment 276. The system of any one of embodiments 270 to 273, wherein the precipitant is sodium hydroxide and the precipitated lithium salt is lithium hydroxide monohydrate.

Embodiment 277. The system of any one of embodiments 270 to 276, wherein the effluent is sodium nitrate, sodium chloride, sodium bromide, or sodium iodide.

Embodiment 278. The system of any one of embodiments 270 to 277, wherein the effluent is sodium nitrate.

Embodiment 279. The system of any one of embodiments 270 to 277, wherein the effluent is sodium chloride.

Embodiment 280. The system according to any one of embodiments 270 to 279, further comprising a purification unit after the ion exchange unit and before the distillation unit to remove impurities from said lithium salt solution.

Embodiment 281. The system according to any one of embodiments 271 to 280, further comprising a purification unit after said distillation unit to remove impurities from said sulfate byproduct.

Embodiment 282. The system according to embodiment 280 or 281, wherein said purification unit comprises a second precipitation unit for precipitating and filtering out impurities as insoluble hydroxides.

Embodiment 283. The system according to embodiment 280 or 281, wherein said purification unit comprises a second precipitation unit for precipitating and filtering out impurities as insoluble carbonates.

Embodiment 284. The system according to embodiment 280 or 281, wherein said purification unit comprises an ion exchange resin for removing impurities.

Embodiment 285. The system according to any one of embodiments 270 to 284, wherein the volatile acid is i) fresh or virgin volatile acid, ii) the recycled volatile acid, or iii) both.

Embodiment 286. The system according to any one of embodiments 270 to 285, wherein said volatile acid is a volatile mineral acid comprising nitric acid, hydrochloric acid, hydrofluoric acid, hydrobromic acid, hydroiodic acid, or carbonic acid.

Embodiment 287. The system according to any one of embodiments 270 to 286, wherein said volatile acid is nitric acid.

Embodiment 288. The system according to any one of embodiments 270 to 286, wherein said volatile acid is hydrochloric acid.

Embodiment 289. The system according to any one of embodiments 270 to 288, wherein the distillation unit operates at temperatures of about 50 to about 150 degrees Celsius.

Embodiment 290. The system according to any one of embodiments 270 to 288, wherein the distillation unit operates at temperatures of about 100 to about 200 degrees Celsius.

Embodiment 291. The system according to any one of embodiments 270 to 288, wherein the distillation unit operates at temperatures of about 100 to about 300 degrees Celsius.

Embodiment 292. The system according to any one of embodiments 270 to 288, wherein the distillation unit operates at temperatures of about 200 to about 400 degrees Celsius.

Embodiment 293. The system according to any one of embodiments 270 to 288, wherein the distillation unit operates at temperatures of about 400 to about 600 degrees Celsius.

Embodiment 294. The system according to any one of embodiments 270 to 288, wherein the distillation unit operates at temperatures of above 600 degrees Celsius.

Embodiment 295. The system according to any one of embodiments 270 to 294, wherein the distillation unit yields lithium sulfate in aqueous form.

Embodiment 296. The system according to any one of embodiments 270 to 294, wherein the distillation unit yields lithium sulfate in solid form.

Embodiment 297. The system according to any one of embodiments 270 to 294, wherein the distillation unit operates at pressures from about 0.01 atm to about 0.1 atm.

Embodiment 298. The system according to any one of embodiments 270 to 294, wherein the distillation unit operates at pressures from about 0.1 atm to about 1.0 atm.

Embodiment 299. The system according to any one of embodiments 270 to 294, wherein the distillation unit operates at pressures from about 1.0 atm to about 10 atm.

Embodiment 300. The system according to any one of embodiments 270 to 294, wherein the distillation unit operates at pressures above 10 atm.

Embodiment 301. The system according to any one of embodiments 270 to 300, wherein the condensation unit operates at pressures from about 1 atm to about 10 atm.

Embodiment 302. The system according to any one of embodiments 270 to 300, wherein the condensation unit operates at pressures from about 10 atm to about 100 atm.

Embodiment 303. The system according to any one of embodiments 270 to 300, wherein the condensation unit operates at pressures from about 100 atm to about 1,000 atm.

Embodiment 304. The system according to any one of embodiments 270 to 303, wherein the condensation unit operates at temperatures from about −200 degrees Celsius to about −100 degrees Celsius.

Embodiment 305. The system according to any one of embodiments 270 to 303, wherein the condensation unit operates at temperatures from about −100 degrees Celsius to about −50 degrees Celsius.

Embodiment 306. The system according to any one of embodiments 270 to 303, wherein the condensation unit operates at temperatures from about −50 degrees Celsius to about 0 degrees Celsius.

Embodiment 307. The system according to any one of embodiments 270 to 303, wherein the condensation unit operates at temperatures from about −30 degrees Celsius to about 20 degrees Celsius.

Embodiment 308. The system according to any one of embodiments 270 to 303, wherein the condensation unit operates at temperatures from about 0 degrees Celsius to about 50 degrees Celsius.

Embodiment 309. The system according to any one of embodiments 270 to 303, wherein the condensation unit operates at temperatures above 50 degrees Celsius.

Embodiment 310. The system according to any one of embodiments 270 to 309, wherein said ion exchange particles are coated ion exchange particles.

Embodiment 311. The system according to embodiment 310, wherein said coated ion exchange particles comprise an oxide material coated with an oxide or a polymer.

Embodiment 312. The system according to any one of embodiments 270 to 311, wherein said ion exchange unit modulates the pH of the liquid resource to neutralize protons released from said ion exchange particles.

Embodiment 313. The system according to any one of embodiments 270 to 312, wherein said precipitated lithium salt is lithium carbonate, wherein said first precipitation unit dissolves said lithium carbonate using carbon dioxide to yield dissolved lithium carbonate, and crystallizes the dissolved lithium carbonate by driving off carbon dioxide.

Embodiment 314. The system according to any one of embodiments 270 to 313, wherein said first precipitation unit yields a sodium sulfate byproduct.

Embodiment 315. The system according to any one of embodiments 270 to 314, wherein said first precipitation unit yields a sodium sulfate byproduct and a lithium hydroxide or lithium hydroxide monohydrate product.

Embodiment 316. The system according to any one of embodiments 270 to 315, wherein said first precipitation unit comprises a multi-effect crystallizer.

Embodiment 317. A process for lithium production, comprising:
(a) contacting ion exchange particles with a liquid resource to produce lithiated ion exchange particles;
(b) treating the lithiated ion exchange particles with an eluent comprising a volatile acid to yield a lithium salt solution;
(c) mixing sulfuric acid with said lithium salt solution to form a lithium salt solution mixture;
(d) heating the lithium salt solution mixture to distill off volatile acid vapors and to yield lithium sulfate; and
(e) condensing said volatile acid vapors to yield recycled volatile acid.

Embodiment 318. The process of embodiment 317, further comprising removing water from said lithium salt solution after step (b) and before step (c).

Embodiment 319. The process of embodiment 317 or 318, further comprising adding a precipitant to said lithium sulfate to yield lithium solids.

Embodiment 320. The process of any one of embodiments 317 to 319, wherein said heating is done in a spray dryer to produce lithium sulfate solids.

Embodiment 321. The process of any one of embodiments 317 to 320, further comprising combining sodium carbonate with said lithium sulfate to precipitate lithium carbonate.

Embodiment 322. The process of any one of embodiments 317 to 321, further comprising combining sodium hydroxide with said lithium sulfate to crystallize lithium hydroxide.

Embodiment 323. The process of any one of embodiments 317 to 321, further comprising combining sodium hydroxide with said lithium sulfate to crystallize lithium hydroxide monohydrate.

Embodiment 324. The process of any one of embodiments 317 to 323, further comprising combining sodium hydroxide with said lithium sulfate to first crystallize a sodium sulfate byproduct and then crystallize a lithium hydroxide product.

Embodiment 325. The process of any one of embodiments 317 to 324, further comprising removing impurities from said lithium salt solution before step (c).

Embodiment 326. The process of any one of embodiments 317 to 325, further comprising removing impurities from said lithium sulfate.

Embodiment 327. The process of any one of embodiments 317 to 326, wherein said volatile acid is i) fresh or virgin volatile acid, ii) the recycled volatile acid, or iii) both.

Embodiment 328. The process of any one of embodiments 317 to 327, wherein said volatile acid is a volatile mineral acid comprising nitric acid, hydrochloric acid, hydrofluoric acid, hydrobromic acid, hydroiodic acid, or carbonic acid.

Embodiment 329. The process of any one of embodiments 317 to 328, wherein said volatile acid is nitric acid.

Embodiment 330. The process of any one of embodiments 317 to 328, wherein said volatile acid is hydrochloric acid.

Embodiment 331. The process of any one of embodiments 317 to 330, wherein the heating comprises heating the lithium salt solution to temperatures of about 50 to about 150 degrees Celsius.

Embodiment 332. The process of any one of embodiments 317 to 330, wherein the heating comprises heating the lithium salt solution in a heating unit operating at temperatures of about 100 to about 200 degrees Celsius.

Embodiment 333. The process of any one of embodiments 317 to 330, wherein the heating comprises heating the lithium salt solution in a heating unit operating at temperatures of about 100 to about 300 degrees Celsius.

Embodiment 334. The process of any one of embodiments 317 to 330, wherein the heating comprises heating the lithium salt solution in a heating unit operating at temperatures of about 200 to about 400 degrees Celsius.

Embodiment 335. The process of any one of embodiments 317 to 330, wherein the heating comprises heating the lithium salt solution in a heating unit operating at temperatures of about 400 to about 600 degrees Celsius.

Embodiment 336. The process of any one of embodiments 317 to 330, wherein the heating comprises heating the lithium salt solution in a heating unit operating at temperatures of above 600 degrees Celsius.

Embodiment 337. The process according to any one of embodiments 317 to 336, wherein said lithium sulfate is in aqueous form.

Embodiment 338. The process according to any one of embodiments 317 to 336, wherein said lithium sulfate is in solid form.

Embodiment 339. The process of any one of embodiments 317 to 338, wherein the heating comprises heating the lithium salt solution in a heating unit operating at pressures from about 0.01 atm to about 0.1 atm.

Embodiment 340. The process of any one of embodiments 317 to 338, wherein the heating comprises heating the lithium salt solution in a heating unit operating at pressures from about 0.1 atm to about 1.0 atm.

Embodiment 341. The process of any one of embodiments 317 to 338, wherein the heating comprises heating the lithium salt solution at pressures from about 1.0 atm to about 10 atm.

Embodiment 342. The process of any one of embodiments 317 to 338, wherein the heating comprises heating the lithium salt solution in a heating unit operating at pressures above 10 atm.

Embodiment 343. The process of any one of embodiments 317 to 342, wherein the condensing comprises condensing the volatile acid vapors in a condensing unit operating at pressures from about 1 atm to about 10 atm.

Embodiment 344. The process of any one of embodiments 317 to 342, wherein the condensing comprises condensing the volatile acid vapors in a condensing unit operating at pressures from about 10 atm to about 100 atm.

Embodiment 345. The process of any one of embodiments 317 to 342, wherein the condensing comprises condensing the volatile acid vapors in a condensing unit operating at pressures from about 100 atm to about 1,000 atm.

Embodiment 346. The process of any one of embodiments 317 to 345, wherein the condensing comprises condensing the volatile acid vapors in a condensing unit operating at temperatures from about −200 degrees Celsius to about −100 degrees Celsius.

Embodiment 347. The process of any one of embodiments 317 to 345, wherein the condensing comprises condensing the volatile acid vapors in a condensing unit operating at temperatures from about −100 degrees Celsius to about −50 degrees Celsius.

Embodiment 348. The process of any one of embodiments 317 to 345, wherein the condensing comprises condensing the volatile acid vapors in a condensing unit operating at temperatures from about −50 degrees Celsius to about 0 degrees Celsius.

Embodiment 349. The process of any one of embodiments 317 to 345, wherein the condensing comprises condensing the volatile acid vapors in a condensing unit operating at temperatures from about −30 degrees Celsius to about 20 degrees Celsius.

Embodiment 350. The process of any one of embodiments 317 to 345, wherein the condensing comprises condensing the volatile acid vapors in a condensing unit operating at temperatures from about 0 degrees Celsius to about 50 degrees Celsius.

Embodiment 351. The process of any one of embodiments 317 to 345, wherein the condensing comprises condensing the volatile acid vapors in a condensing unit operating at temperatures above 50 degrees Celsius.

Embodiment 352. The process of any one of embodiments 317 to 351, wherein said ion exchange particles are coated ion exchange particles.

Embodiment 353. The process of embodiment 352, wherein said coated ion exchange particles comprise an oxide material coated with an oxide or a polymer.

Embodiment 354. The process of any one of embodiments 317 to 353, further comprising modulating the pH of the liquid resource to neutralize protons released from said ion exchange particles.

Embodiment 355. The process of any one of embodiments 317 to 354, further comprising precipitating and filtering out impurities from said lithium sulfate as insoluble hydroxides, so as to yield purified lithium sulfate.

Embodiment 356. The process of any one of embodiments 317 to 354, further comprising precipitating and filtering out impurities from said lithium sulfate as insoluble carbonates, so as to yield purified lithium sulfate.

Embodiment 357. The process of any one of embodiments 317 to 354, further comprising removing impurities from said lithium sulfate, so as to yield purified lithium sulfate.

Embodiment 358. The process of any one of embodiments 317 to 354, further comprising mixing the lithium sulfate with sodium carbonate, so as to i) crystallize lithium carbonate, ii) dissolve said lithium carbonate using carbon dioxide, and iii) recrystallizes lithium carbonate by driving off carbon dioxide.

Embodiment 359. The process of any one of embodiments 317 to 358, further comprising mixing the lithium sulfate with sodium hydroxide to yield a sodium sulfate byproduct.

Embodiment 360. The process of embodiment 347, further yielding a lithium hydroxide or lithium hydroxide monohydrate product.

Embodiment 361. The process of any one of embodiments 317 to 360, further comprising removing water from said lithium salt solution to yield a concentrated lithium salt solution.

Embodiment 362. The process of any one of embodiments 317 to 361, further comprising providing a system of any one of embodiments 193 to 239.

Embodiment 363. A process for lithium production, comprising:
(a) contacting ion exchange particles with a liquid resource to produce lithiated ion exchange particles;
(b) treating the lithiated ion exchange particles with an eluent comprising a volatile acid to yield a lithium salt solution;
(c) removing water from said lithium salt solution to yield a concentrated lithium salt solution;
(d) mixing sulfuric acid with said concentrated lithium salt solution to yield a lithium salt solution mixture;
(e) heating the lithium salt solution mixture to distill off volatile acid vapors and yield lithium sulfate; and
(f) condensing said volatile acid vapors yielding recycled volatile acid.

Embodiment 364. The process according to embodiment 363, further comprising:
(a) removing impurities from said lithium sulfate to yield purified lithium sulfate;
(b) combining sodium hydroxide to said purified lithium sulfate to yield a lithium hydroxide solution; and
(c) crystallizing said lithium hydroxide solution to yield a lithium compound.

Embodiment 365. The process according to embodiment 363 or 364, wherein the volatile acid is i) fresh or virgin volatile acid, ii) the recycled volatile acid, or iii) both.

Embodiment 366. The process according to any one of embodiments 363 to 365, wherein said volatile acid is a volatile mineral acid comprising nitric acid, hydrochloric acid, hydrofluoric acid, hydrobromic acid, hydroiodic acid, or carbonic acid.

Embodiment 367. The process according to any one of embodiments 363 to 366, wherein said ion exchange particles are coated ion exchange particles.

Embodiment 368. The process according to embodiment 367, wherein said coated ion exchange particles comprise an oxide material coated with an oxide or a polymer.

Embodiment 369. The process according to embodiment any one of embodiments 363 to 368, further comprising modulating the pH of the liquid resource to neutralize protons released from said ion exchange particles.

Embodiment 370. The process according to embodiment any one of embodiments 364 to 369, wherein the removing impurities comprises precipitating and filtering out impurities as insoluble hydroxides.

Embodiment 371. The process according to any one of embodiments 364 to 369, wherein the removing impurities comprises precipitating and filtering out impurities as insoluble carbonates.

Embodiment 372. The process according to any one of embodiments 363 to 369, wherein the removing impurities comprises using an ion exchange resin.

Embodiment 373. The process according to any one of embodiments 364 to 372, wherein the combining further crystallizes a sodium sulfate byproduct.

Embodiment 374. The process according to any one of embodiments 363 to 372, wherein said removing water comprises using a reverse osmosis unit.

Embodiment 375. The process according to any one of embodiments 363 to 372, wherein said removing water comprises using a mechanical evaporation unit.

Embodiment 376. The process according to any one of embodiments 364 to 375, said crystallized lithium compound comprises lithium hydroxide monohydrate.

Embodiment 377. The process according to any one of embodiments 364 to 376, wherein said crystallizing comprises combining said lithium hydroxide solution with carbon dioxide or sodium hydroxide to crystallize lithium carbonate.

Embodiment 378. The process according to embodiment 363, further comprising:
(a) removing impurities from said lithium sulfate to yield purified lithium sulfate; and
(b) combining sodium carbonate to said lithium sulfate to yield lithium carbonate solids.

Embodiment 379. The process according to embodiment 378, wherein the volatile acid is i) fresh or virgin volatile acid, ii) the recycled volatile acid, or iii) both.

Embodiment 380. The process according to embodiment 378 or 379, wherein said volatile acid is a volatile mineral acid comprising nitric acid, hydrochloric acid, hydrofluoric acid, hydrobromic acid, hydroiodic acid, or carbonic acid.

Embodiment 381. The process according to any one of embodiments 378 to 380, wherein said ion exchange particles are coated ion exchange particles.

Embodiment 382. The process according to embodiment 381, wherein said coated ion exchange particles comprise an oxide material coated with an oxide or a polymer.

Embodiment 383. The process according to any one of embodiments 378 to 382, further comprising modulating the pH of the liquid resource to neutralize protons released from said ion exchange particles.

Embodiment 384. The process according to any one of embodiments 378 to 383, wherein said removing impurities comprises precipitating and filtering out impurities as insoluble hydroxides.

Embodiment 385. The process according to any one of embodiments 378 to 383, wherein said removing impurities comprises precipitating and filtering out impurities as insoluble carbonates.

Embodiment 386. The process according to any one of embodiments 378 to 383, wherein said removing impurities comprises using an ion exchange resin.

Embodiment 387. The process according to any one of embodiments 378 to 386, further comprising i) dissolving said lithium carbonate solids using carbon dioxide to yield dissolved lithium carbonate, and ii) crystallizing the dissolved lithium carbonate by driving off carbon dioxide.

Embodiment 388. The process according to any one of embodiments 378 to 387, wherein said combining further yields a sodium sulfate byproduct.

Embodiment 389. The process according to embodiment any one of embodiments 378 to 388, wherein the removing water comprises using a reverse osmosis unit.

Embodiment 390. The process according to embodiment any one of embodiments 378 to 388, wherein the removing water comprises using a mechanical evaporation unit.

Embodiment 391. The process of any one of embodiments 378 to 390, further comprising providing a system of any one of embodiments 240 to 269.

Embodiment 392. A process for lithium production, comprising:
(a) contacting ion exchange particles with a liquid resource to produce lithiated ion exchange particles;
(b) treating the lithiated ion exchange particles with an eluent comprising a volatile acid to yield a lithium salt solution;
(c) mixing a precipitant with said lithium salt solution to precipitate a lithium salt and yield an effluent;
(d) mixing sulfuric acid with said effluent to yield an effluent mixture;
(e) heating the effluent mixture to distill off volatile acid vapors; and
(f) condensing said volatile acid vapors to yield recycled acid.

Embodiment 393. The process of embodiment 392, wherein steps (d) and (e) produces a sulfate byproduct.

Embodiment 394. The process of embodiment 392 or 393, further comprising removing impurities from said sulfate byproduct.

Embodiment 395. The process of any one of embodiments 392 to 394, further comprising removing water from said lithium salt solution after step (b) and before step (c).

Embodiment 396. The process of embodiment 395, wherein said removing water comprises using a reverse osmosis unit, a mechanical evaporator, a mechanical vapor recompression evaporator, or combinations thereof.

Embodiment 397. The process of any one of embodiments 392 to 396, wherein the precipitant is sodium carbonate and the precipitated lithium salt is lithium carbonate.

Embodiment 398. The process of any one of embodiments 392 to 396, wherein the precipitant is sodium hydroxide and the precipitated lithium salt is lithium hydroxide.

Embodiment 399. The process of any one of embodiments 392 to 396, wherein the precipitant is sodium hydroxide and the precipitated lithium salt is lithium hydroxide monohydrate.

Embodiment 400. The process of any one of embodiments 392 to 399, wherein the effluent is sodium nitrate, sodium chloride, sodium bromide, or sodium iodide.

Embodiment 401. The process of any one of embodiments 392 to 400, wherein the effluent is sodium nitrate.

Embodiment 402. The process of any one of embodiments 392 to 400, wherein the effluent is sodium chloride.

Embodiment 403. The process of any one of embodiments 392 to 402, further comprising removing impurities from said lithium salt solution.

Embodiment 404. The process of embodiment 403, wherein said removing impurities comprises precipitating and filtering out impurities as insoluble hydroxides.

Embodiment 405. The process of embodiment 403, wherein said removing impurities comprises precipitating and filtering out impurities as insoluble carbonates.

Embodiment 406. The process of embodiment 403, wherein said removing impurities comprises using an ion exchange resin.

Embodiment 407. The process of any one of embodiments 392 to 406, wherein the volatile acid is i) fresh or virgin volatile acid, ii) the recycled volatile acid, or iii) both.

Embodiment 408. The process of any one of embodiments 392 to 407, wherein said volatile acid is a volatile mineral acid comprising nitric acid, hydrochloric acid, hydrofluoric acid, hydrobromic acid, hydroiodic acid, or carbonic acid.

Embodiment 409. The process of any one of embodiments 392 to 408, wherein said volatile acid is nitric acid.

Embodiment 410. The process of any one of embodiments 392 to 408, wherein said volatile acid is hydrochloric acid.

Embodiment 411. The process of any one of embodiments 392 to 410, wherein the heating comprises heating the effluent mixture in a distillation unit operating at temperatures of about 50 to about 150 degrees Celsius.

Embodiment 412. The process of any one of embodiments 392 to 410, wherein the heating comprises heating the effluent mixture in a distillation unit operating at temperatures of about 100 to about 200 degrees Celsius.

Embodiment 413. The process of any one of embodiments 392 to 410, wherein the heating comprises heating the effluent mixture in a distillation unit operating at temperatures of about 100 to about 300 degrees Celsius.

Embodiment 414. The process of any one of embodiments 392 to 410, wherein the heating comprises heating the effluent mixture in a distillation unit operating at temperatures of about 200 to about 400 degrees Celsius.

Embodiment 415. The process of any one of embodiments 392 to 410, wherein the heating comprises heating the effluent mixture in a distillation unit operating at temperatures of about 400 to about 600 degrees Celsius.

Embodiment 416. The process of any one of embodiments 392 to 410, wherein the heating comprises heating the effluent mixture in a distillation unit operating at temperatures of above 600 degrees Celsius.

Embodiment 417. The process of any one of embodiments 392 to 416, wherein steps (d) and (e) yields lithium sulfate in aqueous form.

Embodiment 418. The process of any one of embodiments 392 to 416, wherein steps (d) and (e) yields lithium sulfate in solid form.

Embodiment 419. The process of any one of embodiments 392 to 418, wherein the heating comprises heating the effluent mixture in a distillation unit operating at pressures from about 0.01 atm to about 0.1 atm.

Embodiment 420. The process of any one of embodiments 392 to 418, wherein the heating comprises heating the effluent mixture in a distillation unit operating at pressures from about 0.1 atm to about 1.0 atm.

Embodiment 421. The process of any one of embodiments 392 to 418, wherein the heating comprises heating the effluent mixture in a distillation unit operating at pressures from about 1.0 atm to about 10 atm.

Embodiment 422. The process of any one of embodiments 392 to 418, wherein the heating comprises heating the effluent mixture in a distillation unit operating at pressures above 10 atm.

Embodiment 423. The process of any one of embodiments 392 to 422, wherein the condensing comprises condensing the volatile acid vapors in a condensing unit operating at pressures from about 1 atm to about 10 atm.

Embodiment 424. The process of any one of embodiments 392 to 422, wherein the condensing comprises condensing the volatile acid vapors in a condensing unit operating at pressures from about 10 atm to about 100 atm.

Embodiment 425. The process of any one of embodiments 392 to 422, wherein the condensing comprises condensing the volatile acid vapors in a condensing unit operating at pressures from about 100 atm to about 1,000 atm.

Embodiment 426. The process of any one of embodiments 392 to 425, wherein the condensing comprises condensing the volatile acid vapors in a condensing unit operating at temperatures from about −200 degrees Celsius to about −100 degrees Celsius.

Embodiment 427. The process of any one of embodiments 392 to 425, wherein the condensing comprises condensing the volatile acid vapors in a condensing unit operating at temperatures from about −100 degrees Celsius to about −50 degrees Celsius.

Embodiment 428. The process of any one of embodiments 392 to 425, wherein the condensing comprises condensing the volatile acid vapors in a condensing unit operating at temperatures from about −50 degrees Celsius to about 0 degrees Celsius.

Embodiment 429. The process of any one of embodiments 392 to 425, wherein the condensing comprises condensing the volatile acid vapors in a condensing unit operating at temperatures from about −30 degrees Celsius to about 20 degrees Celsius.

Embodiment 430. The process of any one of embodiments 392 to 425, wherein the condensing comprises condensing the volatile acid vapors in a condensing unit operating at temperatures from about 0 degrees Celsius to about 50 degrees Celsius.

Embodiment 431. The process of any one of embodiments 392 to 425, wherein the condensing comprises condensing the volatile acid vapors in a condensing unit operating at temperatures above 50 degrees Celsius.

Embodiment 432. The process of any one of embodiments 392 to 425, wherein said ion exchange particles are coated ion exchange particles.

Embodiment 433. The process of embodiment 432, wherein said coated ion exchange particles comprise an oxide material coated with an oxide or a polymer.

Embodiment 434. The process of any one of embodiments 392 to 433, further comprising modulating the pH of the liquid resource to neutralize protons released from said ion exchange particles.

Embodiment 435. The process of any one of embodiments 392 to 434, wherein said precipitated lithium salt is lithium carbonate.

Embodiment 436. The process of embodiment 435, further comprising i) dissolving said lithium carbonate using carbon dioxide to yield dissolved lithium carbonate, and ii) crystallizing the dissolved lithium carbonate by driving off carbon dioxide.

Embodiment 437. The process of any one of embodiments 392 to 436, wherein said mixing a precipitant yields a sodium sulfate byproduct.

Embodiment 438. The process of any one of embodiments 392 to 436, wherein said mixing a precipitant yields a sodium sulfate byproduct and a lithium hydroxide or lithium hydroxide monohydrate product.

Embodiment 439. The process of any one of embodiments 392 to 438, further comprising providing a system of any one of embodiments 270 to 316.

What is claimed is:

1. A system for production of lithium hydroxide, comprising:
 a) an ion exchange unit containing ion exchange particles that absorb lithium from a liquid resource and that then release the absorbed lithium into an eluent comprising an acid to yield an eluate comprising a lithium salt;
 b) a heating unit that decomposes said lithium salt to crystallize lithium oxide solids while releasing a gaseous oxide;
 c) an absorption unit that absorbs said gaseous oxide into a scrubbing solution to yield recycled acid; and
 d) a hydration unit that combines said lithium oxide solids with water to form lithium hydroxide.

2. The system of claim 1, further comprising a purification unit after the ion exchange unit and before the heating unit to remove impurities from the lithium salt.

3. The system of claim 1, further comprising a purification unit after the hydration unit to remove impurities from the lithium hydroxide.

4. The system of claim 1, further comprising a crystallization unit after the hydration unit to crystallize the lithium hydroxide.

5. The system of claim 1, further comprising a concentration unit between step (a) and step (b) to remove water from the eluate comprising the lithium salt.

6. The system of claim 5, wherein said concentration unit comprises a reverse osmosis unit, a mechanical evaporator, a mechanical vapor recompression evaporator, or combinations thereof.

7. The system of claim 1, further comprising a drying unit between step (a) and step (b) to remove water from the eluate comprising the lithium salt.

8. The system of claim 1, further comprising a drying unit between step (a) and step (b) to remove water from the eluate comprising the lithium salt to form a molten lithium salt that is decomposed by the heating unit to crystallize the lithium oxide solids while releasing the gaseous oxide.

9. The system of claim 1, wherein the acid is nitric acid, sulfuric acid, or hydrochloric acid.

10. A system for lithium production, comprising:
 a) an ion exchange unit containing ion exchange particles that absorb lithium from a liquid resource and that then release the absorbed lithium into an eluent comprising a volatile acid to yield a lithium salt solution;
 b) a distillation unit that mixes sulfuric acid with said lithium salt solution and heats the resulting mixture to distill off volatile acid vapors and to yield lithium sulfate; and
 c) a condensation unit that condenses said volatile acid vapors to yield recycled volatile acid for reuse in said ion exchange unit.

11. The system of claim 10, wherein said ion exchange unit modulates the pH of the liquid resource to neutralize protons released from said ion exchange particles.

12. The system of claim 10, further comprising a concentration unit to remove water from said lithium salt solution after step (a) and before step (b).

13. The system of claim 12, wherein the concentration unit comprises a reverse osmosis unit that removes water from said lithium salt solution to yield a concentrated lithium salt solution.

14. The system of claim 12, wherein the concentration unit comprises a mechanical evaporation unit that removes water from said lithium salt solution to yield a concentrated lithium salt solution.

15. The system of claim 10, further comprising a precipitation unit wherein the precipitation unit i) adds a precipitant to said lithium sulfate yielding lithium solids; or ii) adds a precipitant to precipitate and out impurities; or both i) and ii).

16. The system of claim 10, further comprising a carbonation unit where sodium carbonate is combined with said lithium sulfate to precipitate lithium carbonate.

17. The system of claim 10, further comprising a crystallization unit comprising a multi-effect crystallizer.

18. The system of claim 10, further comprising a crystallization unit where sodium hydroxide is combined with said lithium sulfate to crystallize lithium hydroxide.

19. The system of claim 10, further comprising a crystallization unit where sodium hydroxide is combined with said lithium sulfate to first crystallize a sodium sulfate byproduct and then crystallize a lithium hydroxide product.

20. The system of claim 10, further comprising a purification unit after the ion exchange unit and before the distillation unit to remove impurities from said lithium salt solution.

21. The system of claim 10, further comprising a purification unit after said distillation unit to remove impurities from said lithium sulfate.

22. The system of claim 10, further comprising:
 a) a purification unit that removes impurities from said lithium sulfate to yield purified lithium sulfate;
 b) a conversion unit that adds sodium hydroxide to said purified lithium sulfate to yield a lithium hydroxide solution; and
 c) a crystallization unit that crystallizes said lithium hydroxide solution to yield a lithium compound.

23. A system for lithium production, comprising:
 a) an ion exchange unit containing ion exchange particles that absorb lithium from a liquid resource and that then release lithium into an eluent comprising a volatile acid to yield a lithium salt solution;
 b) a first precipitation unit where a precipitant is mixed with said lithium salt solution to precipitate a lithium salt and yield an effluent;
 c) a distillation unit that mixes sulfuric acid with said effluent and heats the resulting mixture to distill off volatile acid vapors; and
 d) a condensation unit to condense said volatile acid vapors to yield recycled acid for reuse in said ion exchange unit.

24. The system of claim 23, further comprising a concentration unit to remove water from said lithium salt solution after step (a) and before step (b).

25. The system of claim 24, wherein said concentration unit comprises a reverse osmosis unit, a mechanical evaporator, a mechanical vapor recompression evaporator, or combinations thereof.

26. The system of claim 23, further comprising a purification unit to remove impurities before or after distillation.

27. The system of claim 26, wherein said purification unit removes impurities from said lithium salt solution.

28. The system of claim 26, wherein said purification unit comprises a second precipitation unit for precipitating and filtering out impurities as insoluble hydroxides.

29. The system of claim 26, wherein said purification unit comprises a second precipitation unit for precipitating and filtering out impurities as insoluble carbonates.

30. The system of claim 26, wherein said purification unit comprises an ion exchange resin for removing impurities.

\* \* \* \* \*